US011767923B2

(12) United States Patent
Plummer et al.

(10) Patent No.: US 11,767,923 B2
(45) Date of Patent: Sep. 26, 2023

(54) BREAK-AWAY CHECK VALVE

(71) Applicant: Melvin D. Plummer, Los Angeles, CA (US)

(72) Inventors: Melvin D. Plummer, Los Angeles, CA (US); Niklas S. Seyferth, Muskegon, MI (US); William A. Seyferth, Muskegon, MI (US)

(73) Assignee: HYDRANT GUARD LLC, Los Angeles, CA (US)

( * ) Notice: Subject to any disclaimer, the term of this patent is extended or adjusted under 35 U.S.C. 154(b) by 66 days.

(21) Appl. No.: 17/603,289

(22) PCT Filed: Apr. 13, 2020

(86) PCT No.: PCT/US2020/028008
§ 371 (c)(1),
(2) Date: Oct. 12, 2021

(87) PCT Pub. No.: WO2020/210835
PCT Pub. Date: Oct. 15, 2020

(65) Prior Publication Data
US 2022/0205547 A1 Jun. 30, 2022

Related U.S. Application Data

(63) Continuation of application No. 16/382,124, filed on Apr. 11, 2019, now Pat. No. 11,187,332.

(51) Int. Cl.
*F16K 15/03* (2006.01)
*E03B 9/02* (2006.01)

(52) U.S. Cl.
CPC .............. *F16K 15/038* (2013.01); *E03B 9/02* (2013.01)

(58) Field of Classification Search
CPC ... Y10T 137/87973; F16K 29/02; F16L 29/04; F16L 37/36; F16L 37/373; F16L 37/44; F16L 37/47; F16L 55/1007; F16L 55/1015; F16L 55/1018; F16L 55/1022; E03B 9/02; E03B 9/04; F16K 1/221; F16K 1/223; F16K 15/038; F16K 15/181; F16K 27/0218; F16K 17/363
See application file for complete search history.

(56) References Cited

U.S. PATENT DOCUMENTS 4,361,165 A 11/1982 Flory
4,699,357 A 10/1987 Sisk
(Continued)

FOREIGN PATENT DOCUMENTS

KR 20160045379 A 4/2016
KR 20170142296 A 12/2017

OTHER PUBLICATIONS

International Search Report for PCT/US2020/028008, prepared by the RU Federal Institute of Industrial Property, dated Jul. 16, 2020, 2 pages.

*Primary Examiner* — Hailey K. Do
(74) *Attorney, Agent, or Firm* — Cohen IP Law Group, PC; Michael N. Cohen

(57) ABSTRACT

A break-away check valve is provided. The check valve may be configured between two passageways and may regulate the flow of liquid between the passageways. The check valve may include an actuation assembly that may actuate the check valve upon the system becoming dislodged or otherwise dislocated from at least one of the passageways.

20 Claims, 61 Drawing Sheets

(56) References Cited

U.S. PATENT DOCUMENTS

| | | | | |
|---|---|---|---|---|
| 5,351,708 | A | * | 10/1994 | Donato ............... F16L 55/1007 137/68.14 |
| 5,738,143 | A | | 4/1998 | Faughn |
| 6,938,636 | B1 | * | 9/2005 | Nimberger .......... F16L 55/1007 285/39 |
| 11,377,826 | B1 | * | 7/2022 | Beneventi ............. F16K 17/363 |
| 2009/0025798 | A1 | | 1/2009 | Garcia et al. |
| 2015/0240962 | A1 | | 8/2015 | Plummer et al. |
| 2016/0265197 | A1 | | 9/2016 | Kitchen et al. |
| 2017/0307097 | A1 | | 10/2017 | Plummer |
| 2018/0171606 | A1 | | 6/2018 | Kitchen et al. |
| 2020/0256474 | A1 | | 8/2020 | Huelsman |

\* cited by examiner

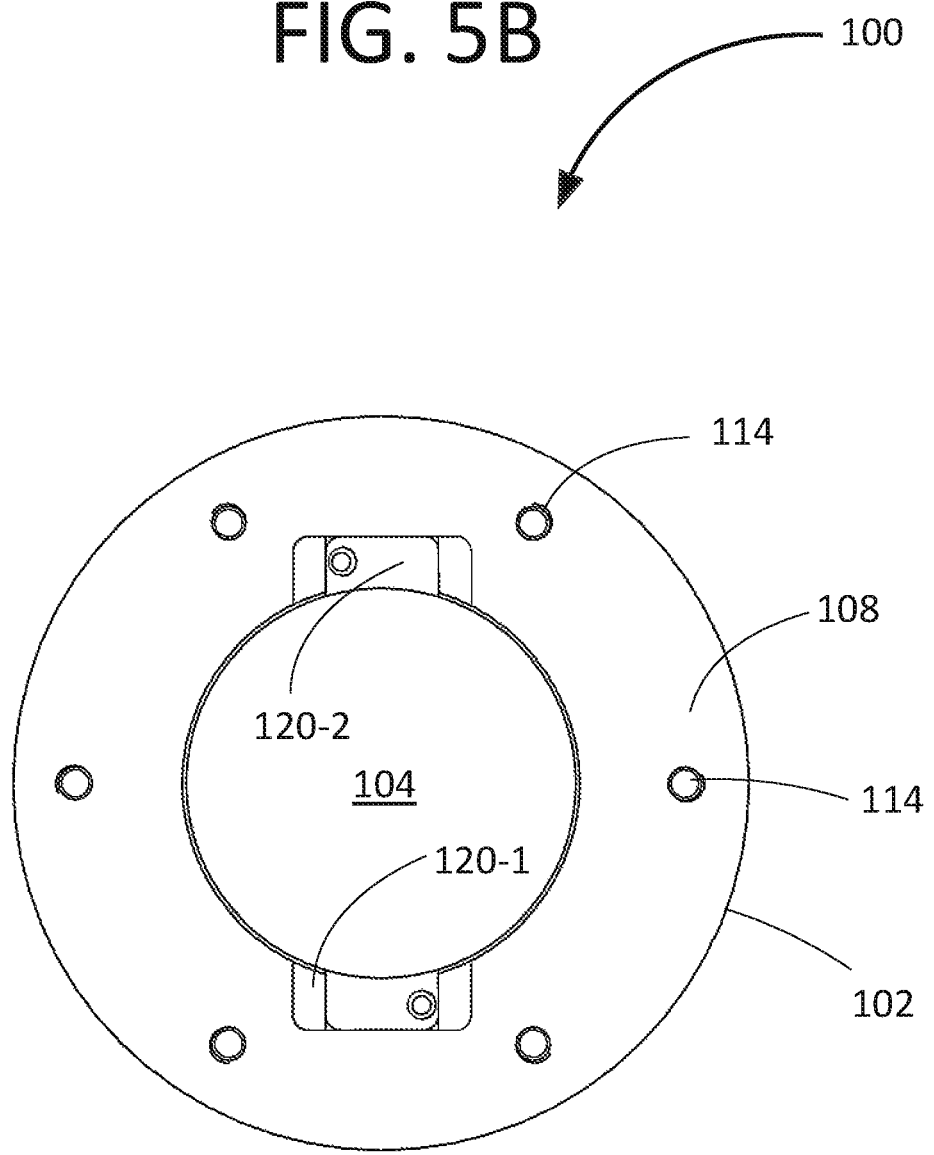

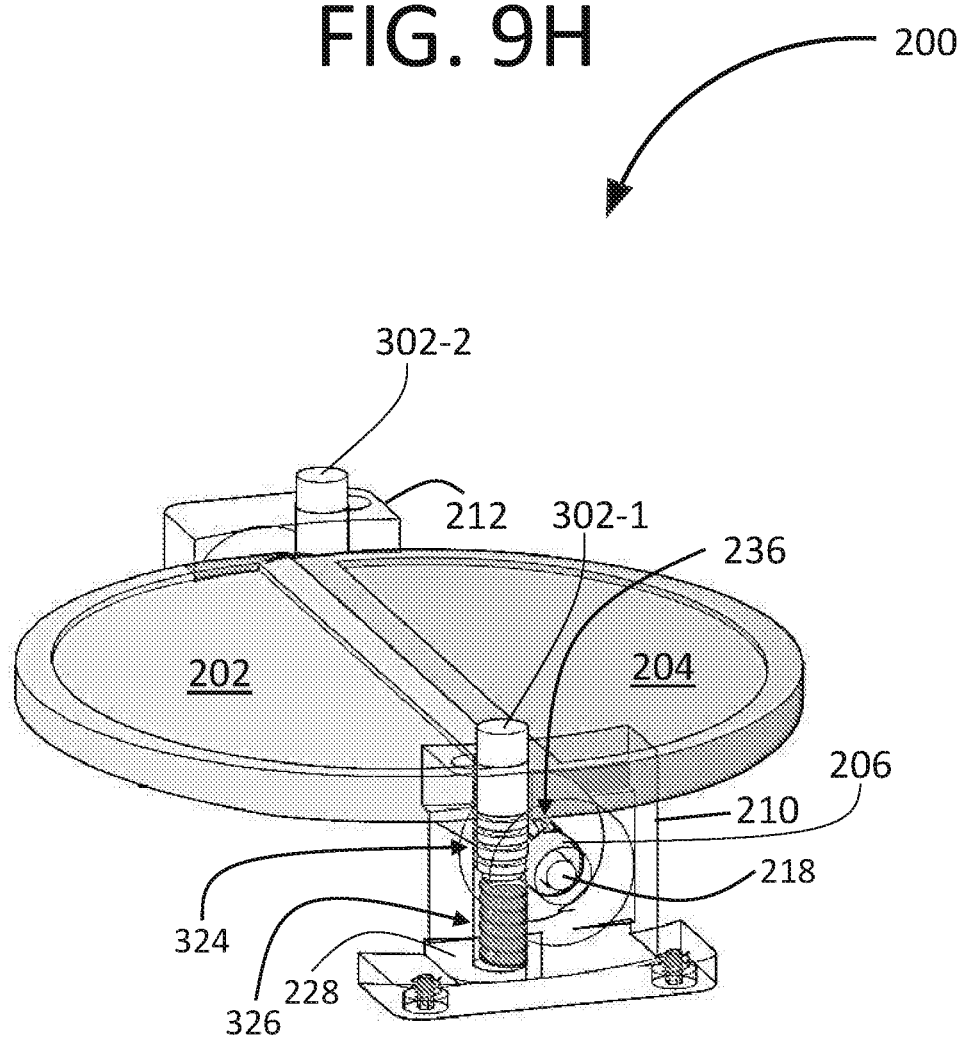

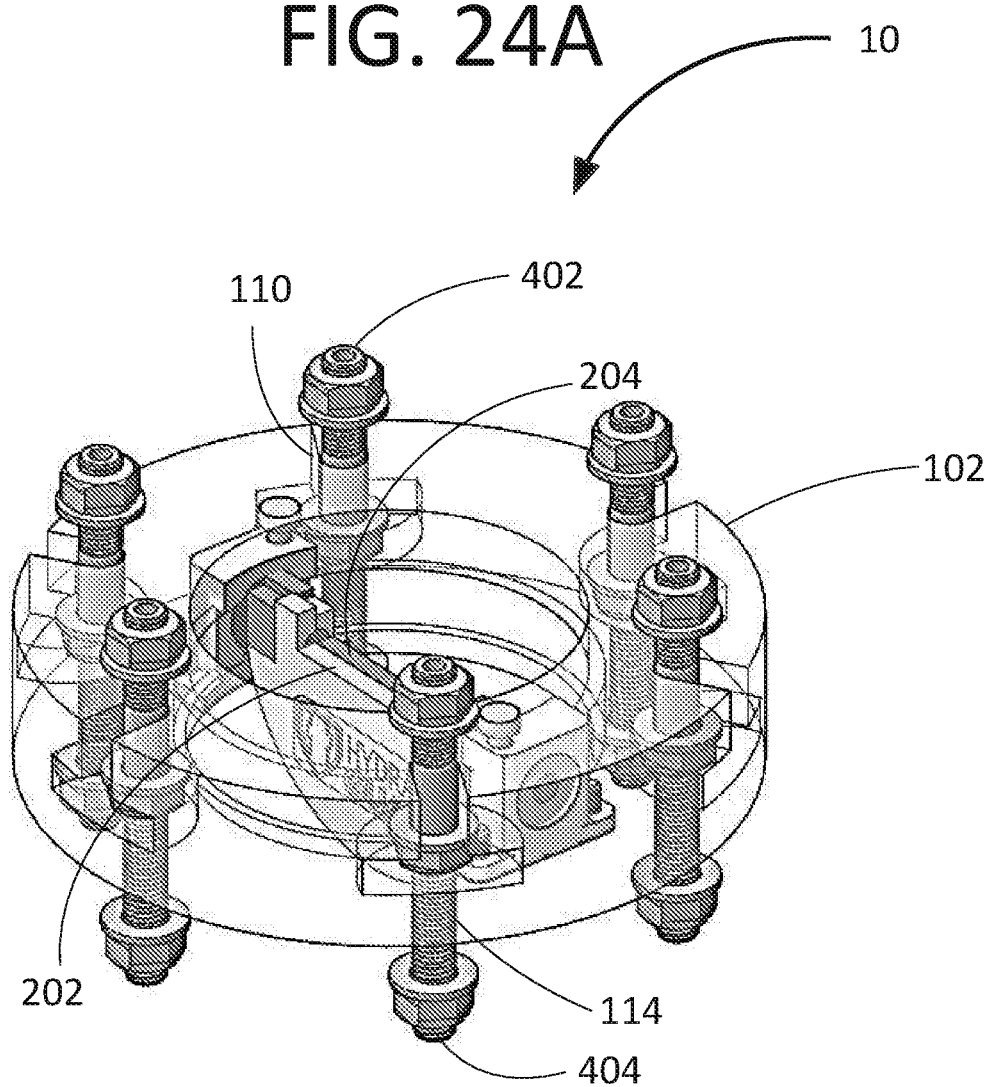

BREAK-AWAY CHECK VALVE

CROSS-REFERENCE TO RELATED APPLICATION

This application is the U.S. national phase of PCT Application No. PCT/US2020/028008 filed on Apr. 13, 2020, which claims priority to U.S. patent application Ser. No. 16/382,124 filed on Apr. 11, 2019, the disclosures of which are incorporated in their entirety by reference herein.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

The present invention relates generally to check valves, and more particularly to check valves that may be used with fire hydrants.

BACKGROUND OF THE INVENTION

Presently, a variety of dual-plate check valves are available in the market. However, none of them provide any type of fast-locking mechanism or actuation principles which are installed completely above grade, within a single flange and resettable in the field. Moreover, most of the existing devices are complex in use, design and are expensive to install below grade (underground). Due to these problems, the check valves presently in use have not been very popular.

One of the existing devices provides a slow valve closing feature when the fire hydrant and/or pipes are damaged. In an attempt to diminish water hammer which is caused when large amounts of flowing water is stopped causing a back pressure which can damage piping downstream. All of these conventional check valve devices require them to be installed below grade or within the water main piping requiring expensive installation and unacceptable water flow restrictions.

Therefore, there is a need for a dual plate check valve. Such a needed device would be simple, cost effective, constructed entirely of stainless steel and would function over a long period of time without any maintenance. Further, such a needed device would provide a fast-locking mechanism to prevent a large amount of water/fluid loss when fire hydrants and/or pipelines are damaged by vehicles or other forces. Such a needed device would have an emergency warning system to alert individuals when the fire hydrants and/or pipelines are damaged. The dual plate check valve assembly or companion flange can also incorporate electronic sensing devices relaying real time data on fluid pressure, quality, audio and video images and movement. Moreover, such a device would include a fluid back flow prevention system to prevent contamination of the water/fluid system. Such a device would be easy to install under wet barrel fire hydrants and/or in line with pipelines and would be reinstalled or replaced under or in line with an existing fire hydrant and/or pipeline. The device will minimize the need for first responders to be exposed to hazardous situations. The above ground and resettable in the field device eliminates the need to replace the device as it also reduces property damage caused by the inundation of water or fluids. The device incorporates several proprietary designs which may be patentable as singular inventions. They are incorporated in this one application to describe its utility in the fluid flow/fire hydrant application and are not limited to other applications. Finally, such a needed device would reduce the cost of collateral damage caused by water and/or fluids gushing from damaged pipes. The present embodiment accomplishes these objectives.

SUMMARY OF THE INVENTION

A break-away check valve is provided. The valve may be configured between two passageways and may regulate the flow of liquid between the passageways. The valve may include an actuation assembly that may actuate the valve upon the system becoming dislodged or otherwise dislocated from at least one of the passageways. In some implementations, the valve may be configured between a water main and a hydrant to stop flow to the hydrant upon the hydrant becoming at least partially dislodged from the valve (e.g., due to impact from an errant vehicle).

In one aspect, the invention provides a valve adapted to open and close, the valve comprising:

a housing with a top surface and a bottom surface, and an opening passing through the housing from the top surface to the bottom surface;

a first valve pin configured with the housing and a second valve pin configured with the housing a first valve hub adapted to rotate about the first valve pin, and a second valve hub adapted to rotate about the second valve pin;

a first valve plate configured with the first valve hub and adapted to transition from a first first valve plate position to a second first valve plate position;

a second valve plate configured with the second valve hub and adapted to transition from a first second valve plate position to a second second valve plate position;

a first keeper pin configured with the first hub and adapted to transition from a first first keeper pin position to a second first keeper pin position;

wherein the first keeper pin in the first first keeper pin position locks the first valve plate in the first first valve plate position; and wherein the first keeper pin in the second first keeper pin position unlocks the first valve plate from the first first valve plate position.

In some embodiments, the first keeper pin includes a first keeper pin top that is generally flush with the housing's top surface when the first keeper pin is in the first first keeper pin position, and that is positioned above the housing's top surface when the first keeper pin is in the second first keeper pin position.

In some embodiments, the valve includes a second keeper pin configured with the second hub and adapted to transition from a first second keeper pin position to a second second keeper pin position;

wherein the second keeper pin in the first second keeper pin position locks the second valve plate in the first second valve plate position; and wherein the second keeper pin in the second second keeper pin position unlocks the second valve plate from the first second valve plate position.

In some embodiments, the first valve plate in the first first valve plate position and the second valve plate in the first second valve plate position opens the valve.

In some embodiments, the first valve plate in the second first valve plate position and the second valve plate in the second second valve plate position closes the valve.

In some embodiments, the first hub includes a first hub notch, and the first keeper pin in the first first keeper pin position engages the first hub notch.

In some embodiments, the second hub includes a second hub notch, and the second keeper pin in the first second keeper pin position engages the second hub notch.

In some embodiments, the valve includes a first spring adapted to apply a first force to the first hub to move the first valve plate from the first first valve plate position to the second first valve plate position.

In some embodiments, the first valve plate and the second valve plate are configured within the opening.

In one aspect, the invention provides a valve adapted to open and close, the valve comprising:

a housing with a top surface and a bottom surface, and an opening passing through the housing from the top surface to the bottom surface;

a first valve pin configured with the housing and a second valve pin configured with the housing a first valve hub adapted to rotate about the first valve pin, and a second valve hub adapted to rotate about the second valve pin;

a first valve plate configured with the first valve hub and adapted to transition from a first first valve plate position to a second first valve plate position;

a second valve plate configured with the second valve hub and adapted to transition from a first second valve plate position to a second second valve plate position;

a first keeper pin configured with the first hub and adapted to transition from a first first keeper pin position to a second first keeper pin position;

wherein the first keeper pin in the first first keeper pin position locks the first valve plate in the first first valve plate position; and wherein the first keeper pin in the second first keeper pin position places the first valve plate in the second first valve plate position.

In some embodiments, the first keeper pin includes a first keeper pin top that is generally flush with the housing's top surface when the first keeper pin is in the first first keeper pin position, and that is positioned above the housing's top surface when the first keeper pin is in the second first keeper pin position.

In some embodiments, the valve includes a second keeper pin configured with the second hub and adapted to transition from a first second keeper pin position to a second second keeper pin position;

wherein the second keeper pin in the first second keeper pin position locks the second valve plate in the first second valve plate position; and wherein the second keeper pin in the second second keeper pin position places the second valve plate in the second second valve plate position.

In some embodiments, the second hub includes at least one second hub notch, and the second keeper pin includes at least one second keeper pin ridge, and the at least one second keeper pin ridge engages the at least one second hub notch.

In some embodiments, the first valve plate in the first first valve plate position and the second valve plate in the first second valve plate position opens the valve.

In some embodiments, the first valve plate in the second first valve plate position and the second valve plate in the second second valve plate position closes the valve.

In some embodiments, the first hub includes at least one first hub notch, and the first keeper pin includes at least one first keeper pin ridge, and the at least one first keeper pin ridge engages the at least one first hub notch.

In some embodiments, the valve includes a first spring adapted to apply a first force to the first hub to move the first valve plate from the first first valve plate position to the second first valve plate position.

In some embodiments, the first spring is adapted to apply the first force to the first keeper pin and the first keeper pin is adapted to apply the first force to the first hub.

In some embodiments, the first valve plate and the second valve plate are configured within the opening.

In one aspect, the invention provides a valve adapted to open and close, and configured between a first passageway and a second passageway, the valve comprising:

a housing with a top surface adapted to connect to the first passageway and a bottom surface adapted to connect to the second passageway;

an opening passing through the housing from the top surface to the bottom surface;

a first valve pin configured with the housing and a second valve pin configured with the housing a first valve hub adapted to rotate about the first valve pin, and a second valve hub adapted to rotate about the second valve pin;

a first valve plate configured with the first valve hub and adapted to transition from a first first valve plate position to a second first valve plate position;

a second valve plate configured with the second valve hub and adapted to transition from a first second valve plate position to a second second valve plate position;

a first keeper pin configured with the first hub and adapted to transition from a first first keeper pin position to a second first keeper pin position, wherein the first keeper pin is locked in the first first keeper pin position when the housing's top surface is connected to the first passageway and is released from the first first keeper pin position with the housing's top surface is at least partially disconnected from the first passageway;

wherein the first keeper pin in the first first keeper pin position locks the first valve plate in the first first valve plate position; and wherein the first keeper pin in the second first keeper pin position unlocks the first valve plate from the first first valve plate position.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

FIGS. 9A-9H show aspects of a valve assembly according to exemplary embodiments herein;

FIGS. 24-24A show aspects of an attachment assembly according to exemplary embodiments herein;

DETAILED DESCRIPTIONS OF EXEMPLARY EMBODIMENTS

The following describes example embodiments in which the present invention may be practiced. This invention, however, may be embodied in many different ways, and the description provided herein should not be construed as limiting in any way.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

A system or framework 10 according to exemplary embodiments hereof is described here with reference to the figures.

In general, the system 10 may include a device, mechanism or system that may stop, regulate and/or control the flow of a fluid, liquid or gas through a passageway such as a pipe, water main, hydrant, tube, hose, conduit, pipeline, duct, channel or other type of passageway. The system 10 may also include a device, mechanism or system that may stop, regulate and/or control the flow of a fluid, liquid or gas between any combinations of passageways, and/or through any junctions between any passageways or combinations of passageways.

Figure 1:
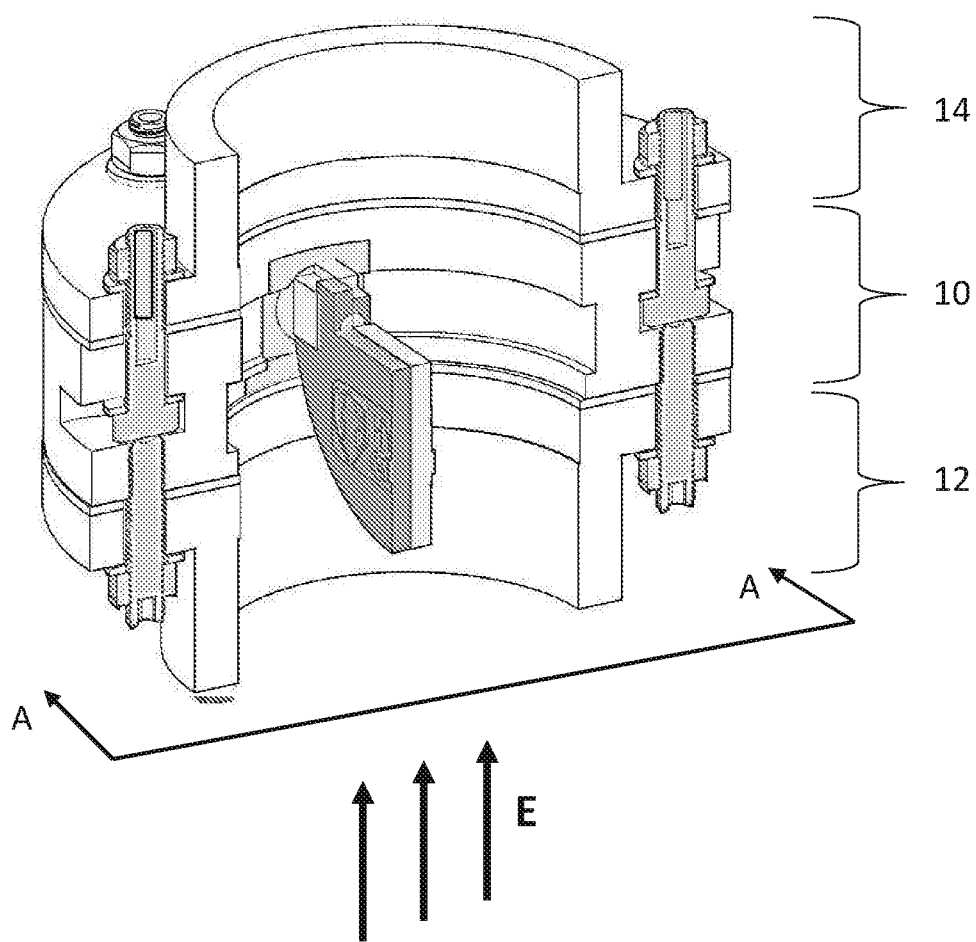
FIGS. 1-2 show aspects of a breakaway check valve according to exemplary embodiments herein.

For example, according to one exemplary embodiment as shown in FIG. 1, the system 10 may be configured between a first water passageway 12 and a second water passageway 14 and may control the water flow there through. In this case, the system 10 may include one or more valves (e.g., variable valves, check valves, stop valves, etc.) that may be positioned between the first water passageway 12 and the second water passageway 14, and the one or more valves may control the flow of water between the two 12, 14. Note that the valve assembly shown in FIG. 1 is meant for demonstration and may not represent all of the embodiments described herein.

In one example of this type, the first water passageway 12 may be a water main pipeline 12, the second water passageway 14 may be a fire hydrant 14, and the system 10 may be configured between the water main 12 and the hydrant 14. In this example, the system 10 may include a break-off check valve that may stop the flow of water from the water main 12 to the hydrant 14 in the event of the hydrant 14 becoming dislocated and/or dislodged (partially or completely) from the water main 12 and/or the system 10 (e.g., in the event of an accident between an automobile and the hydrant 14).

In another example, the first water passageway may be a first section of a water delivery pipe 12 and the second water passageway may be a second section of a water delivery pipe 14, and the system 10 may regulate the flow of water between the first and second water delivery pipes 12, 14.

Figure 2:
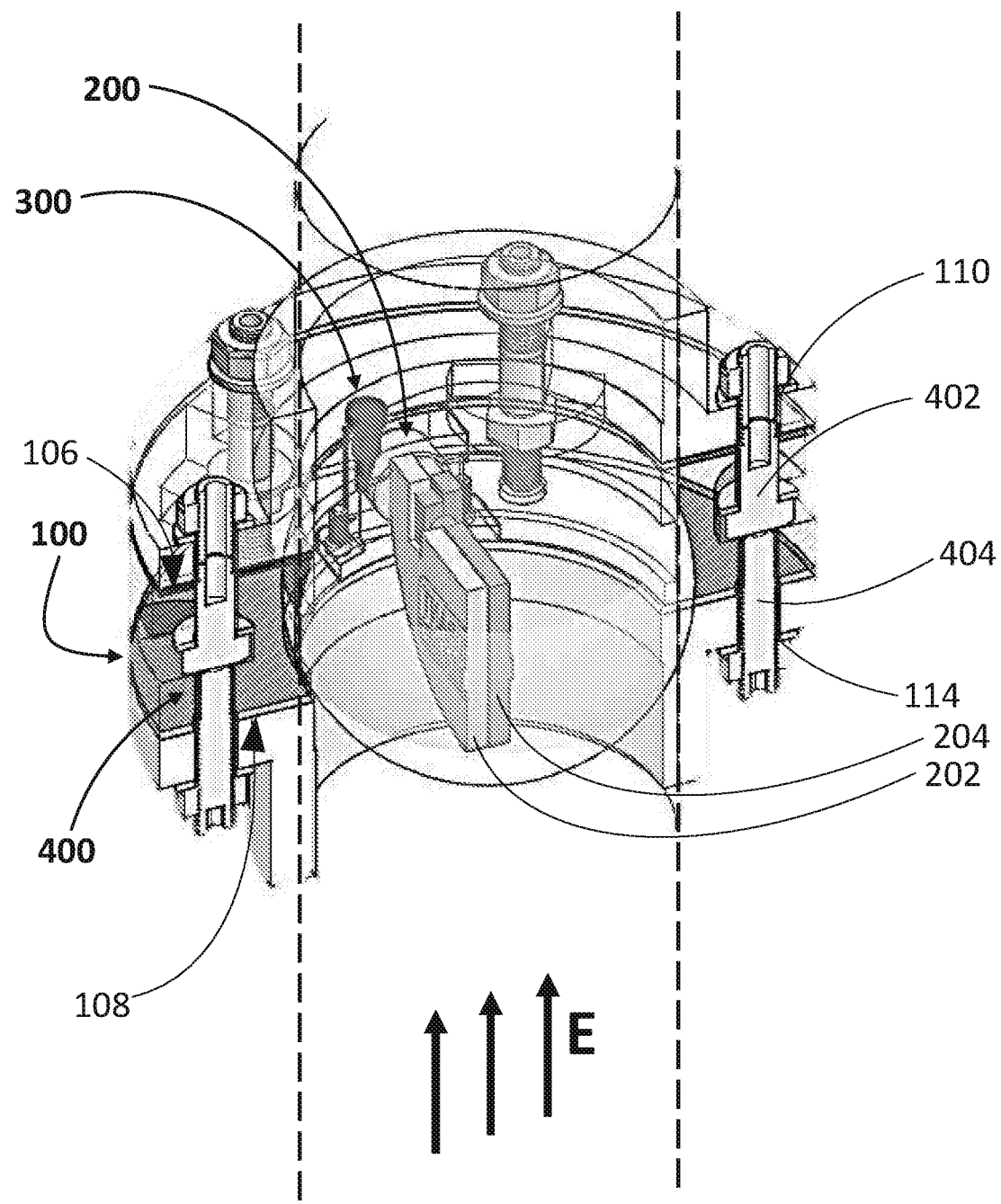

As shown in FIG. 2 (cut-away view of the system 10 along the cut lines A-A of FIG. 1), in one exemplary embodiment hereof the system 10 may include a housing assembly 100, a valve assembly 200, an actuation assembly 300, and an attachment assembly 400. The system 10 may also include other elements as necessary for the system 10 to perform its functionalities. The details of the assemblies 100, 200, 300, 400 will be given in other sections. In addition, the relative sizes, positions and orientations of the assemblies 100, 200, 300, 400 as shown may not reflect the actual relative sizes, positions or orientations of the assemblies 100, 200, 300, 400, and the assemblies 100, 200, 300, 400 may be configured in any way as required by the system 10.

For the purpose of this specification and for demonstration, the system 10 and its use will be described in relation to a water main pipeline 12 and a fire hydrant 14 as described in the example above. However, it will be understood by a person of ordinary skill in the art, upon reading this specification, that the system 10 may be installed, configured, mounted, integrated or generally utilized by any types of fluid or gas passageways that may benefit from the system 10. It is understood that the scope of the system 10 is not limited in any way by the passageway(s) with which the system 10 may be utilized or configured.

Figure 2A:
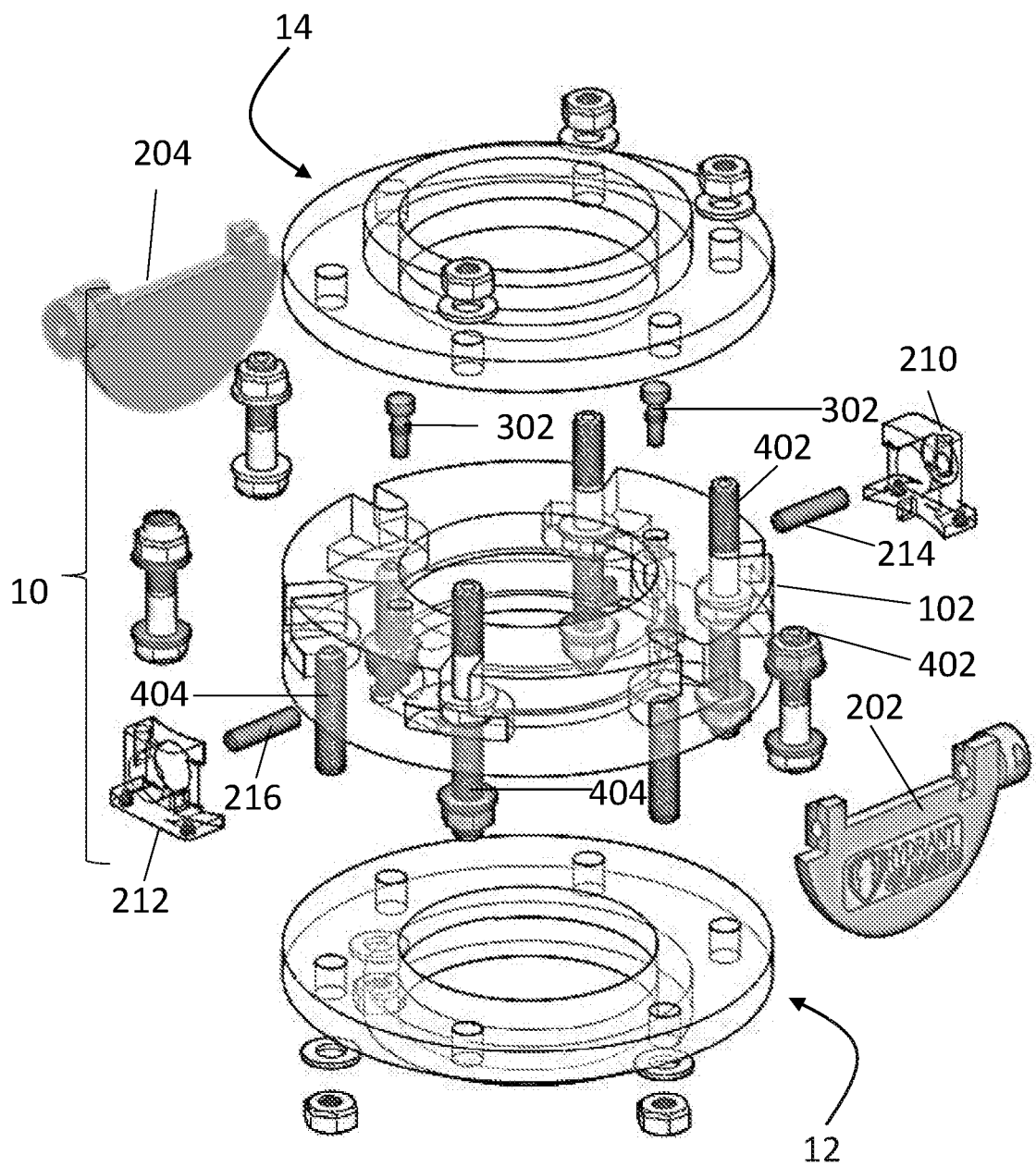
FIGS. 2A-2AA show an exploded view of aspects of a breakaway check valve according to exemplary embodiments herein.
Figure 2A:
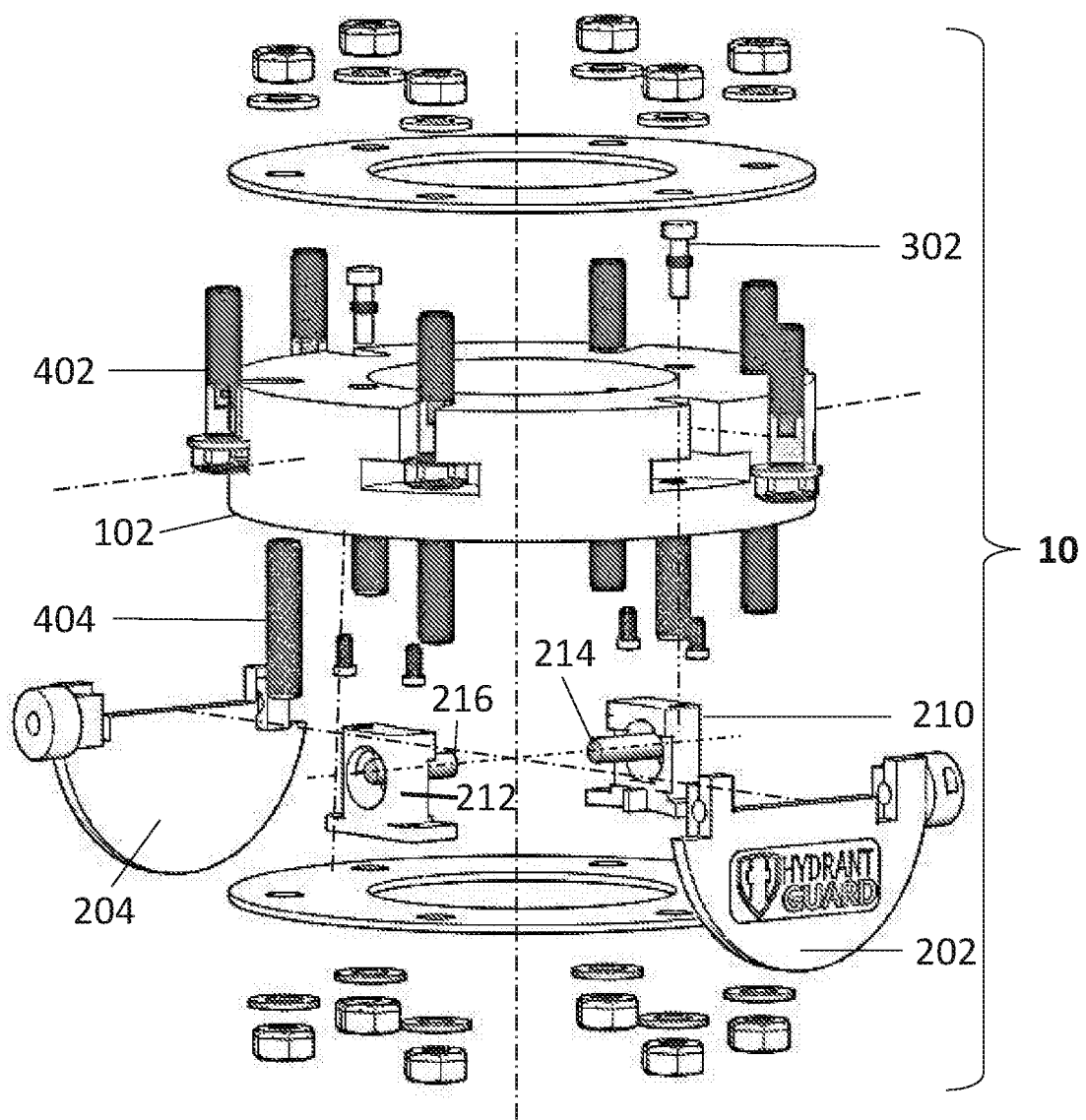

FIG. 2A shows an exploded view of the system 10 according to exemplary embodiments hereof.

System Overview

In one exemplary embodiment hereof, the system 10 may be generally configured between the water main 12 and the fire hydrant 14, and when secured, may regulate the flow of water from the water main 12 to the hydrant 14. The housing 100 may include a barrel 102 with an inner opening 104 (depicted by the dashed lines in FIG. 2) that may extend from one side of the barrel 102 (e.g., the top side 106) to a second side of the barrel 102 (e.g., the bottom side 108). The valve assembly 200 may be configured within the opening 104 within the barrel 102, and may regulate the water flow there-through. In this example, with the valve assembly 200 fully or at least partially open, the water may flow from the water main 12 through the valve 200 and into the hydrant 14. Conversely, with the valve assembly 200 closed, the water may not flow through the barrel 102.

The system 10 may be secured to the water main 12 and to the hydrant 14 by the attachment assembly 400. In one preferred embodiment, the attachment assembly 400 may include bolts and/or break-away bolts as will be described in other sections. Other types of attachment mechanisms may also be used.

The actuating assembly 300 may actuate or otherwise control the valve assembly 200. In one exemplary embodiment hereof, the actuating assembly 300 may hold the valve assembly 200 in a generally open configuration (so that water may flow through the barrel 102), and then when triggered, may cause the valve assembly 200 to transition from an open configuration to a closed configuration (so that water may not flow through the barrel 102).

In one exemplary embodiment hereof, the actuating assembly 300 may be triggered to close the valve assembly 200 upon the detachment (partial or complete) of the system 10 from the water main 12, the hydrant 14, or any combination thereof. For example, if an automobile were to collide with the hydrant 14, causing the hydrant 14 to become separated or otherwise detached from the barrel 102 (e.g., the break-away bolts of the attachment assembly 400 may break causing the attachment assembly 400 to release the hydrant 14) the actuating assembly 300 may trigger the valve assembly 200 to close so that water may no longer flow through the system 10. In this way, water may not flow out the broken junction between the system 10 and the hydrant 14.

Additional details regarding the assemblies 100, 200, 300, 400 and the configuration of the system 10 with a water main pipeline 12 and a fire hydrant 14 (or other types of passageways) will be described in further detail.

Housing Assembly

Figure 3:
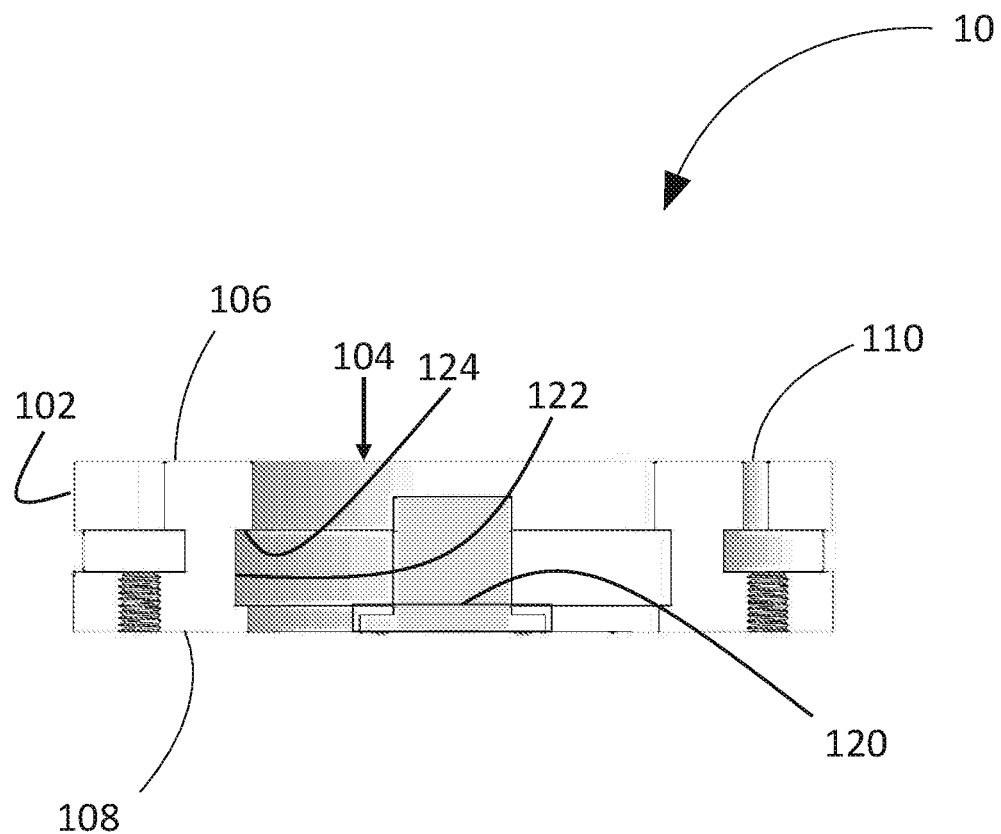
FIGS. 3-5B show aspects of a housing assembly according to exemplary embodiments herein.

In one exemplary embodiment hereof as shown in FIG. 3 (cut-away view of the housing 100 along cut lines A-A of FIG. 10), FIG. 4, FIG. 5, FIG. 5A and FIG. 5B, the housing assembly 100 may include a barrel 102 with an inner opening 104 that may extend from one side of the barrel 102 (e.g., the top side 106) to a second side of the barrel 102 (e.g., the bottom side 108). It may be preferable that the inner opening 104 be generally centered with respect to the outer circumference of the barrel 102, but this may not be required. It may also be preferable that the opening 104 have a generally constant radius from the top 106 to the bottom 108 (with the exception of the valve sealing surface 122 as will be described in other sections), but this may not be required.

The barrel 102 may include upper mounting flange holes 110 that may receive and house upper mounting bolts 402, and lower mounting flange holes 114 that may receive and house lower mounting bolts 404. As will be described in other sections, the upper mounting bolts 402 may secure the upper portion 106 of the system 10 to the fire hydrant 14, and the lower mounting bolts 404 may secure the lower portion 108 of the system 10 to the water main 12.

In one exemplary embodiment hereof, the barrel 102 may include one or more keeper pin flange holes 118 that may be configured with one or more keeper pins 302 respectively. The keeper pins 302 will be described in other sections.

The barrel 102 also may include one or more valve holder areas 120 positioned on the inner circumferential surface of the opening 104 within the barrel 102 that may receive and secure the valve assembly 200 within the opening 104. In one preferred embodiment hereof, each valve holder area 120 may include a recess or slot that may receive and secure a valve holder 210, 212 (as will be described in other sections). However, the valve holder areas 120 may be flush with the inner surface of the opening 104 or otherwise. It may be preferable that the barrel 102 include two valve holder areas 120 opposite from one another within the opening 104 such that the holder areas 120 may receive and secure the valve holders 210, 212 respectively as the valve assembly 200 may generally extend across the opening 104. This will be described in other sections.

In one exemplary embodiment hereof, the opening 104 may include a valve sealing surface 122 about its inner circumference that may seal the valve assembly 200 within the opening 104 when the valve assembly 200 may be in a closed configuration. In this way, the valve sealing surface 122 may ensure a sealed junction between the valve assembly 200 and the opening 104 without leaks, gaps or disjoints so that no water may pass through the valve assembly 200 when the assembly 200 is in the closed position.

The valve sealing surface 122 may include a rim or lip that may extend circumferentially about the inner surface of the opening 104. As such, the rim or lip of the valve sealing surface 122 may include a downward facing surface 124 that may make contact with the valve plates when the valve plates are in the closed position. This will be described in further detail in other sections.

Valve Assembly

In one exemplary embodiment hereof as shown in FIGS. 6-9, the system 10 may include a valve assembly 200. The valve assembly 200 may include without limitation a front valve plate 202, a back valve plate 204, a front valve hub 206, a back valve hub 208, a front valve holder 210, a back valve holder 212, a front alignment pin 214 and a back alignment pin 216. In addition, the front valve hub 206 may include a front pin hole 218, and the back valve hub 208 may include a back pin hole 220. Also, the front valve plate 202 may include a second front section 221 with a second front alignment pin hole 222, and the back valve plate 204 may include a second back section 223 with a second back alignment pin hole 224.

Figure 7:
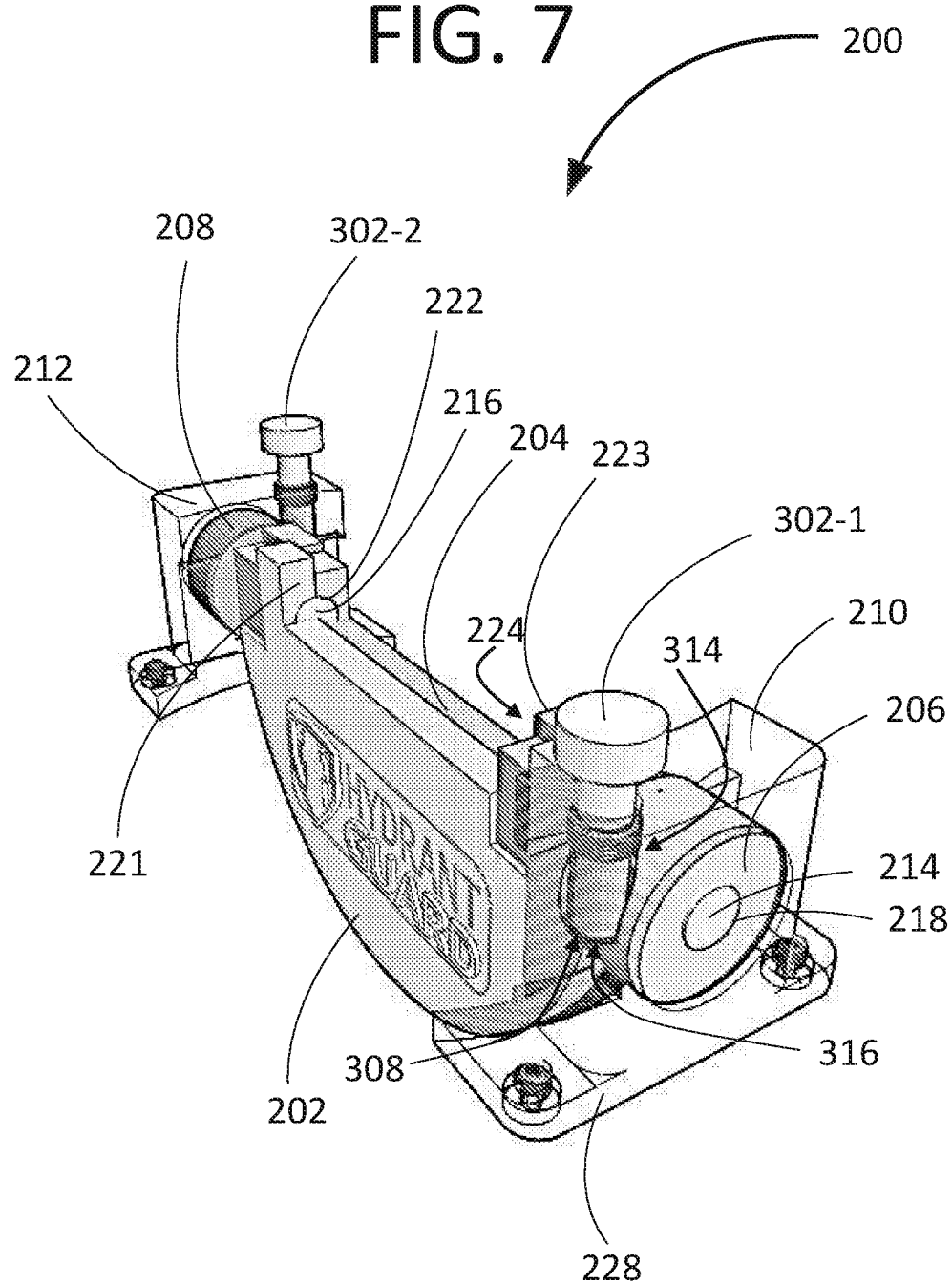
Figure 8:
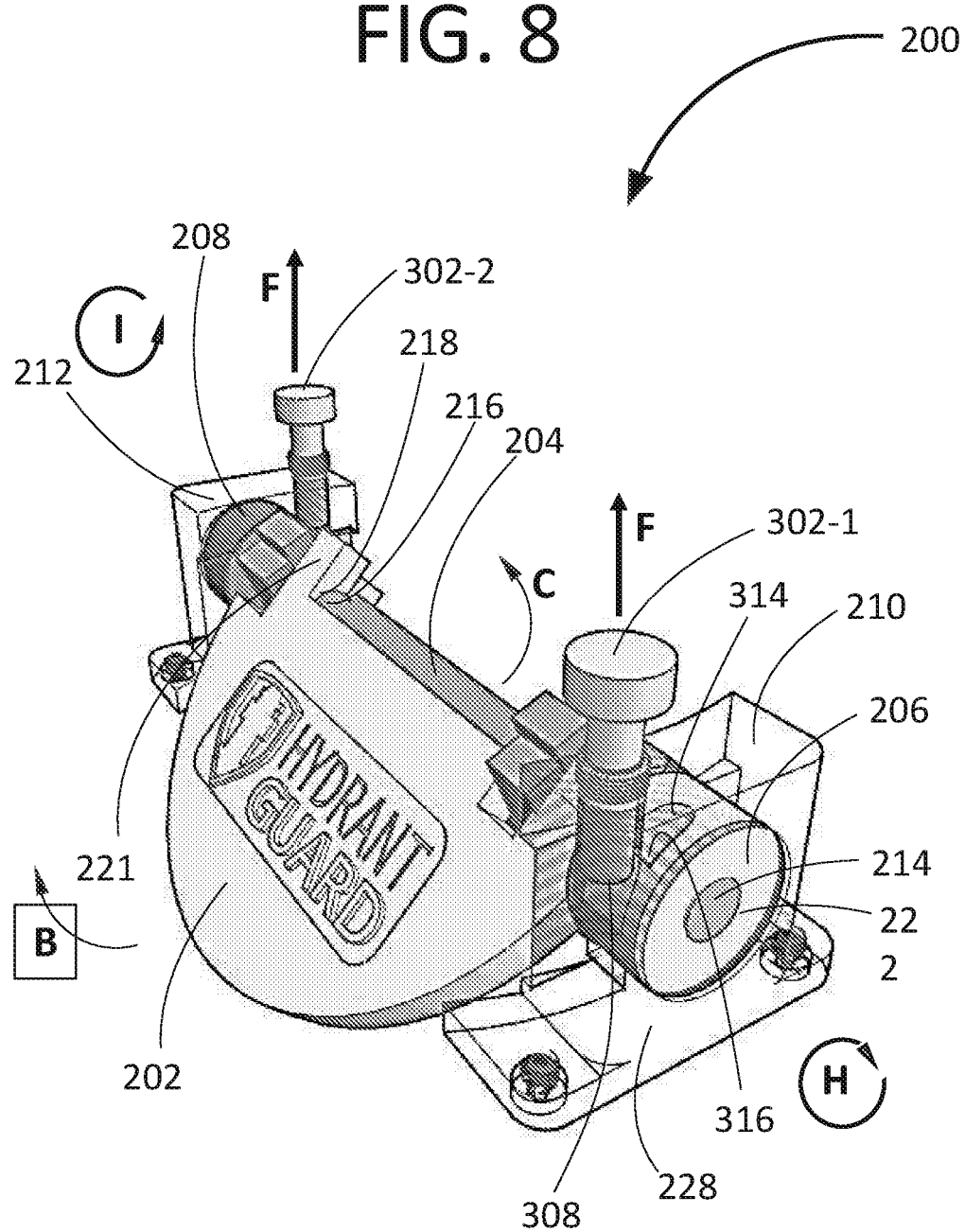
Figure 9:
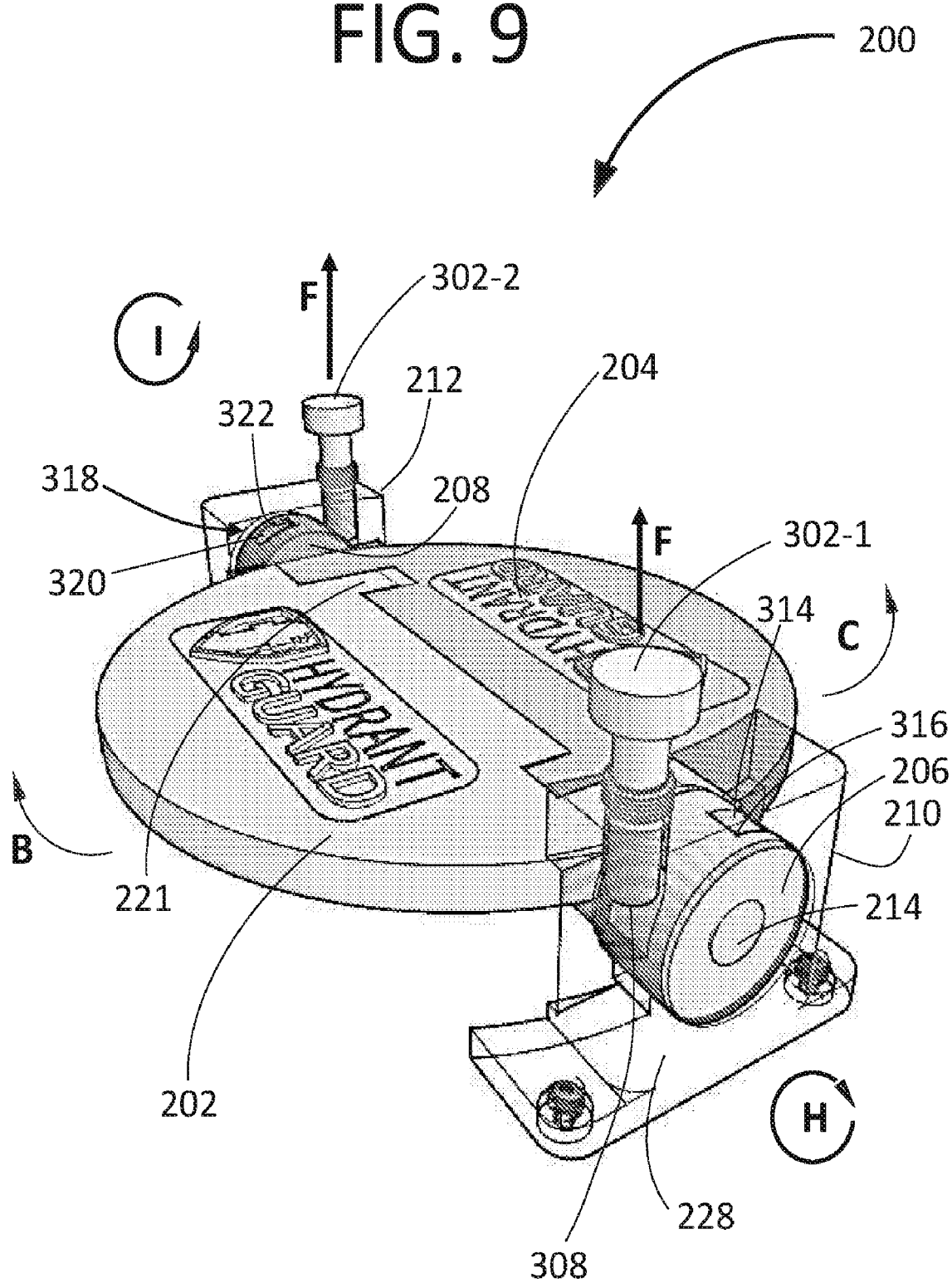

As shown in the FIGS. 7-9, the valve assembly 200 may be configured with the front alignment pin 214 passing through the front pin hole 218 of the front valve plate's front valve hub 206, and through the second back alignment hole 224 in the second back section 223 of the back valve plate 204. In this way, the front valve plate 202 and the back valve plate 204 may be secured together with each plate 202, 204 rotatable about the longitudinal axis of the front alignment pin 214. In addition, the back alignment pin 216 may pass through the back pin hole 220 of the back valve plate's back valve hub 208, and through the second front alignment hole 222 in the second front section 221 of the front valve plate 202. In this way, the back valve plate 204 and the front valve plate 202 may be secured together with each plate 202, 204 rotatable about the longitudinal axis of the back alignment pin 216.

The front valve hub 206 may be configured with the front valve holder 210, and the back valve hub 208 may be configured with the back valve holder 212. The front and back valve holders 210, 212 may then be configured within the opening 104 of the barrel 102 to generally configure the valve assembly 200 with the barrel 102. This will be described in detail in other sections.

Figure 6:
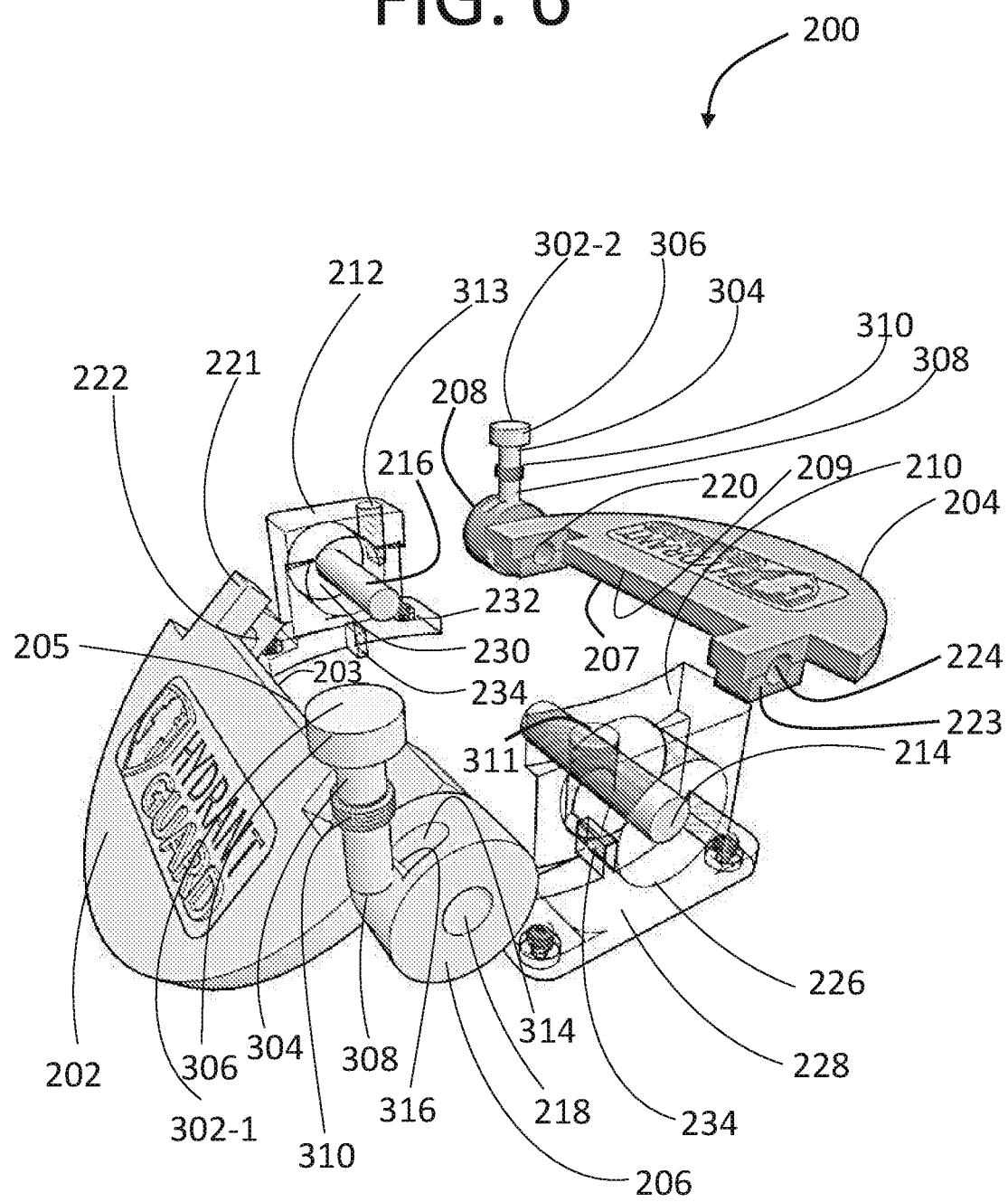
FIG. 6-9 show aspects of a valve assembly according to exemplary embodiments herein.

In some embodiments as best seen with reference to valve plate 204 and its associated hub 208 and second back section 223 of FIG. 6, the center of the hub's back pin hole 220 and the center of the second back section's alignment pin hole 224 are both generally aligned with the lower edge 207 of the plate's inner side surface 209. In addition, the center of the front hub's front pin hole 218 and the center of the second front section's alignment pin hole 222 are both generally aligned with the lower edge 203 of the inner side surface 205 of the valve plate 202. In this way, when the valve plates 202, 204, corresponding hubs 206, 208 and corresponding second back and front sections 223, 221 are configured together with alignment pins 214, 216 and front and back valve holders 210, 212, respectively, and are positioned in their fully downward and open positions as shown in FIG. 7, the inner surfaces of the plates 202, 204 may be generally abutted against one another as shown.

Implementing distinct front and back alignment pins 214, 216 eliminates the need for a conventional valve pin extending across both plates 202, 204 from the hub 206 to the hub 208 (which would inherently increase the width of the combined two valve plates 202, 204). This reduces the bulk of the plates 202, 204, especially when the plates 202, 204 are in their fully downward positions. In addition, by aligning the front and back alignment pin holes 218, 220 with the inner side surfaces of the valve plates 202, 204, the plates 202, 204 may generally abut one another when in their fully downward position thereby reducing drag through the opening 104. This configuration may maximize the water flow rate through the opening 104, increase overall stability and decrease potential vibrations that may occur when the hydrant 14 may be in use.

Figure 9A:
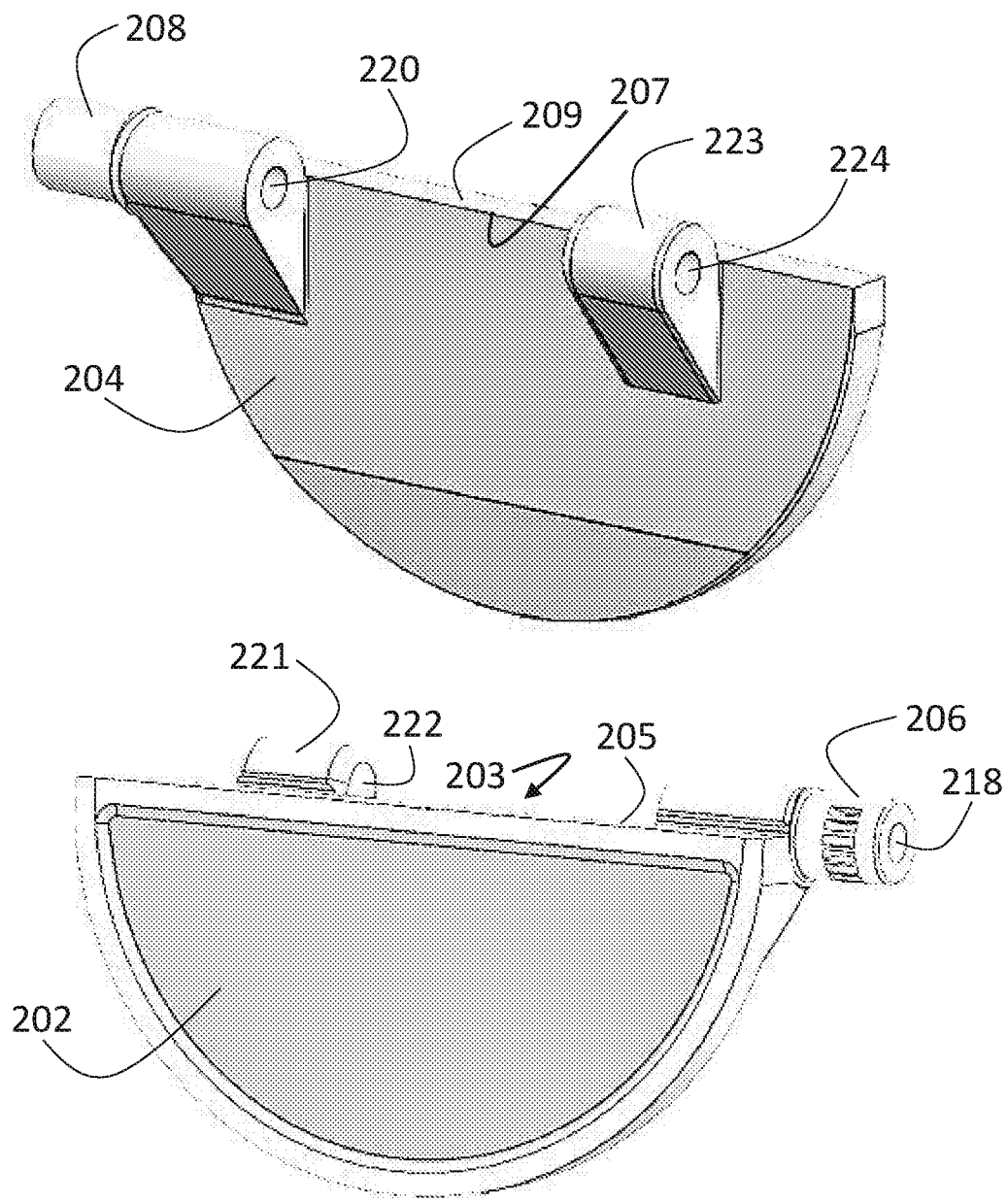
FIG. 9A shows aspects of valve plates according to exemplary embodiments herein.

In another embodiment as shown in FIG. 9A, the center of the back valve hub's back pin hole 220 and the center of the second back section's alignment pin hole 224 are both generally laterally offset from the lower edge 207 of the plate's inner side surface 209. For example, in some embodiments, the center of the holes 220, 224 are offset by 1 mm-10 mm from the lower edge 207 of the plate's inner side surface 209. Other offset distances also may be used.

In addition, the center of the front hub's front pin hole 218 and the center of the second front section's alignment pin hole 222 are both generally laterally offset from the lower edge 203 of the inner side surface 205 of the valve plate 202. For example, in some embodiments, the center of the holes 218, 222 are offset by 1 mm-10 mm from the lower edge 203 of the plate's inner side surface 205. Other offset distances also may be used.

Figure 9B:
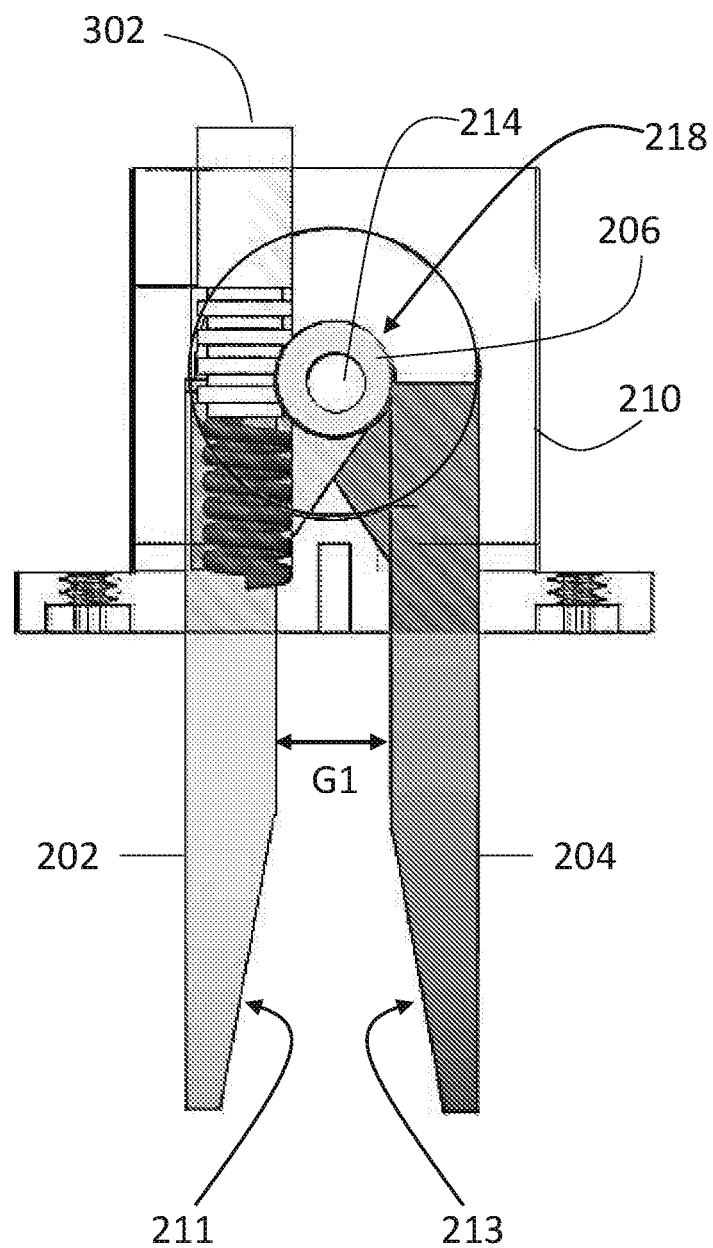

Accordingly, when configured with front and back alignment pins 214, 216 and hub holders 210, 212, respectively, as shown in FIG. 9B, the inner side surfaces of the valve plates 202, 204 may be generally separated from one another by a gap G1 when in their fully downward position. In some embodiments, the amount of separation (the width of the gap G1) may generally equal the sum of the lateral offset between the center of the hub's back pin hole 220 and the back valve plate's lower edge 207 plus the lateral offset between the center of the hub's front pin hole 218 and the front valve plate's lower edge 203.

In some embodiments as shown in FIG. 9B, with the valve plates 202, 204 in their fully downward and open position, and separated as described above, water passing upward past the valve plates 202, 204 may pass on either side of the plates 202, 204 as well as through the gap G1 between the plates 202, 204. Because the front and back alignment pins 214, 216 only pass through the hubs 206, 208 and the second front and back sections 221, 223, and because the valve plates 202, 204 are separated by a gap G1 therebetween, water may pass upward through the gap G1. This configuration may provide a streamlined and low drag water passageway through the opening 104.

In some embodiments as shown in FIG. 9B, the bottom portions of the valve plates 202, 204 may each include a beveled portion 211, 213 (tapered towards the outer edges), respectively, to further streamline the footprint of the valve plates 202, 204 in this configuration. In this way, the plates 202. 204 may be more streamlined and water passing upward past the plates 202, 204 may encounter less obstruction and drag. While the beveled portion 211, 213 are depicted as being positioned on the inner facing surfaces, it is understood that the beveled portions 211, 213 also be positioned on the outer facing surfaces, or any combination thereof. Also note that water passing upward past the plates 202, 204 may pass through the gap G1 since the middle portion between the plates 202, 204 may be unobstructed from bottom to top (no alignment pin(s) in the middle portion of the combined plates 202, 204).

In one exemplary embodiment hereof, the front valve hub 206 may be integrated with the front valve plate 202 during the manufacturing process. For example, the front valve hub 206 and the front valve plate 202 may be cast together as a single cast. In another example, the front valve hub 206 and the front valve plate 202 may be welded together, bolted together, screwed together or attached together using other attachment mechanism or methods, and any combination thereof. Similarly, the back valve hub 208 may be integrated with the back valve plate 204 during the manufacturing process. For example, the back valve hub 208 and the back valve plate 204 may be cast together as a single cast. In another example, the back valve hub 208 and the front valve plate 204 may be welded together, bolted together, screwed together or attached together using other attachment mechanism or methods, and any combination thereof. This may provide additional strength to the valve plate 202, 204 valve hub 206, 208 combinations, respectively.

In addition, producing the valve plates 202, 204 and corresponding valve hubs 206, 208, respectively, as solid and/or single units also may eliminate the need for offset hinges and/or additional support elements across the center region of the opening 104 as may be required by other valve plates that may be attached in other openings by use of valve pins.

Next, the front valve holder 210 may include a front holder opening 226 and a front valve holder base 228. The front holder opening 226 may be configured to receive and generally secure the front valve hub 206. It may be preferable that the front holder opening 226 have a cross-section that may be circular so that the front valve hub 206 (which may also preferably have a circular cross-section that corresponds to the cross-section of the front holder opening 226) may fit within the opening 226 and freely rotate therein (along the longitudinal axis of the alignment pin 214 as described). In this way, the front valve hub 206 and the front alignment pin 214 may be secured within the opening 226 of front valve holder 210.

The front valve holder 210 may be received by and secured within a valve holder recess 120 on an inner surface of the opening 104 (see FIG. 4) of the barrel 102 (FIG. 3). As will be described in other sections, the front valve holder base 228 may include attachment mechanisms (e.g., bolts, nuts, screws) that may be used to secure the front valve holder 210 within the valve holder area 120 (e.g., within the valve holder area's recess).

Likewise, the back valve holder 212 (see FIG. 6) may include a back holder opening 230 and a back valve holder base 232. The back holder opening 230 may be configured to receive and generally secure the back valve hub 208 (see FIG. 7). It may be preferable that the back holder opening 230 have a cross-section that may be circular so that the back valve hub 208 (which may also preferably have a circular cross-section that corresponds to the cross-section of the back holder opening 230) may fit within the opening 230 and freely rotate therein (along the longitudinal axis of the alignment pin 216 (see FIG. 6) as described). In this way, the back valve hub 208 and the back alignment pin 216 may be secured within the opening 230 of the back valve holder 212.

The back valve holder 212 may be received by and secured within a valve holder area 120 on an inner surface of the opening 104 of the barrel 102 (FIG. 3). As will be described in other sections, the back valve holder base 232 (see FIG. 6) may include attachment mechanisms (e.g., bolts, nuts, screws) that may be used to secure the back valve holder 212 within the valve holder area 120 (e.g., within the valve holder area's recess).

The result of the above configuration is shown in FIGS. 6-9. FIG. 7 shows the valve assembly 200 in the open configuration with the front and back valve plates 202, 204 rotated downward. FIG. 8 shows the valve assembly 200 in a partially closed configuration with the front valve plates 202 rotated upward in the direction of the arrow B and the back valve plate 204 partially rotated upward in the direction of the arrow C. And as the front valve plate 202 may continue to rotate upward in the direction of the arrow B to its stop position, and as the back valve plate 204 may continue to rotate upward in the direction of the arrow C to its stop position, the valve assembly 200 may transition to the closed configuration as shown in FIG. 9.

It may be preferable that when the front and back valve plates 202, 204 are both in their upward and closed configuration (FIG. 9), that the junction between the plates 202, 204 may be water tight and free of leaks. In this way, no water may pass through the junction between the valve plates 202, 204 when the valve 200 may be closed.

Housing Assembly and Valve Assembly Configured Together

Figure 10:
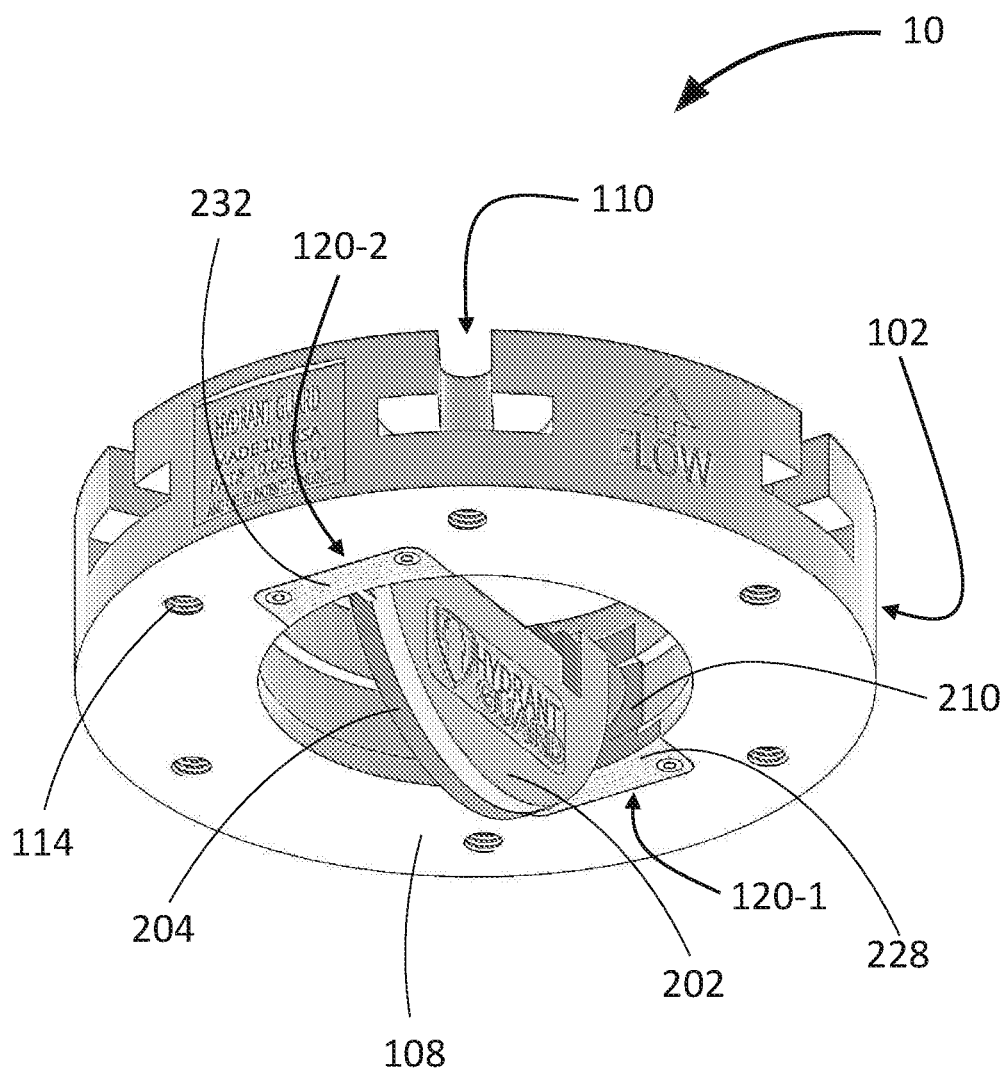
FIGS. 10-18 show aspects of a valve assembly configured with a housing assembly according to exemplary embodiments herein.

In one exemplary embodiment hereof as shown in FIGS. 10-18, the valve assembly 200 may be configured within the central opening 104 of the housing assembly 100. In one preferred implementation, the opening 104 may include two valve holder areas 120-1 and 120-2 (best seen in FIGS. 5 and 5B). As shown in FIG. 10, the front valve holder 210 and its base 228 may be received by and secured into the valve holder recesses 120-1, and the back valve holder 212 and its base 232 may be received by and secured into the valve holder area 120-2 (or vice versa).

It may be preferable that the valve holder recess 120-1, 120-2 may each include a recess, channel or other type of area that may receive the valve holders 210, 212 and their bases 228, 232, respectively, such that the valve holders 210, 212 and their bases 228, 232 may be fully incorporated within the valve holder areas 120-1, 120-2 (e.g., may be flush with the inner surface of the opening 104 and the bottom 108 of the barrel 102). In this configuration, the valve holders 210, 212, when configured within the valve holder areas 120-1, 120-2 respectively, may not interfere with the functionalities of the valve assembly 200 when the valve assembly 200 may be configured within the opening 104. As shown, the front valve holder base 228 and the back valve holder base 232 may each include attachment mechanisms (e.g., bolts, nuts, screws) that may secure the valve holders 210, 212, within the valve holder areas 120-1, 120-2, respectively. In this way, the valve assembly 200 may be securely attached within the opening 104 of the barrel 102, and the front valve plate 202 and the back valve plate 204 may each rotate freely as required to fulfill the functionality of the valve assembly 200.

Figure 11:
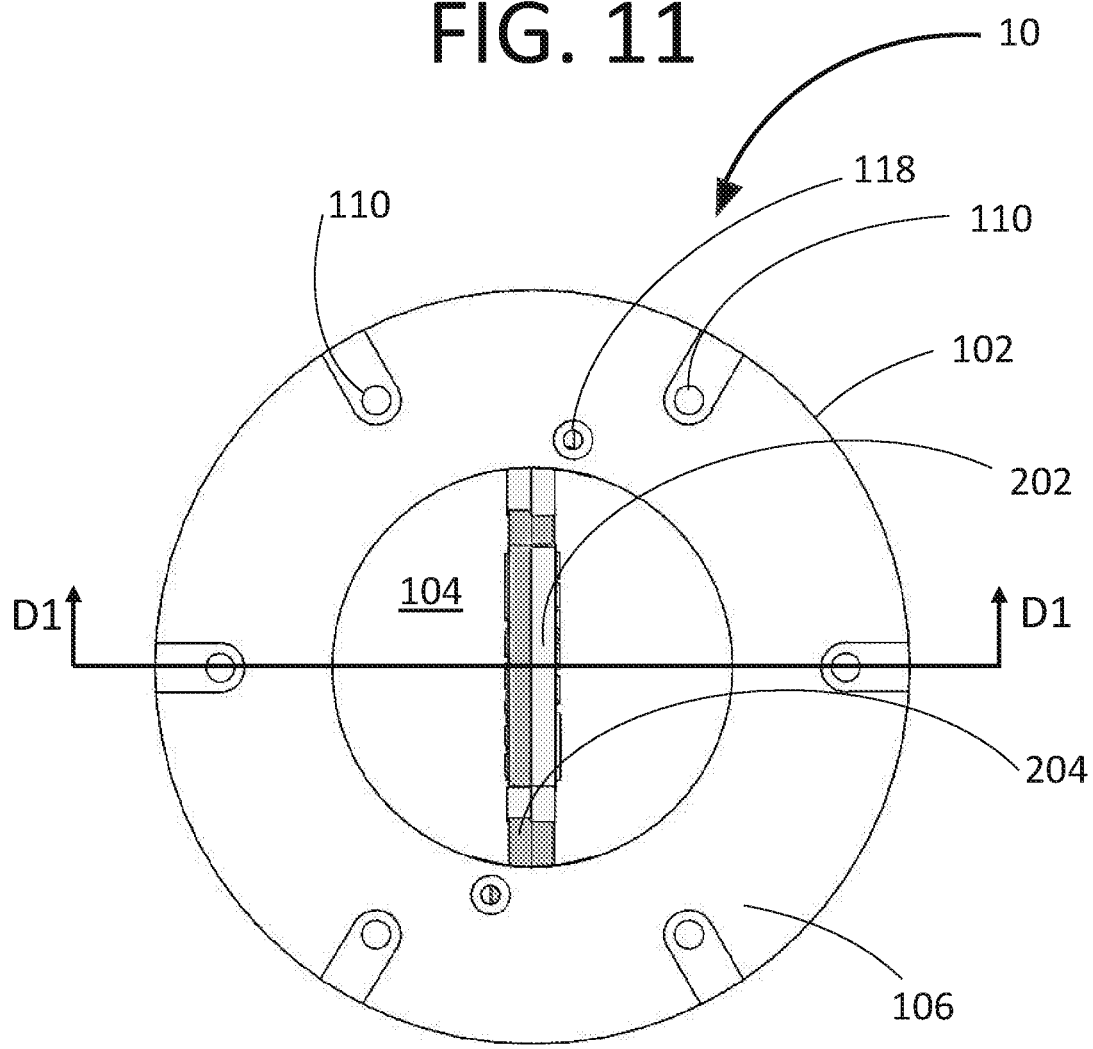
Figure 12:
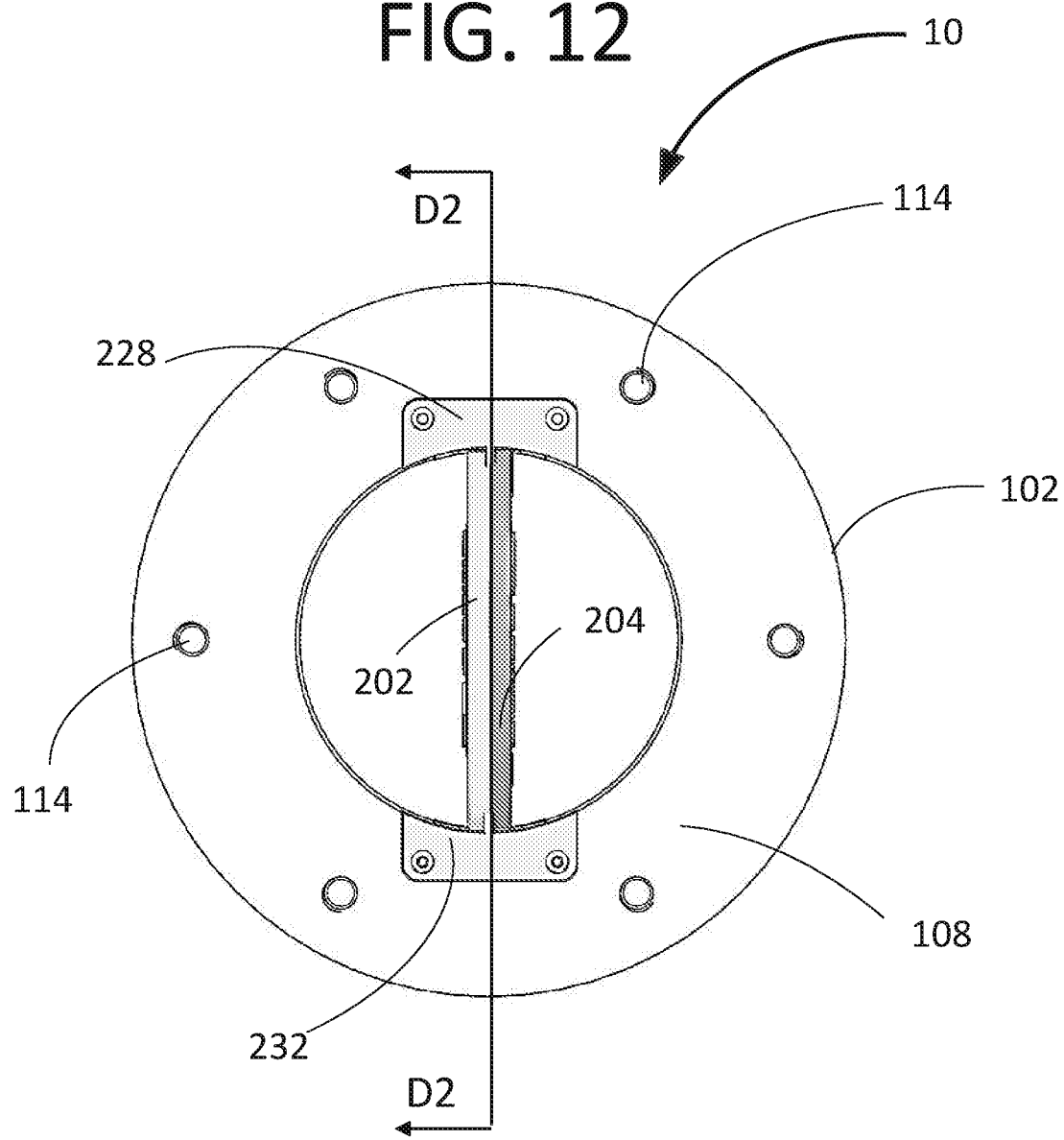

FIG. 11 shows a view of this configuration from the top of the barrel 102, and FIG. 12 shows a view of this configuration from the bottom of the barrel 102.

Figure 13:
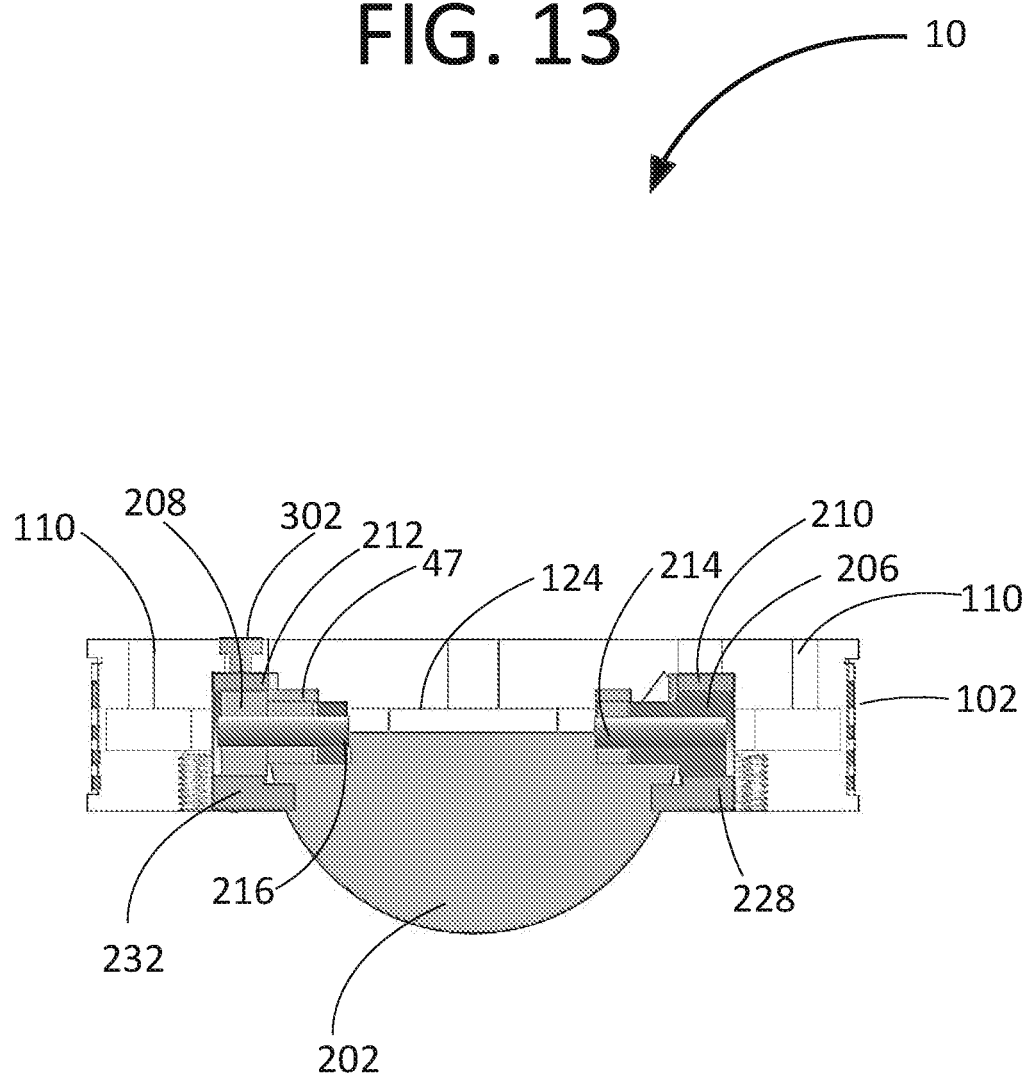
Figure 14:
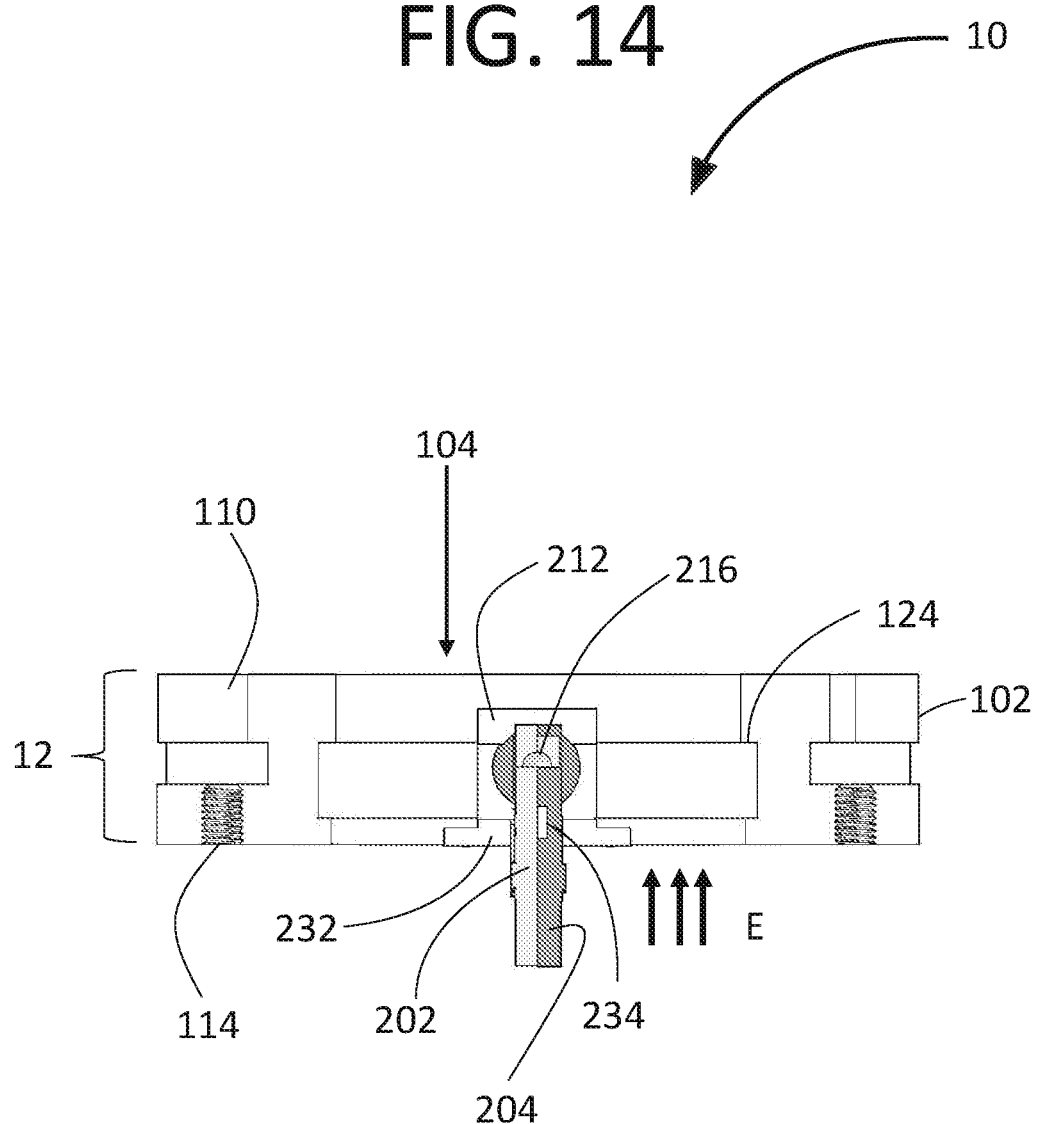
Figure 15:
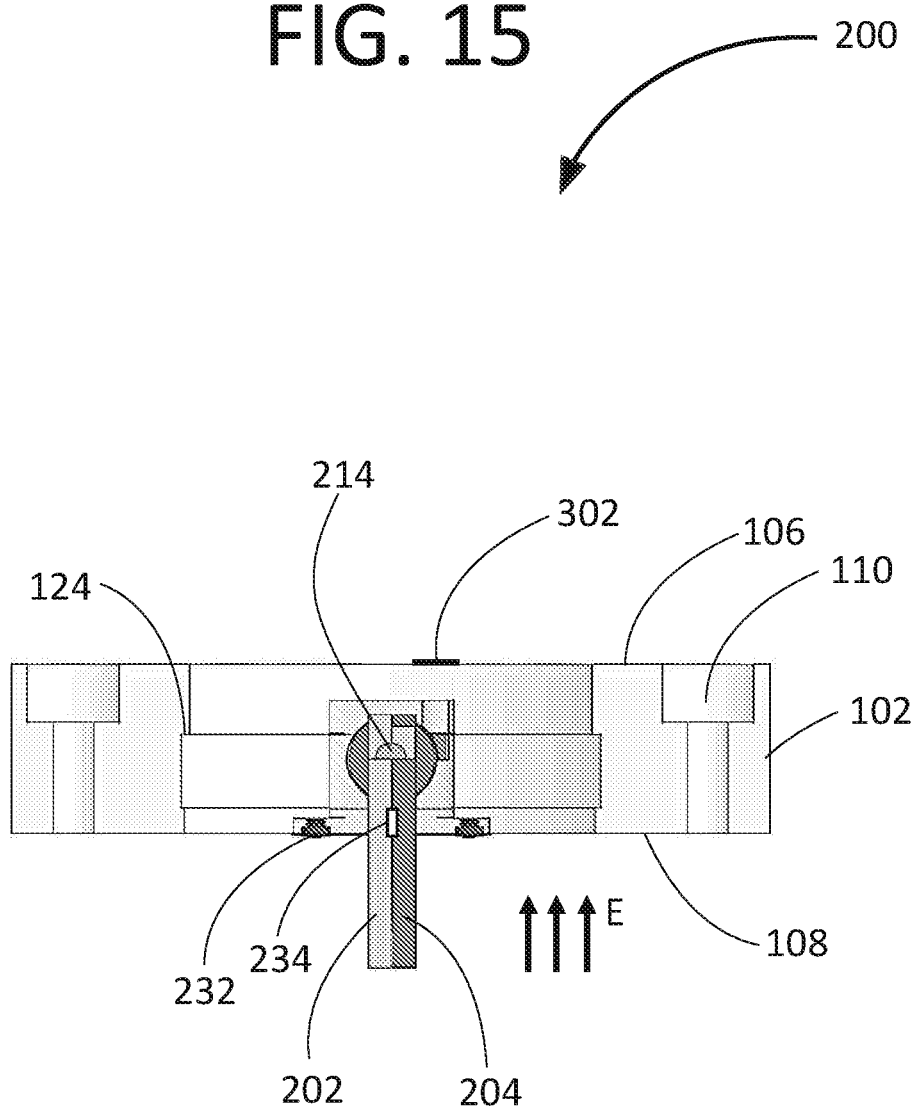

FIG. 13 shows a cutaway view of the barrel 102 along the cut lines D2-D2 of FIG. 12, and FIGS. 14 and 15 show a cutaway view of the barrel 102 along the cut lines D1-D1 of FIG. 11. As shown, the valve assembly 200 may be configured within the opening 104 of the barrel 102 in its fully open configuration with the front valve plate 202 and the back valve plate 204 each rotated fully downward. In this configuration, the water from the water main 12 may flow upward through the valve assembly 200 and the opening 104 as shown by the arrows E.

Figure 16:
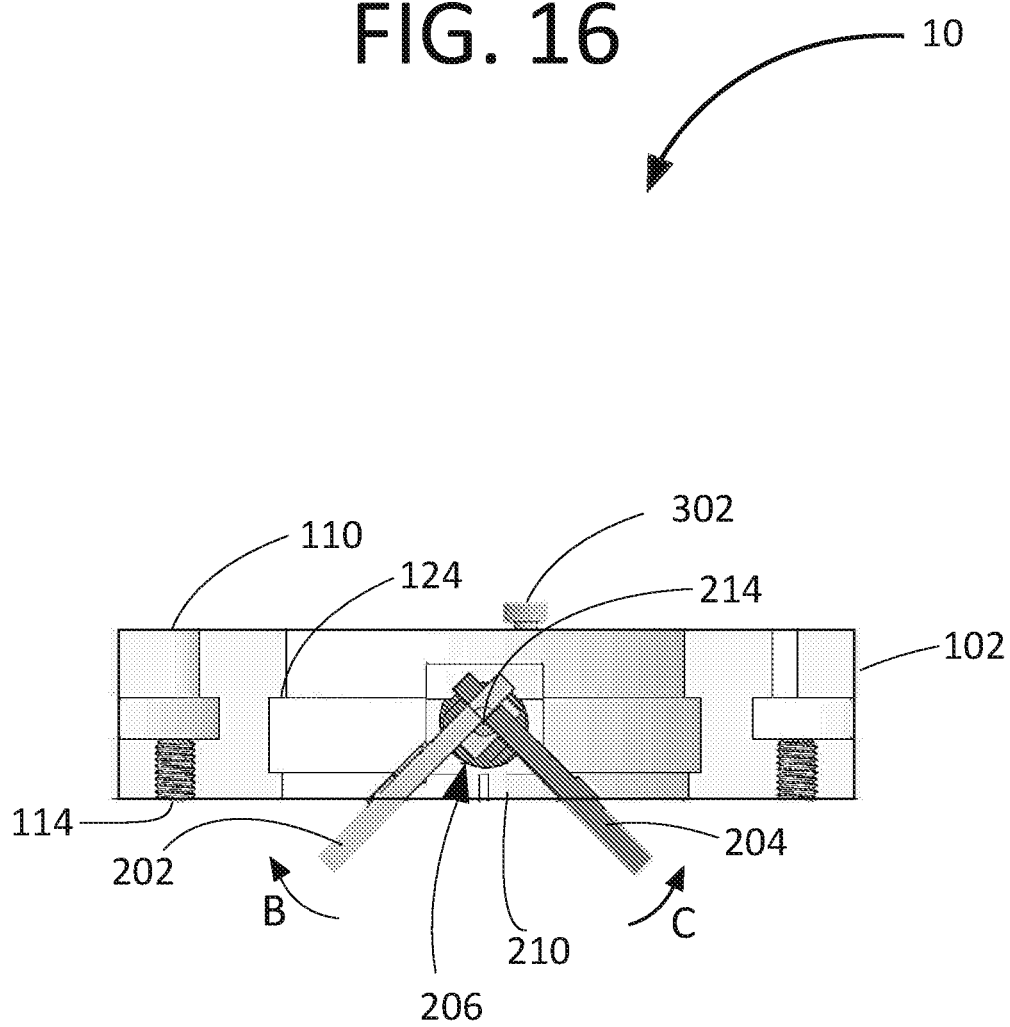

FIG. 16 shows a similar cutaway view of the barrel 102, but with the valve assembly 200 in a partially closed configuration with the front valve plate 202 and the back valve plate 204 partially rotated upward in the direction of the arrows B and C respectively.

Figure 17:
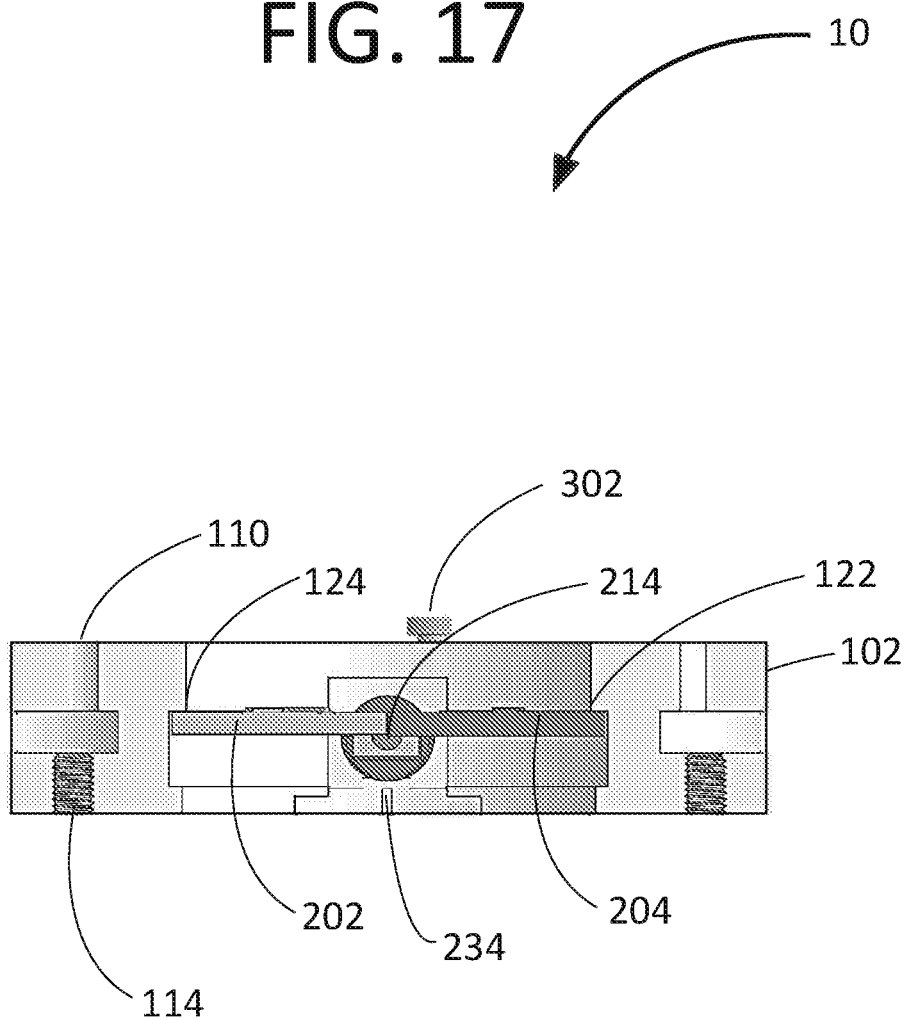

FIG. 17 shows a similar cutaway view of the barrel 102, but with the valve assembly 200 in a fully closed configuration with the front valve plate 202 and the back valve plate 204 fully rotated approximately ninety degrees into their fully closed positions and away from the valve holder stabilizer tabs 234. In this configuration, it can be seen that the outer top edges of the front valve plate 202 and the back valve plate 204 may abut against the downward facing surface 124 of the valve sealing surface 122. In this way, the valve sealing surface 122 may provide a sealed junction between the valve plates 202, 204 and the inner surface of the opening 104 when the valve plates 202, 204 may be in the fully closed configuration. It may be preferable that when in this configuration, the valve assembly 200 may prohibit the flow of water from the water main 12 through the valve assembly 200 and opening 104. It may also be preferable that the seal between the valve plates 202, 204 and the valve sealing surface 122 be free of leaks, and that the valve assembly 200 be constructed to withstand the water pressure presented by the water main 12. A gasket or other type of sealant may or may not be configured between the valve plates 202, 204 and downward facing surface 124 as required.

Figure 18:
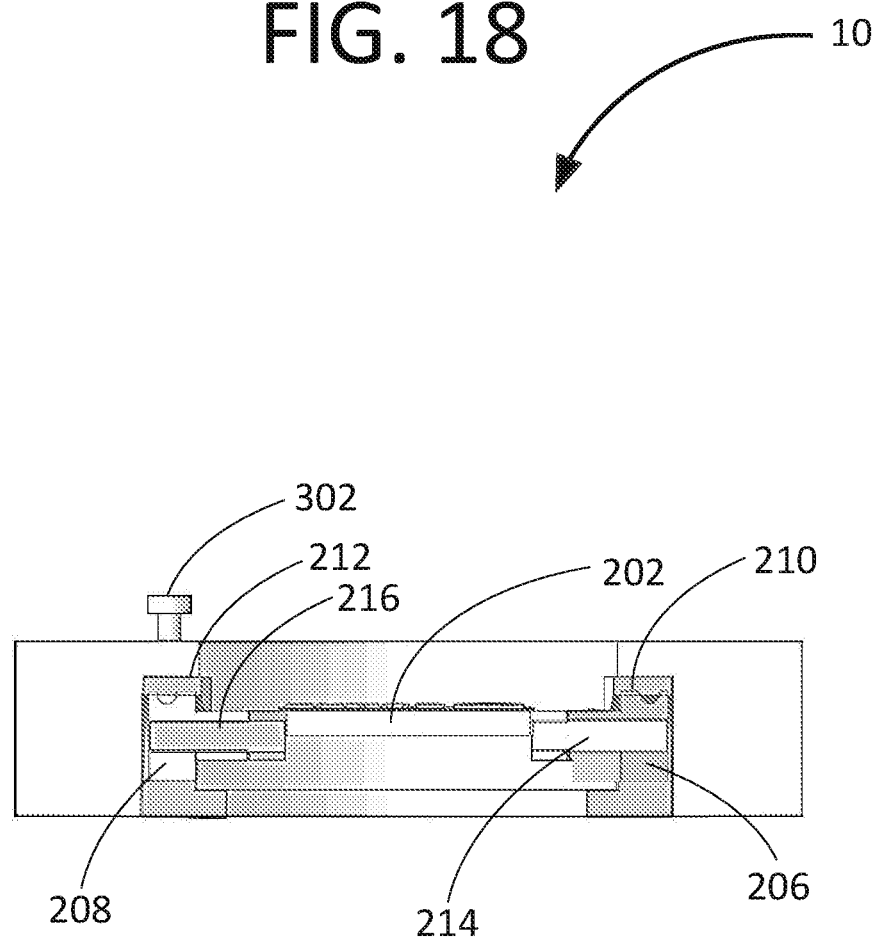

FIG. 18 shows a cutaway view of the barrel 102 along the cut lines D2-D2 of FIG. 12 with the valve plates 202, 204 in their fully upward and closed positions.

Actuation Assembly

In one exemplary embodiment hereof, the system 10 may include an actuation assembly 300. The actuation assembly 300 may cause (or enable) the valve assembly 200 to transition from a fully open configuration to a fully closed configuration when triggered. In one exemplary embodiment hereof, the actuation assembly 300 may include one or more keeper pins 302-1, 302-2, ... 302-n (individually and collectively 302) that may be configured with the front valve holder 210 and the front valve hub 206 and/or the back valve holder 212 and the back valve hub 208.

Returning to FIG. 6, each keeper pin 302 may include a pin shaft 304, a pin head 306, a pin shaft bottom 308 and side threads 310.

Also, the front valve holder 210 may include a keeper pin opening 311 that may receive, secure and properly position the keeper pin 302-1 with respect to the front hub 206, and the back valve holder 212 may include a keeper pin opening 313 that may receive, secure and properly position the back keeper pin 302-2 with respect to the back hub 208. In addition, the front valve hub 206 may include a keeper pin area 312 that may include a keeper pin slot 314 with a keeper pin slot lower surface 316 (also referred to as a notch 316), and the back valve hub 208 may include a keeper pin area 318 that may include a keeper pin slot 320 with a keeper pin slot lower surface 322 (also referred to as a notch 322).

As shown in FIG. 7, with the front valve plate 202 in its lower and open configuration, the keeper pin area 312 may receive the keeper pin 302-1 into its keeper pin slot 314 such that the bottom 308 of the keeper pin 302-1 may engage with and generally abut against the keeper pin slot lower surface 316. In this way, with the keeper pin 302-1 held secure in this position within the keeper pin opening 311 in the valve holder 210 (e.g., by the hydrant 14 configured with the top surface 106 of the barrel 102), the keeper pin 302-1 may disallow the front valve hub 206 (and its associated front valve plate 202) from rotating upward. That is, the keeper pin 302-1, when secure in this position and with its bottom 308 abutted against its associated keeper pin slot lower surface 316, may disallow the front valve plate 202 from leaving its open configuration, and the front valve plate 202 may be essentially locked in its downward and open position.

Similarly, with the back valve plate 204 in its lower and open configuration, the keeper pin area 318 may receive the keeper pin 302-2 into its keeper pin slot 320 such that the bottom 308 of the keeper pin 302-2 may engage with and generally abut against the keeper pin slot lower surface 322. In this way, with the keeper pin 302-2 held secure in this position within the keeper pin opening 313 in the valve holder 212, the keeper pin 302-2 may disallow the back valve hub 208 (and its associated front valve plate 204) from rotating upward. That is, the keeper pin 302-2, when secure in this position and with its bottom 308 abutted against its associated keeper pin slot lower surface 316, may disallow the back valve plate 204 from leaving its open configuration, and the back valve plate 204 may be essentially locked in its downward and open position.

Then, in one exemplary embodiment hereof as shown in FIG. 8, when the keeper pin 302-1 may be released and able to move upward in the direction of the arrows F within the keeper pin opening 311, the bottom 308 of the keeper pin 302-1 may no longer abut against the keeper pin slot lower surface 316. In this way, the front valve hub 206 may no longer be locked in its position and may be free to rotate in the direction of the arrow H. Likewise, the front valve plate 202 may also be no longer locked in its lower and open position, and may be free to rotate upward in the direction of the arrow B.

Similarly, when the keeper pin 302-2 may be released and able to move upward in the direction of the arrows F within the keeper pin opening 313, the bottom 308 of the keeper pin 302-2 may no longer abut against the keeper pin slot lower surface 322. In this way, the back valve hub 208 may no longer be locked in its position and may be free to rotate in the direction of the arrow I. Likewise, the back valve plate 204 may also be no longer locked in its lower and open position, and may be free to rotate upward in the direction of the arrow C.

Note that it can be seen in FIG. 8 that with the keeper pins 302-1 and 302-2 lifted upward in the direction of the arrows F, and with the front and back valve hubs 206, 208 rotated in the direction of the arrows H and I respectively, and with the front and back valve plates 202, 204 rotated upward in the direction of the arrows B and C respectively, that the front keeper pin area 312, the front keeper pin slot 314 and the front keeper pin slot lower surface 316 may be disengaged from the keeper pin 302-1 and may be rotated in the direction of the arrow H away from the keeper pin 302-1.

Then, as shown in FIG. 9, with the keeper pins 302-1, 302-2 disengaged from the keeper pin areas 312, 318 respectively, the front and back valve plates 202, 204 may continue to rotate in the directions of the arrows B and C respectively, until the valve plates 202, 204 may be configured in their fully upward and closed position. In this position, the valve assembly 200 may disallow any water from passing through the valve assembly 200 and the opening 104 within the barrel 102.

Note that in this configuration, the keeper pins may interface with the valve hubs 206, 208 and with the valve plates at their hinge point, and outside the path of flow through the opening 104. This may result in a much more compact and streamlined design.

Figure 9C:
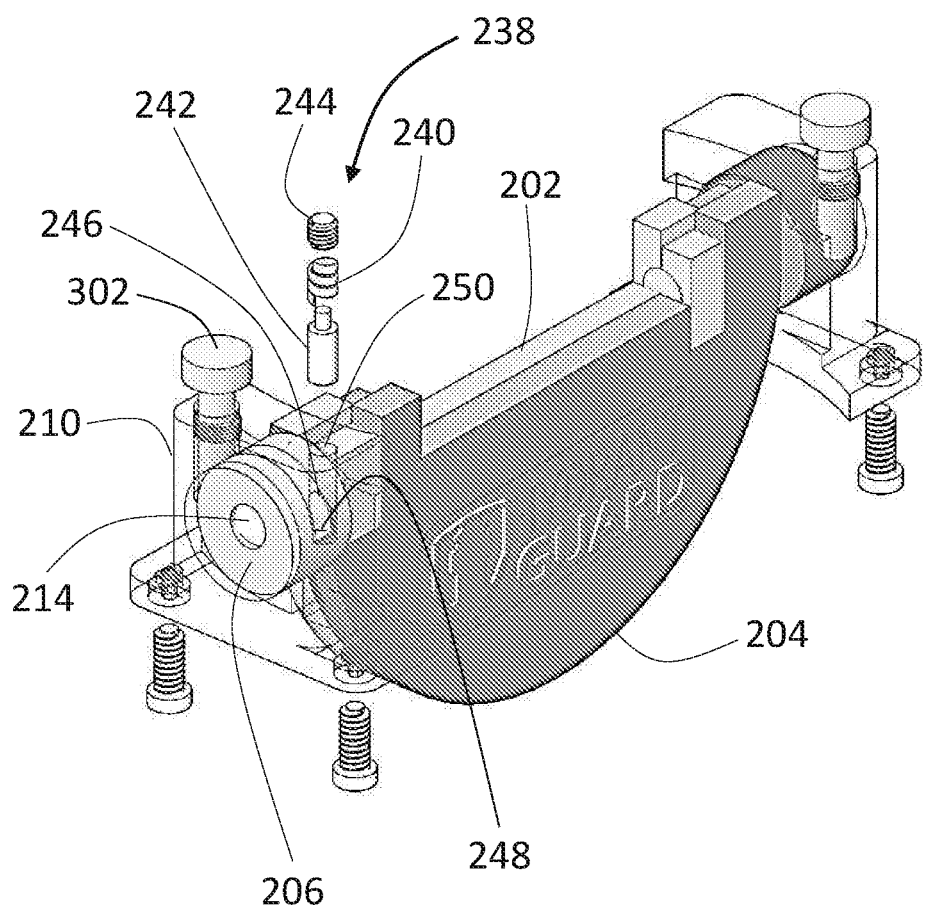

In another embodiment, the keeper pins 302 and/or the valve hubs 206, 208 and/or the valve plates 202, 204 may be spring loaded. In one example of this as shown in FIGS. 9C (exploded view) and 9D (schematic), the valve assembly 200 may include one or more spring assemblies 238 that may each comprise a spring 240, a base pin 242 and a cap 244, and that may be configured with the front and/or back hubs 206, 208. In this way, the hubs 206, 208 may be spring loaded (pre-loaded). The spring 240 may generally be mounted onto the base pin 242 for support. Note that in some embodiments, the base pin 242 may be optional.

Figure 9D:
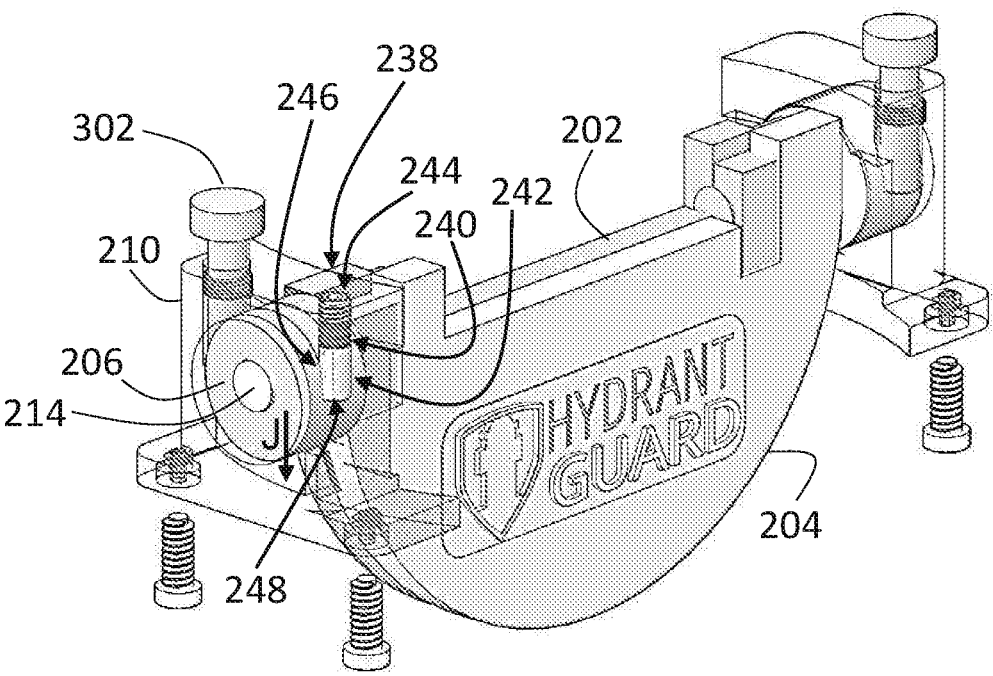

As shown in FIG. 9C, the hub 206 may include a spring assembly cavity 246 with a corresponding cavity bottom 248 and the hub holder 210 may include a spring assembly opening 250 that may receive a spring assembly 238. The spring assembly opening 250 is positioned such that when the spring assembly 238 is configured within the opening 250, the bottom of the spring assembly 238 (e.g., the bottom of the base pin 242) may rest against the cavity bottom 248. The spring assembly 238 may then be compressed downward (the spring element 240 may be compressed) and the cap 244 may be placed in the top of the opening 250 to secure the spring assembly 238 therein. This is shown in FIG. 9D.

In this configuration, the spring 240 may be compressed and preloaded, and may exert a downward force onto the cavity bottom 248 in the direction of arrow J. Accordingly, when the keeper pin 302 is released and the hub 206 is free to rotate in a clockwise direction, this force may accelerate the rotation of the hub 206, the subsequent upward movement of the valve plate 202 and the closing of the valve assembly 200.

It is understood that the back hub 208 may include a spring assembly cavity with a corresponding cavity bottom, and the back hub holder may include a spring assembly opening that may receive a spring assembly 238. In this way, the back hub 208 may include the same functionality provided by the spring assembly 238 as described above.

It is understood that while the spring(s) 240 is depicted in the figures as a coil spring, any type of spring 240 may be used.

Figure 9E:
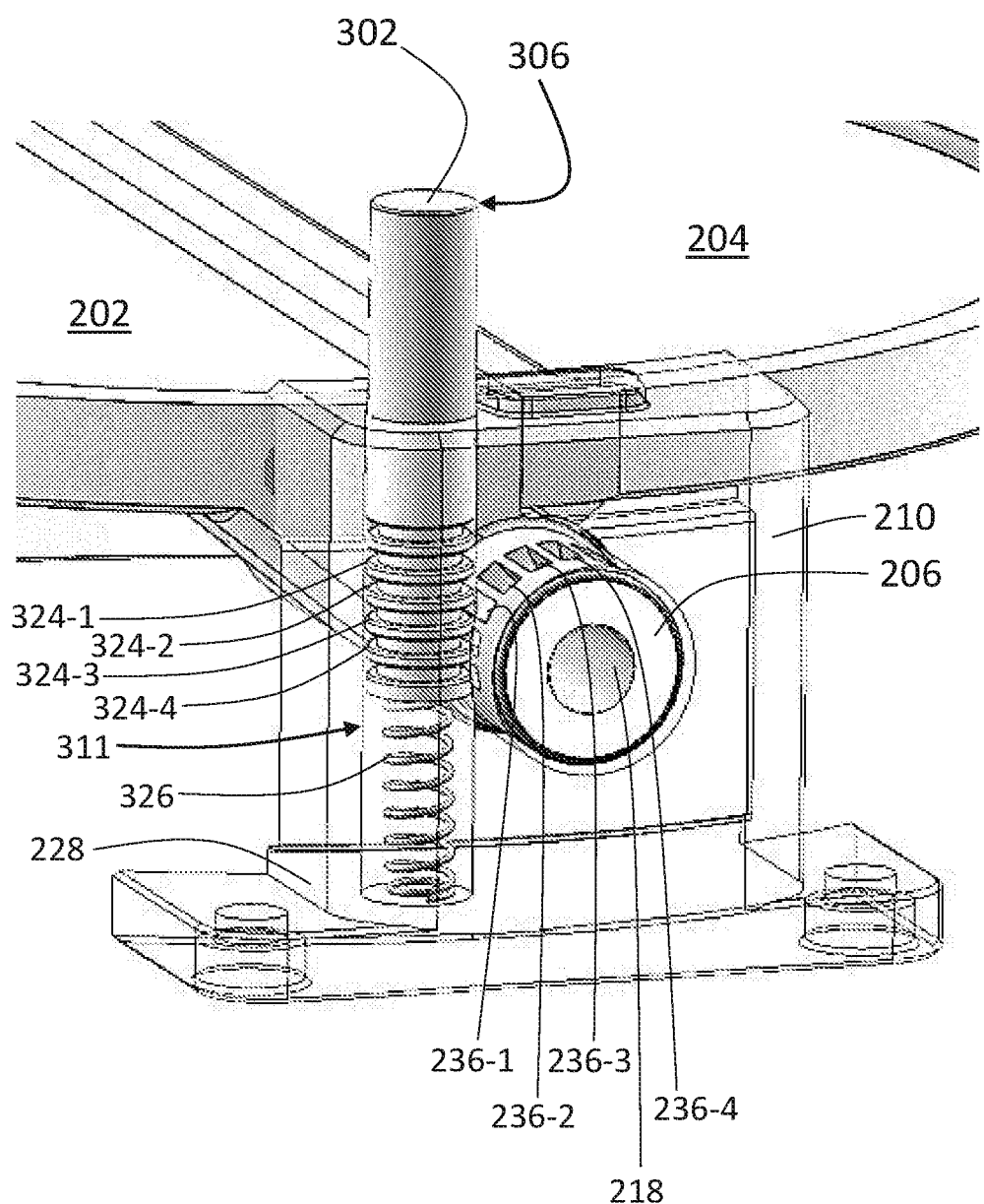

In another exemplary embodiment hereof as shown in FIG. 9E, the front hub 206 includes circumferential notches 236-1, 236-2, 236-3, . . . 236-n (individually and collectively 236) (also referred to as slots 236) positioned along its outer circumferential surface, and the keeper pin 302 includes circumferential ridges 324-1, 324-2, 324-3, . . . 324-n (individually and collectively 324) along the outer circumferential surface of its shaft 304. The keeper pin opening 311 in the top of the valve holder 210 is positioned to place the keeper pin 302 against the circumferential surface of the hub 208 such that the circumferential ridges 324 may engage the circumferential notches 236. It is preferable that the ridges 324 and notches 236 are each spaced so that there is a one-to-one correlation between the ridges 324 and the notches 236. That is, it is preferable that in the area of physical contact between the keeper pin 302 and the hub 206 that each ridge 324 may fit into and/or generally engage with a corresponding notch 236.

In addition, spring 326 may be positioned within the lower portion of the keeper pin opening 311 between the bottom of the keeper pin 302 and the top of the base 228 (the base 228 acts as a stop to the spring 326).

Figure 9F:
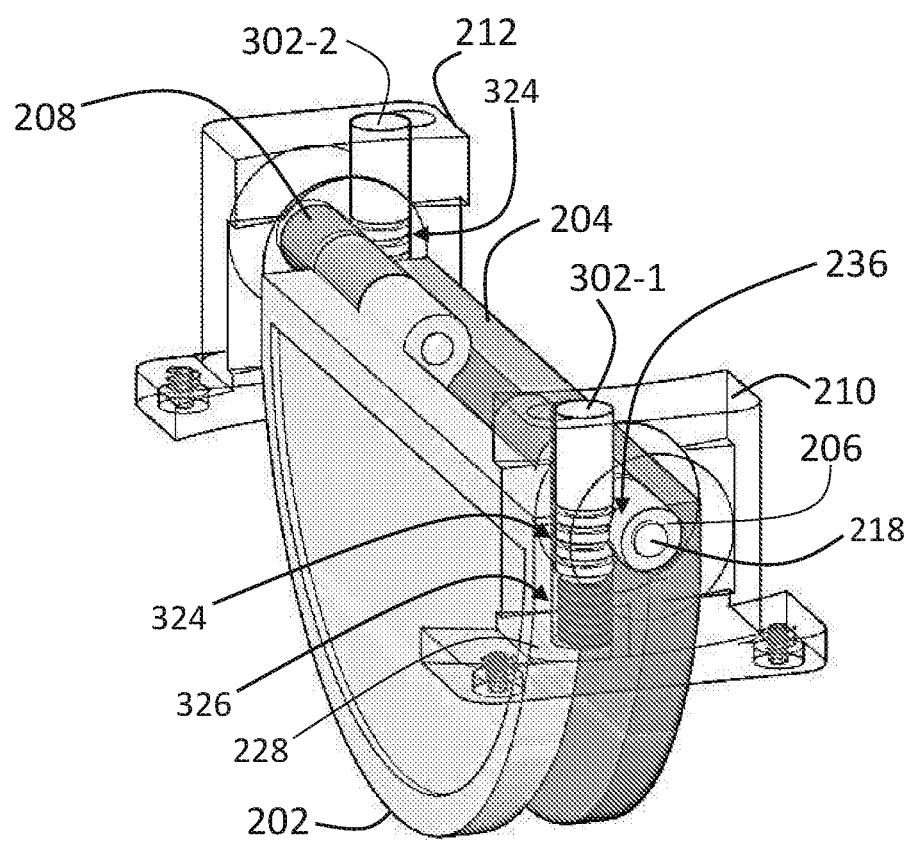

In this embodiment, to set the valve plates 202, 204 into their fully downward and open configuration, the keeper pin 302 may be pressed downward into the keeper pin opening 311 (e.g., while configuring the system 10 with a hydrant 14). During this motion, the keeper pin ridges 324 may engage the hub notches 236 such that the downward motion of the keeper pin 302 causes a counterclockwise rotation of the hub 206. This counterclockwise rotation of the hub 206 rotates the valve plate 202 downward. It is preferable that the length of the keeper pin 302 and the depth of the keeper pin opening 311 be chosen such that when the top of the keeper pin 302 is generally flush with the keeper pin opening 118 in the top 106 of the barrel 102, that the hub 206 and the valve plate 202 have rotated a sufficient amount such that the valve plate 202 is placed in its fully downward and open position. This is shown in FIG. 9F. As will be described in other sections, the keeper pin 302 may be held within the keeper pin opening 118 by the bottom surface of the hydrant 14 configured with the top surface 106 of the barrel 102.

Note that as the keeper pin 302 is pressed downward, the spring 326 may become compressed and thereby pre-loaded. It is preferable that the spring 326 be able to compress a sufficient amount so that it may not obstruct or otherwise interfere with the insertion of the keeper pin 302. As will be described in other sections, the pre-loaded spring 326 may generate an upward force onto the keeper pin 302 such that when the keeper pin 302 is released, the spring 236 may apply an additional upward force to the keeper pin 302 thereby accelerating its upward motion.

While not shown, it is understood that the back hub 208 also may include circumferential notches 236 and the back keeper pin 302 may include circumferential ridges 324 that may be configured to engage as described above with relation to the front hub 206 and the front keeper pin 302. In this way, the back hub 208 and corresponding keeper pin 302 may include the same functionality as the front hub 206 and its corresponding keeper pin 302. The back keeper pin 302 also may include a preloaded spring 326.

It is understood that while the spring(s) 326 is depicted in the figures as a coil spring, any type of spring 236 may be used.

Figure 9G:
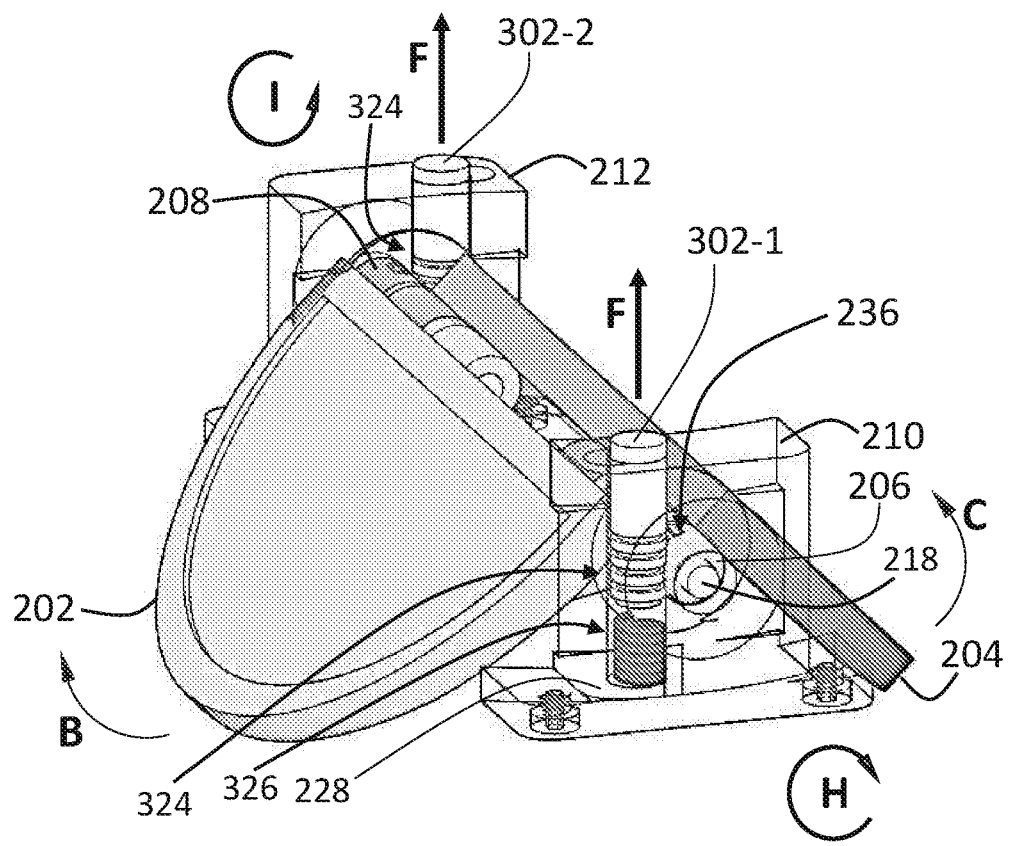

Then, in one exemplary embodiment hereof as shown in FIG. 9G, when the keeper pin 302-1 may be released and able to move upward in the direction of the arrows F within the keeper pin opening 311, the upward force applied to the bottom of the keeper pin 302-1 by the preloaded spring 326 may force the keeper pin 302-1 upward. Being engaged with the hub 206 via the ridge 324 and notch 236 combinations, this upward movement of the keeper pin 302-1 may cause a clockwise rotation of the hub 206, thereby rotating the valve plate 202 upward in the direction of the arrows B. This in combination with the upward forces applied by the upward moving water past the valve plate 202 and through the opening 104 causes the valve plate 202 to accelerate upward into its upward and closed position as shown in FIG. 9H.

Similarly, when the keeper pin 302-2 may be released and able to move upward in the direction of the arrows F within the keeper pin opening 313, the upward force applied to the bottom of the keeper pin 302-2 by the preloaded spring 326 may force the keeper pin 302-2 upward. Being engaged with the hub 208 via the ridge 324 and notch 236 combinations, this upward movement of the keeper pin 302-2 may cause a clockwise rotation of the hub 208, thereby rotating the valve plate 204 upward in the direction of the arrow C. This in combination with the upward forces applied by the upward moving water past the valve plates 204 and through the opening 104 causes the valve plate 204 to accelerate upward into its upward and closed position as shown in FIG. 9H.

With both valve plates 202, 204 rotated upward into their closed positions, the valve assembly 200 may disallow any water from passing through the valve assembly 200 and the opening 104 within the barrel 102.

Note that in this configuration, the keeper pins may interface with the valve hubs 206, 208 and with the valve plates at their hinge point, and outside the path of flow through the opening 104. This may result in a much more compact and streamlined design.

The activation of the keeper pins 302 and the subsequent closing of the valve assembly 200 will now be described in further detail in relation to the system 10 in use with a water main 12 and a hydrant 14. Note that the ensuing description may pertain to the keeper pins 302 described in relation to FIGS. 6-9, the keeper pins 302 described in relation to FIGS. 9E-9H, and any other embodiments of the keeper pins 302 described herein or otherwise.

As shown in FIG. 1, in one exemplary embodiment hereof, the system 10 may be configured between two passageways (e.g., a water main 12 and a fire hydrant 14). In this way, the bottom surface of the barrel 102 may be generally abutted against the top surface of the water main 12, and the top surface of the barrel 102 may be generally abutted against the bottom surface of the fire hydrant 14.

Figure 4:
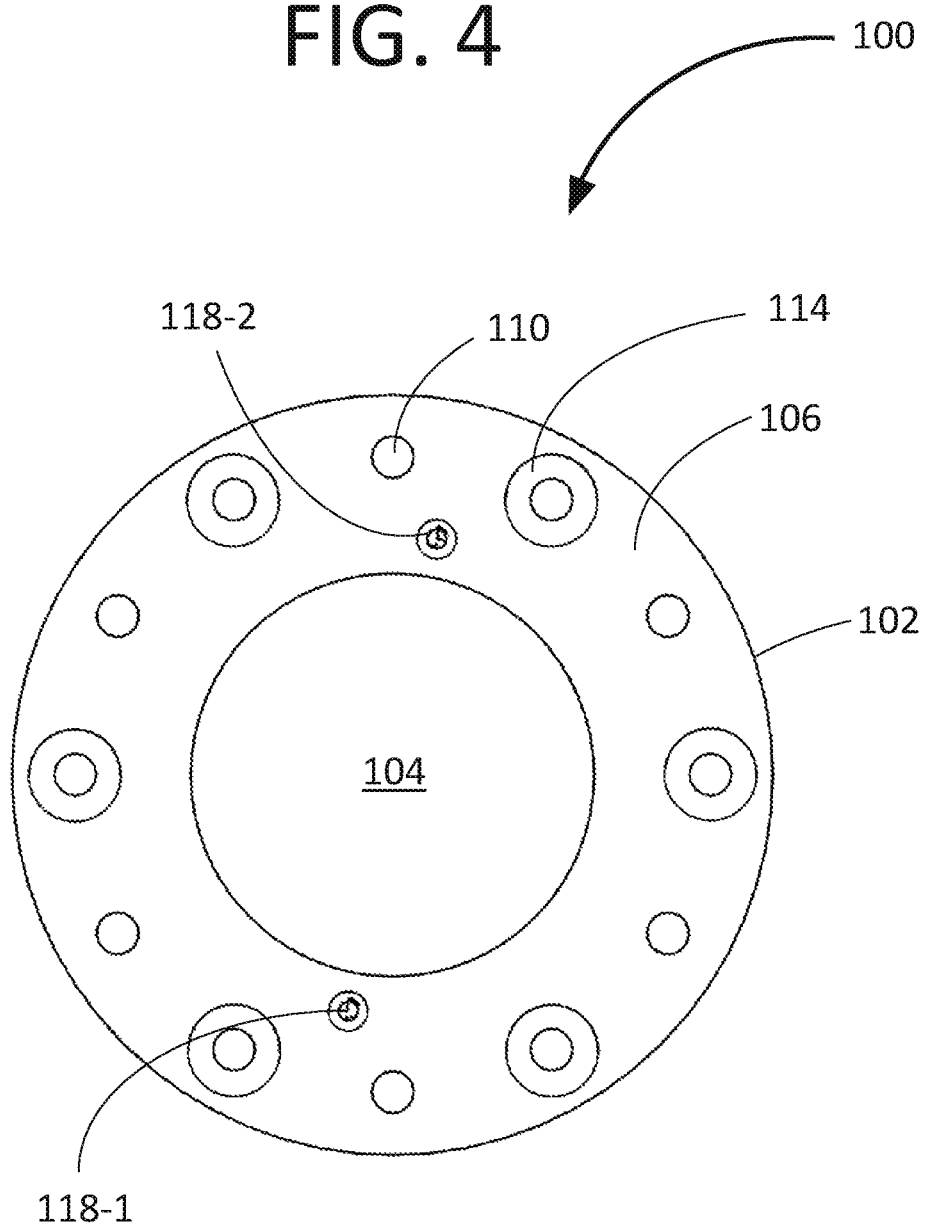
Figure 19:
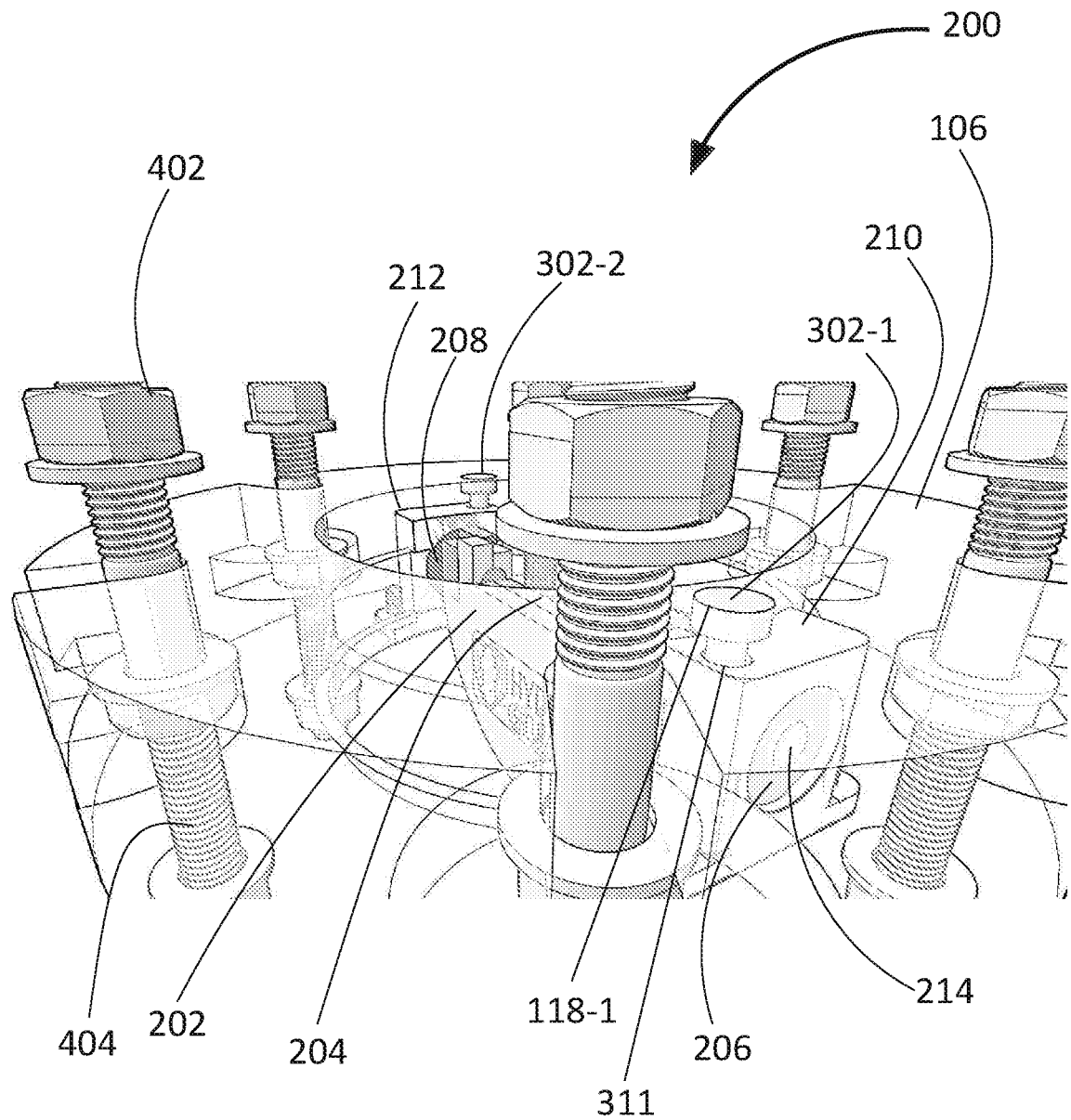
FIGS. 19-22 show aspects of an activation assembly according to exemplary embodiments herein.

Moving now to FIG. 4, in one exemplary embodiment hereof, the top surface of the barrel 102 may include a first barrel pin opening 118-1 and a second barrel pin opening 118-2. Then, as shown in FIG. 19, with the valve assembly 200 configured within the inner opening 104 of the barrel 102, the first barrel pin opening 118-1 may pass through the upper portion of the barrel 102 and intersect in alignment with the keeper pin opening 311 in the top of the valve holder 210. In this way, the keeper pin 302-1 may be received into the first barrel pin opening 118-1 and the keeper pin opening 311 simultaneously.

Similarly, the second barrel pin opening 118-2 may pass through the upper portion of the barrel 102 and intersect in alignment with the keeper pin opening 313 in the top of the valve holder 212. In this way, the keeper pin 302-2 may be received into the second barrel pin opening 118-2 and the keeper pin opening 313 simultaneously.

Figure 20:
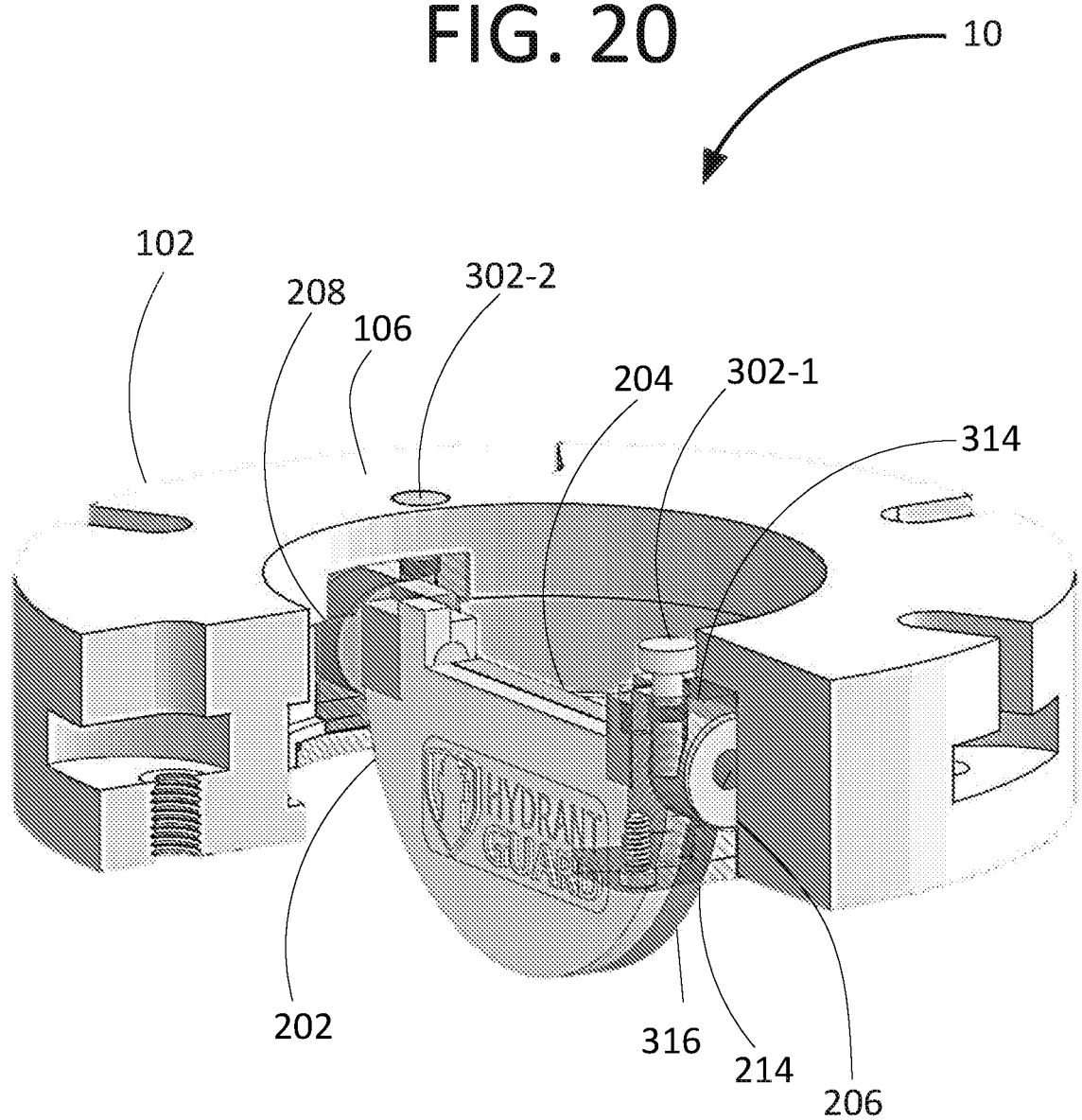

As shown in FIGS. 19 and 20, in one exemplary embodiment hereof, the length of the keeper pins 302 may be chosen such that when the keeper pins 302 may be configured within the barrel pin openings 118-1, 118-2 and the keeper pin openings 311, 313, respectively, that the top surfaces of the heads 306 of the keeper pins 302 may each be generally flush with the top surface 106 of the barrel 102 when the keeper pins 302 are engaged with the hubs 206, 208, respectively. That is, when the top surfaces of the heads 306 of the keeper pins 302 are flush with the top surface 106 of the barrel 102, the keeper pins 302 may hold the hubs 206, 208 locked (e.g., with the bottoms 308 of the keeper pins 302 abutted against the keeper pin slot lower surfaces 316, 322, and/or the ridges 324 engaged with the notches 236). Accordingly, the front valve plate 202 and the back valve plate 204 may both be locked in their downward and open positions when in this configuration.

Figure 27:
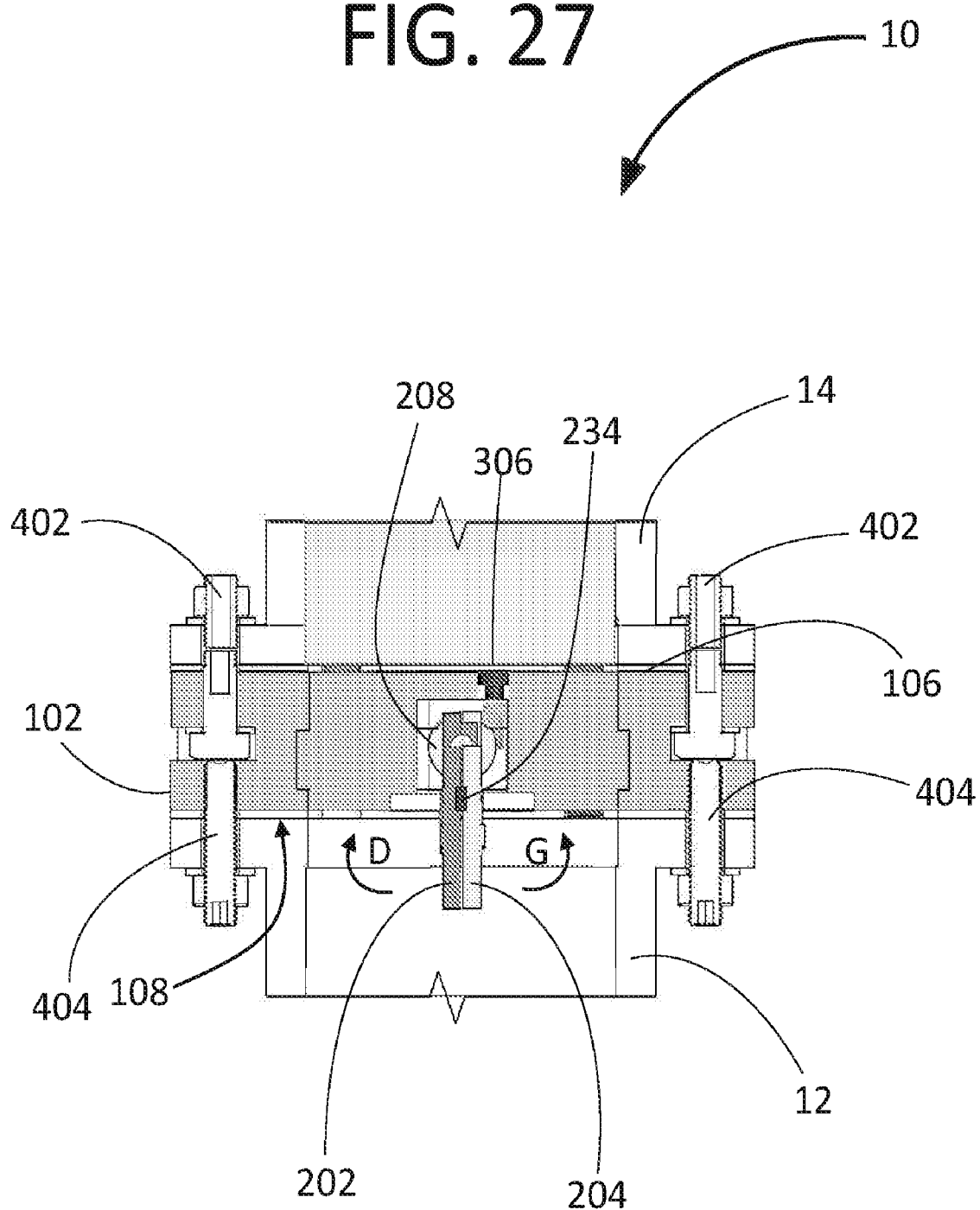
FIGS. 27-29 show aspects of a breakaway check valve according to exemplary embodiments herein.

As shown in FIG. 27, it can be seen that with the bottom of the fire hydrant 14 secured to and in contact with the top surface of the barrel 102 of the system 10, that the bottom surface of the hydrant 14 may provide a stop to the heads 306 of the keeper pins 302. That is, it may be preferable that with the hydrant 14 secured to the top of the barrel 102, that at least a portion of the bottom surface of the fire hydrant 14 may be abutted against at least a portion of the top of the heads 306 of the keeper pins 302 such that the tops of the keeper pins 302 may be held flush (or in a down position) with the top surface of the barrel 102. In this way, the keeper pins 302 may be secured in their downward positions and may thereby lock the valve hubs 206, 208 and the valve plates 202, 204 in their open positions as described above.

Figure 21:
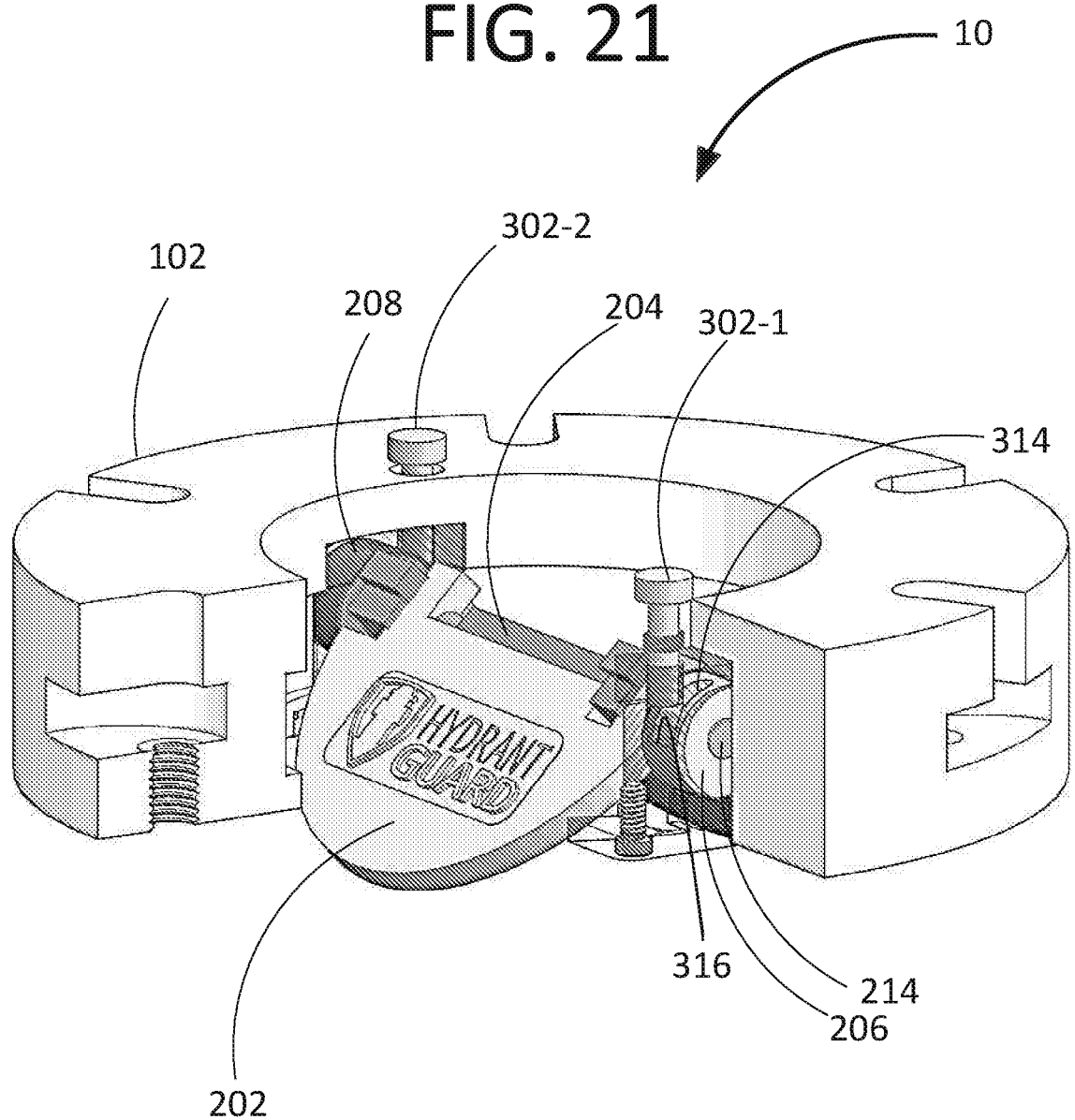
Figure 22:
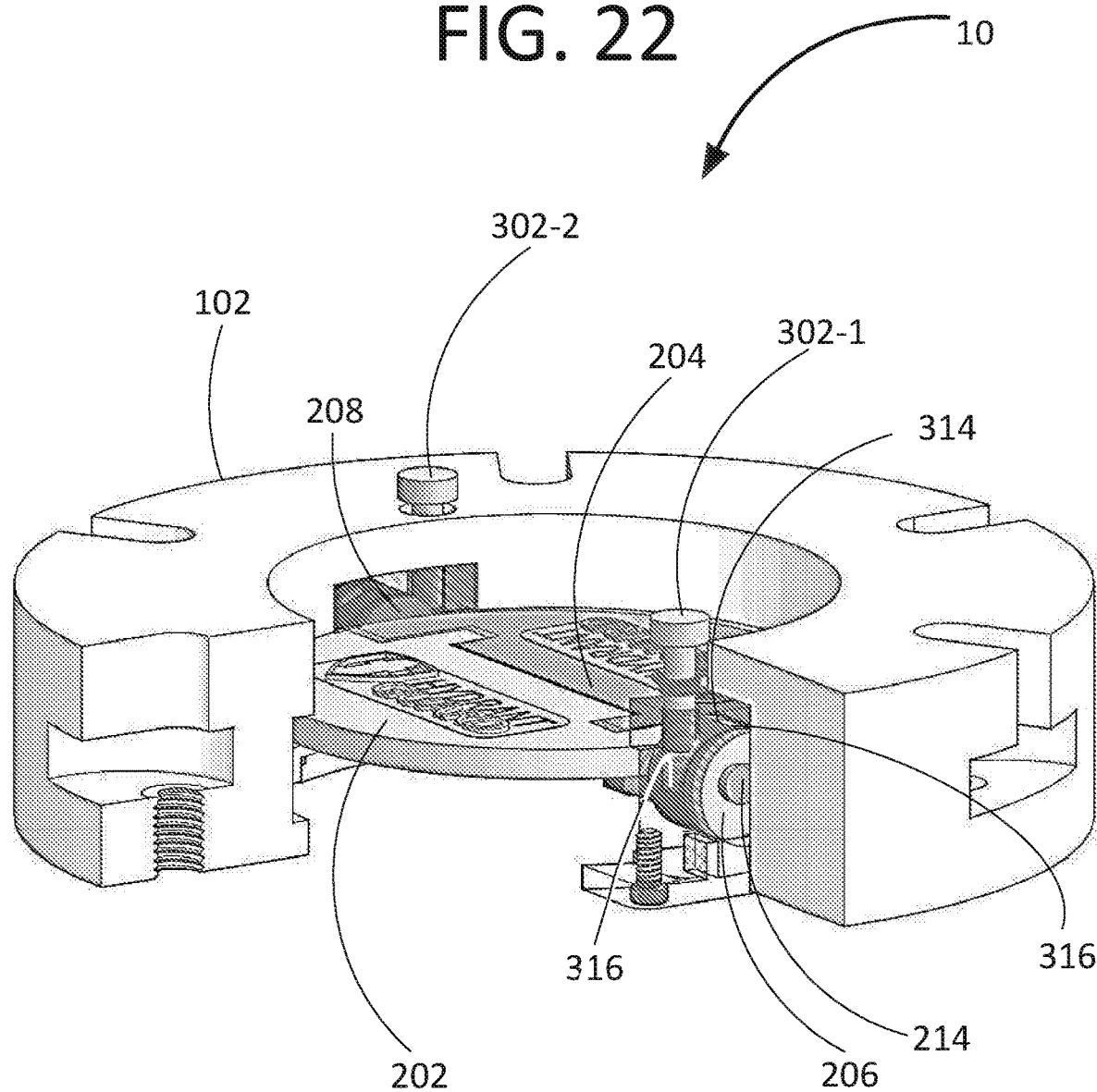
Figure 28:
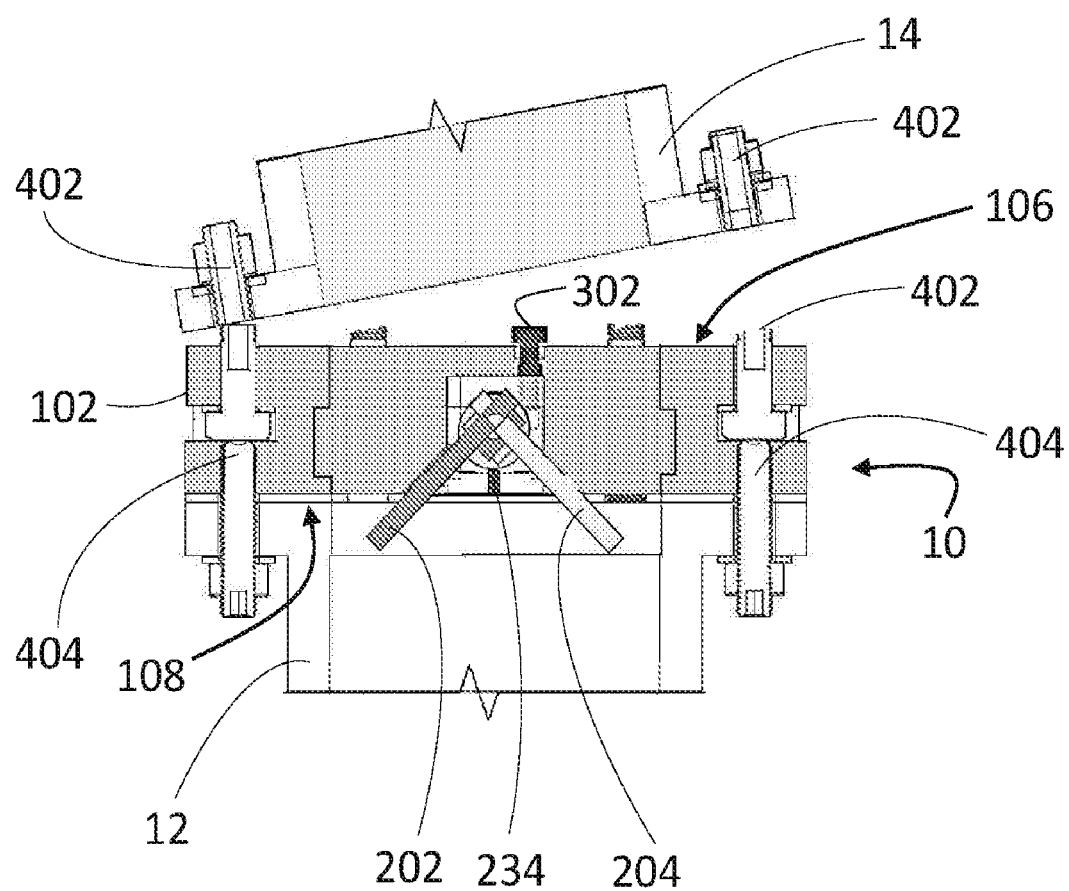
Figure 29:
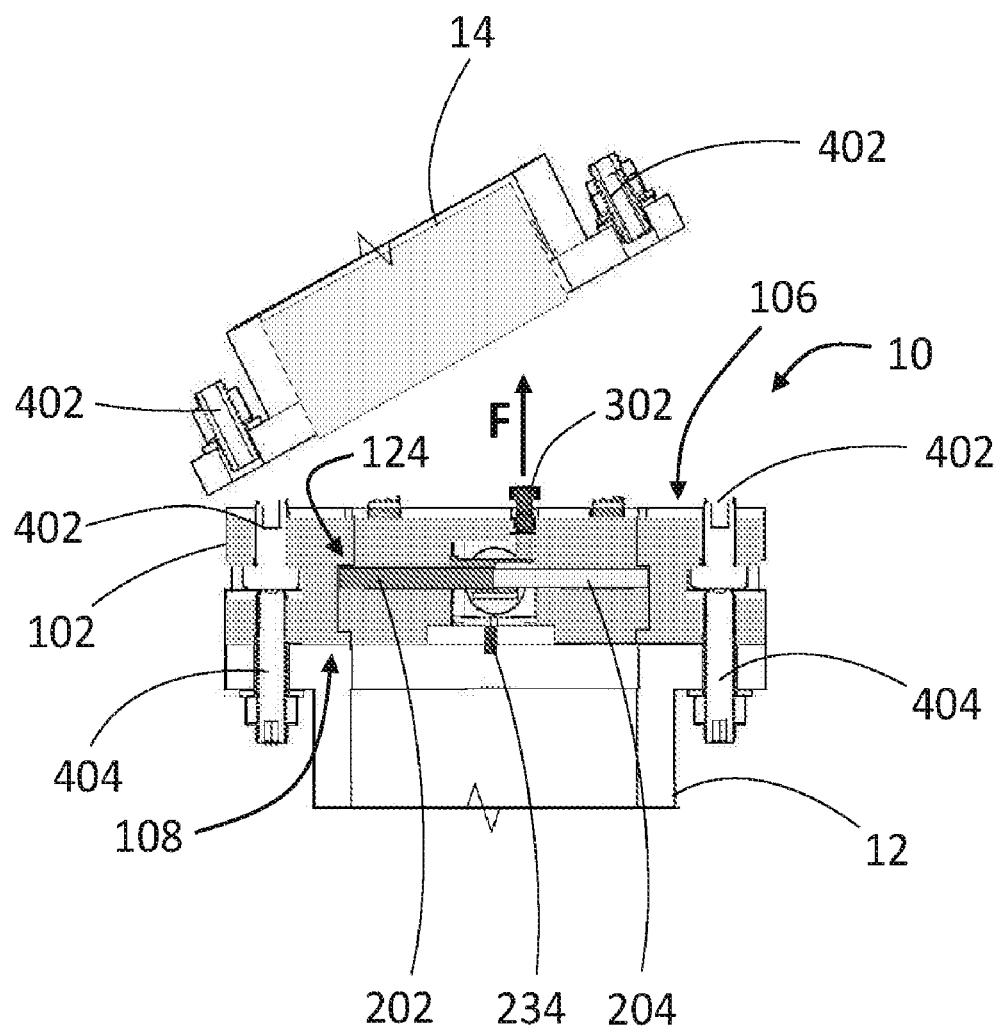

As seen in FIGS. 28 and 29, it can also be seen that if the fire hydrant 14 were to be removed (completely or partially) from the top surface of the barrel 102, that the bottom surface of the hydrant 14 may no longer abut against the tops of the keeper pins 302, and may no longer secure the keeper pins 302 in their downward positions. In this case, the keeper pins 302 may lift upward (and/or be free and generally unobstructed to be lifted or otherwise moved upward) in the direction of the arrows F such that the valve hubs 206, 208 may rotate (and/or be free to move) in the direction of the arrows H and I respectively (FIG. 8), and the valve plates 202, 204 may rotate upward (and/or be free to rotate upward) in the direction of the arrows B and C, respectively (FIG. 8), and into their upward and closed position. The valve plates 202, 204 may be lifted by the pressure of the water provided by the water main 12 which may in turn rotate the valve hubs 206, 208 and/or lift the keeper pins 302 upward. In addition, as described above, the keeper pins 302 and/or the valve hubs 206, 208 and/or the valve plates 202, 204 may be spring loaded such that the rotation may be accelerated thereby. FIGS. 21 and 22 provide a cut-away view of this motion.

Figure 23:
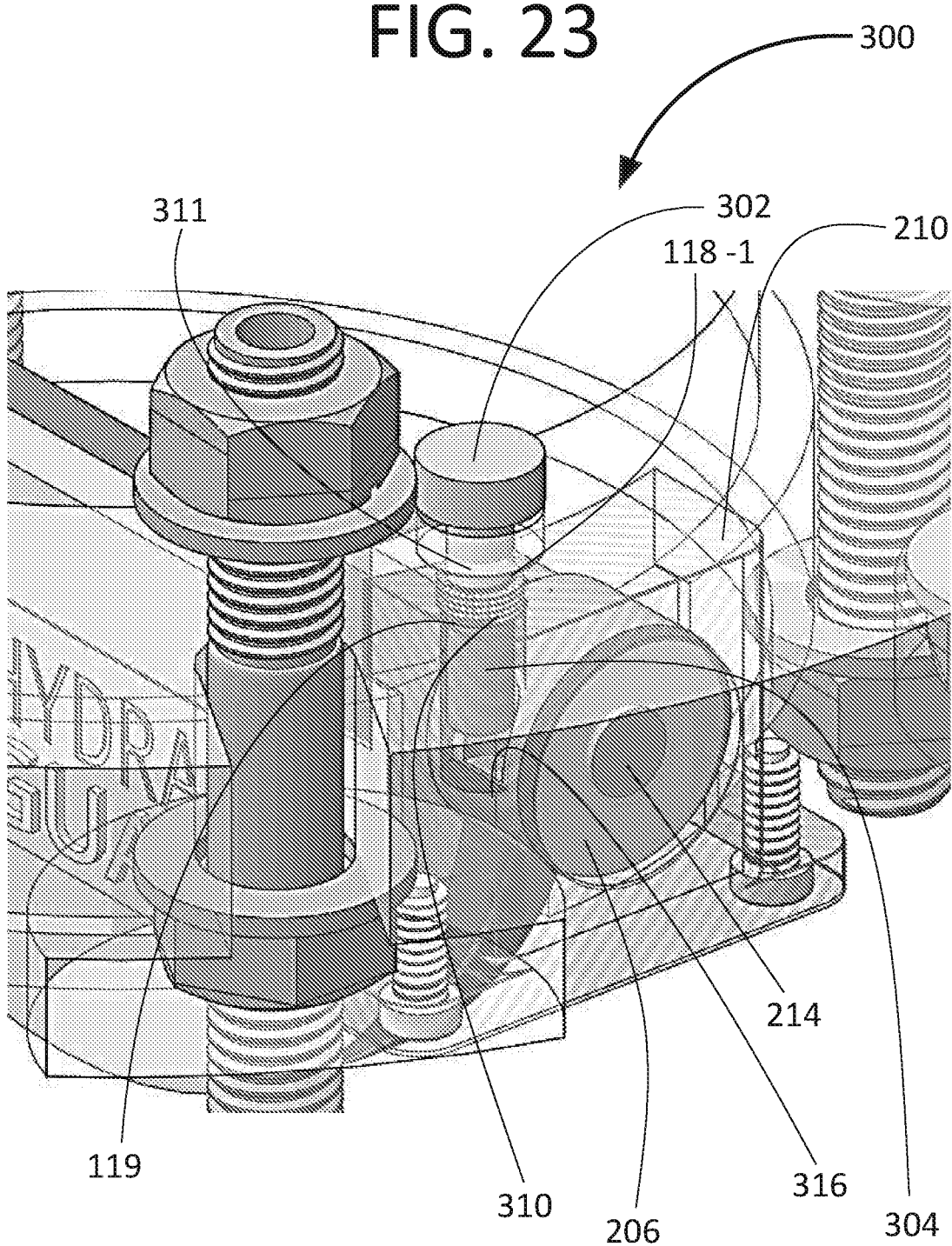
FIG. 23 shows aspects of keeper pin within a keeper pin opening according to exemplary embodiments herein.

In one exemplary embodiment hereof as shown in FIG. 23, the keeper pins 302 may include threads 310 along at least a portion of their shafts 304. As shown, it may be preferable for the threads 310 to be generally located in the middle portion of the shafts 304. In addition, the first and second barrel pin openings 118-1, 118-2 may each include corresponding threads 119 that may generally be positioned towards the top portions of the pin openings 118-1, 118-2 but not below along the middle or lower portions of the pin openings 118-1, 118-2. The keeper pins 302 may be screwed into the pin openings 118-1, 118-2 by engaging the threads 310 with the threads 119 and screwing the pins 302 downward. It can be seen that because the threads 119 may only be located in the upper portion of the pin openings 118-1, 118-2 that once the keeper pins 302 are screwed past the threads 119, that the keeper pins 302 may be free to move up and down in the non-threaded portions of the keeper pin openings 118-1, 118-2. In addition, it can also be seen that the threads 119 may act as a stop to the keeper pins 302 in the upward direction unless the keeper pins 302 are unscrewed from the threads 119. In this way, if and when the keeper pins 302 may be released by the bottom of the hydrant 14, the threads 119 may hold the keeper pins 302 within the keeper pin openings 118-1, 118-2 so that they may not become completely dislocated and potentially lost.

Note that while the above description described an activation assembly 300 that may include keeper pins 302 generally positioned on the upper portion of the system 10 (e.g., the barrel 102) such that the keeper pins 302 may activate the valve assembly 200 when released, it is understood that the system 10 may also and/or instead of, include keeper pins 302 positions on its lower portion so that the keeper pins 302 may activate the valve assembly 200 as describe but when the system 10 may become dislodged from the lower passageway 12 (e.g., the water main). It is understood that the descriptions above regarding the activation assembly 300 with the keeper pins 302 on the top portion of the barrel 102 may also apply to any keeper pins 302 that may be positioned on the bottom portion of the barrel 102 for these purposes. It is also understood that the scope of the system 10 is not limited in any way by the location of the keeper pins 302.

Attachment Assembly

In one exemplary embodiment hereof the system 10 may include an attachment assembly 400. The attachment assembly 400 may attach a first side of the system 10 to a first passageway and a second side of the system 10 to a second passageway. For example, as shown in FIG. 1, the first side of the system 10 may be attached to a water main 12 and the second side of the system 10 may be attached to a fire hydrant 14.

Figure 5:
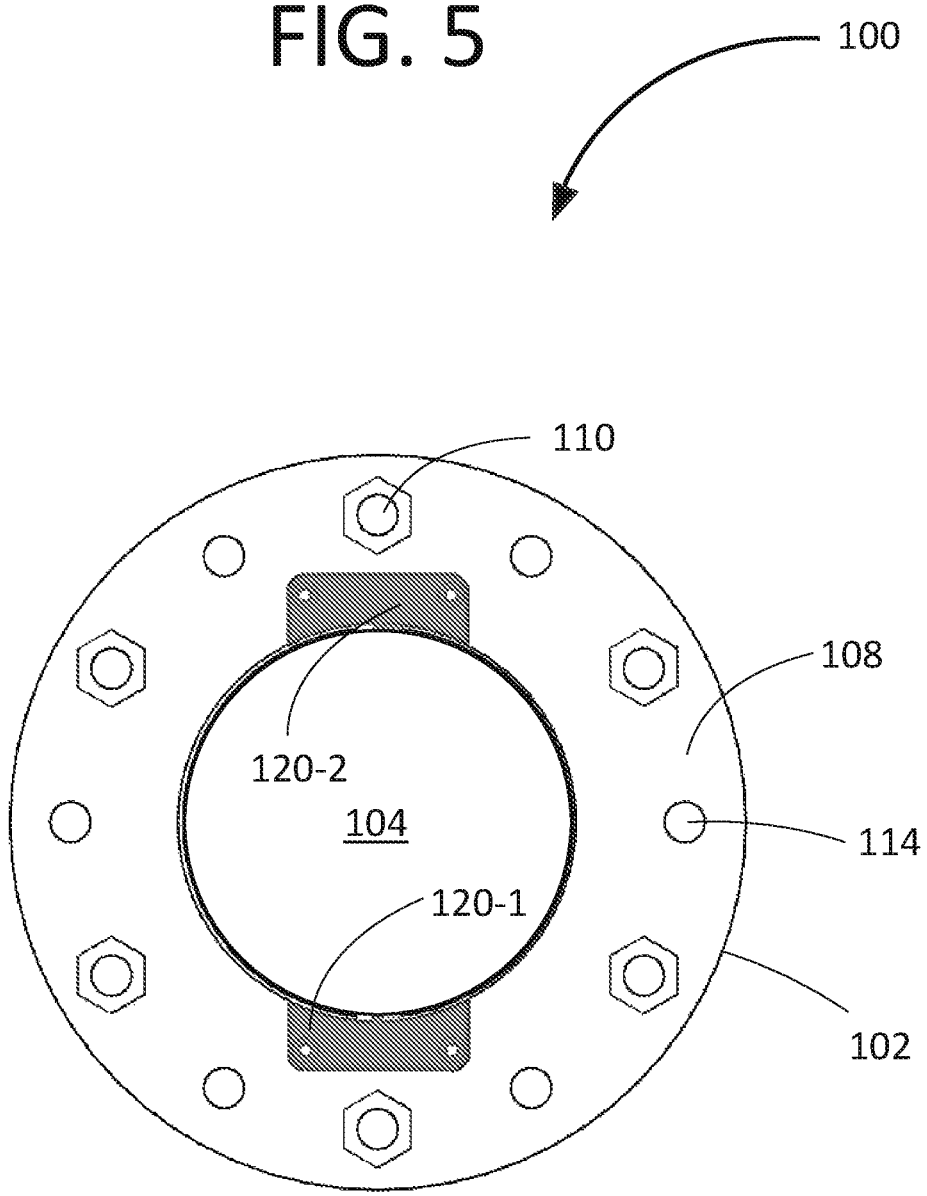

In one embodiment as shown in FIGS. 4-5, the barrel 102 may include upper mounting flange holes 110 generally configured with the top side 106 of the barrel 102, and lower mounting flange holes 114 generally configured with the bottom side 108 of the barrel 102. In one embodiment, the upper mounting flange holes 110 and the lower mounting flange holes 114 may be offset with respect to one another. For example, as shown, the upper mounting flange holes 110 and the lower mounting flange holes 114 may alternate at 30° offsets (with respect to an axis passing through the opening 104 perpendicular to the top 106 and bottom 108 of the barrel 102). Note that other angular offsets between the alternating upper and lower mounting flange holes 110, 114 may be used. As will be described in other sections, the upper and lower mounting flange holes 110, 114 also may be aligned.

Figure 24:
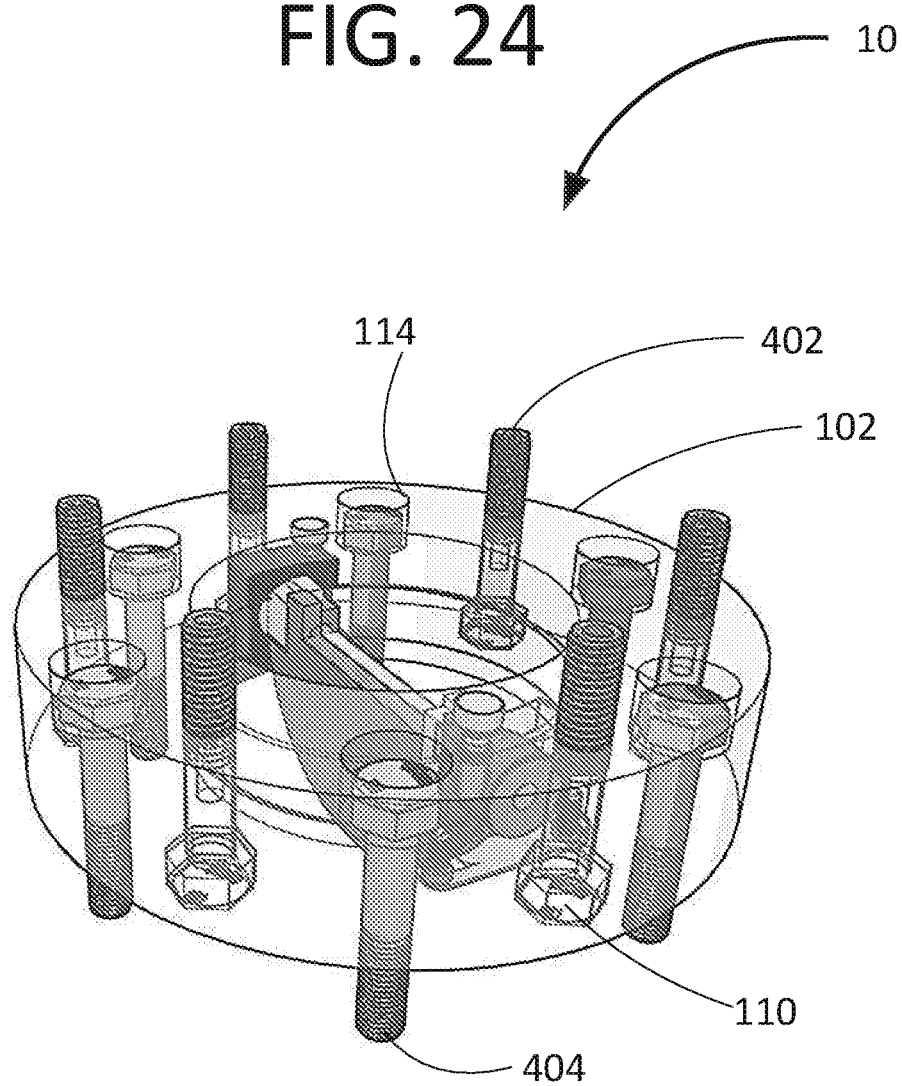

As shown in FIG. 24, the upper mounting flange holes 110 may receive and house the upper mounting bolts 402, and the lower flange holes 114 may receive and house the lower mounting bolts 404. With the fire hydrant 14 configured with the upper surface of the barrel 102 as described above, it may be preferable that the upper mounting bolts 402, when housed in the upper mounting flange holes 110, align with corresponding openings (threaded and/or inclusive with bolts) on the fire hydrant 14 and that the upper mounting bolts 402 may be received into the corresponding openings and be held securely there within. In this way, the barrel 102 may be secured to the fire hydrant 14. It may be preferable that the junction between the barrel 102 and the hydrant 14 be free of leaks or gaps, and to this end, a gasket between the two may be used.

In addition, with the water main 12 configured with the lower surface of the barrel 102 as described above, it may also be preferable that the lower mounting bolts 404, when housed in the lower mounting flange holes 114, align with corresponding openings (threaded and/or inclusive with bolts) on the water main 12 and that the lower mounting bolts 404 may be received into the corresponding openings and be held securely there within. In this way, the barrel 102 may be secured to the water main 12. It may be preferable that the junction between the barrel 102 and the water main 12 be free of leaks or gaps, and to this end, a gasket between the two may be used.

Figure 5A:
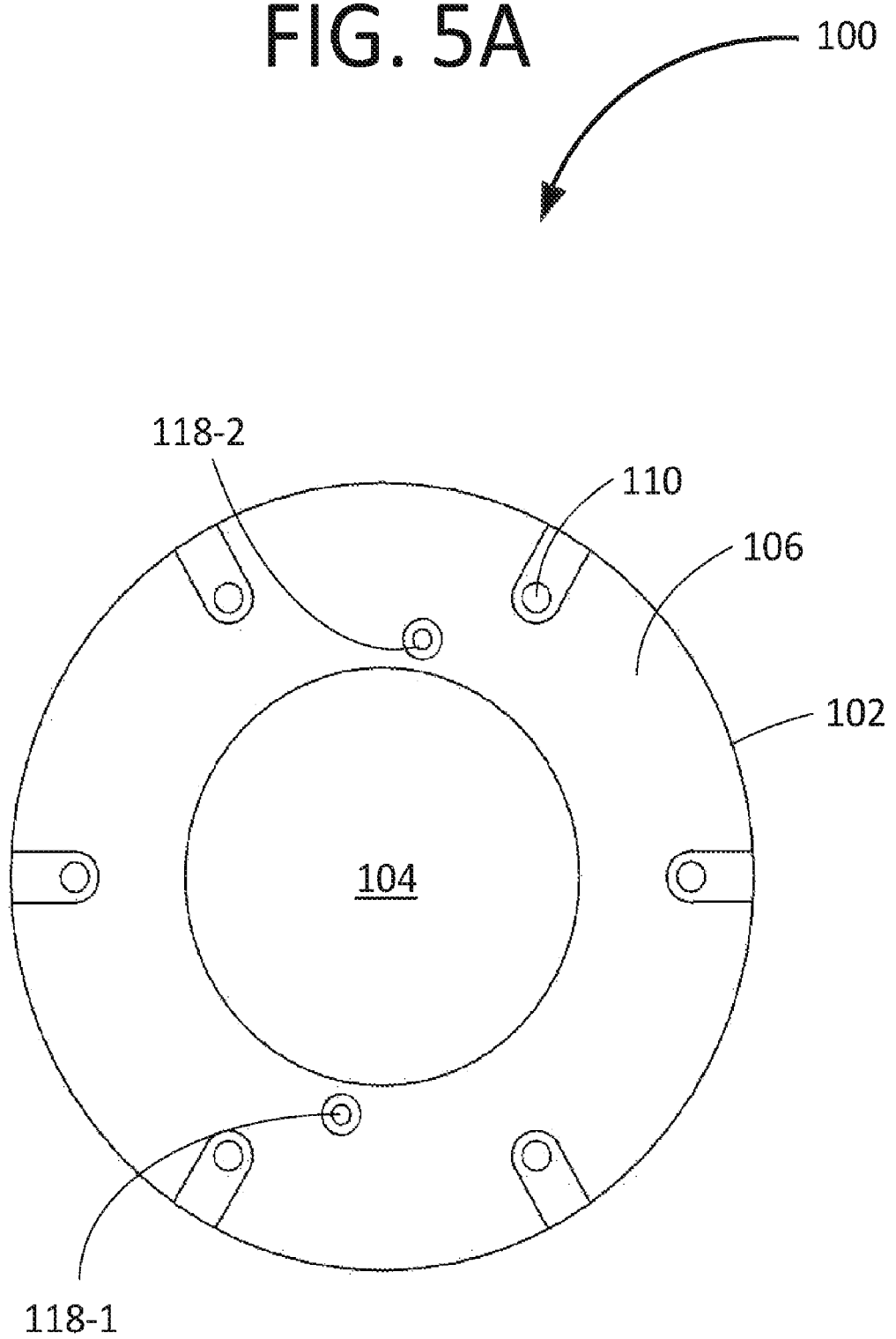

In another embodiment as shown in FIGS. 5A, 5B and 24A, each upper mounting flange hole 110 is generally aligned with a corresponding lower mounting flange hole 114. In this way the upper and lower mounting flange holes 110, 114 are not alternatingly offset from one another, but are instead aligned in corresponding pairs. In one example of this as shown in the figures, each upper mounting flange hole 110/lower mounting flange hole 114 pair is offset from a neighboring upper mounting flange hole 110/lower mounting flange hole 114 pair by 45°. In this way, the barrel 102 may include portions (areas) between each offset pair 110, 114 that may be made available for other components and/or elements as described in other sections. It is understood that other angular offsets between the pairs 110, 114 also may be used. In addition, the offsets between the upper mounting flange hole 110/lower mounting flange hole 114 pairs may not necessarily be symmetrical and any combinations of offset spacings may be used.

In one embodiment, because the upper mounting flange holes 110 may be generally aligned with the lower mounting flange holes 114, the upper and lower mounting flange holes 110, 114 may not entirely pass through the barrel 102 from top 106 to bottom 108. Instead, each upper and lower mounting flange hole 110, 114 may pass through only a portion of the barrel 102.

For example, in one embodiment, the lower mounting flange hole 114 may extend from the bottom side 108 partially into the barrel 102 (but not all the way through to the top side 106) and the hole 114 may include threads. In this way, a corresponding lower mounting bolt 404 may screw into the threaded lower mounting flange hole 114 and be held therein. This may eliminate the need for a nut to accompany the lower mounting bolt 404 (e.g., a nut that may typically be configured on the top 106 of the barrel 102) as the receiving threaded lower mounting flange hole 114 may provide this functionality.

An exemplary architecture for the upper mounting flange hole 114 and its corresponding upper mounting bolt 402 that accommodates the aligned configuration of the upper and lower mounting flange holes 110, 114 (as well as providing additional benefits) is described below.

In one exemplary embodiment hereof, the upper mounting bolts 402 may be break-away bolts. In one preferred implementation, the bolts 402 may include a hollow shaft (optionally filled with an epoxy). In this way, the bolts 402 may break upon the hydrant 14 receiving a sufficient impact (e.g., when an automobile may impact the hydrant 14). When this happens, the bolts 402 may break, the hydrant 14 may become dislocated from the barrel 102 (partially or completely), and the actuation assembly 300 may actuate the valve assembly 200 as described above. The valve plates 202, 204 may close and the barrel 102 may be sealed so that no water may flow from the water main 12 through the barrel 102. It may be preferable that the lower mounting bolts 404 be solid bolts so that they may not be break-away bolts, but this may not be required.

When the bolts 402 may be broken, it can be appreciated that the bolts 402 may require replacement upon reconfiguring the hydrant 14 with the system 10 after any repairs to the hydrant 14 may be performed as required. It can also be seen, that if the bolts 402 extend through the upper mounting flange holes 110 from the bottom surface 108 of the barrel 102 through the barrel 102 and out the top 106 of the barrel 102 as shown in FIG. 24, that in order to replace the bolts 402 the barrel 102 may require removal from the water main 12 to provide access to the bottom surface of the barrel 102 so that the broken bolts 402 may be removed. It can be appreciated that this may take extra time and cost extra money.

Figure 25:
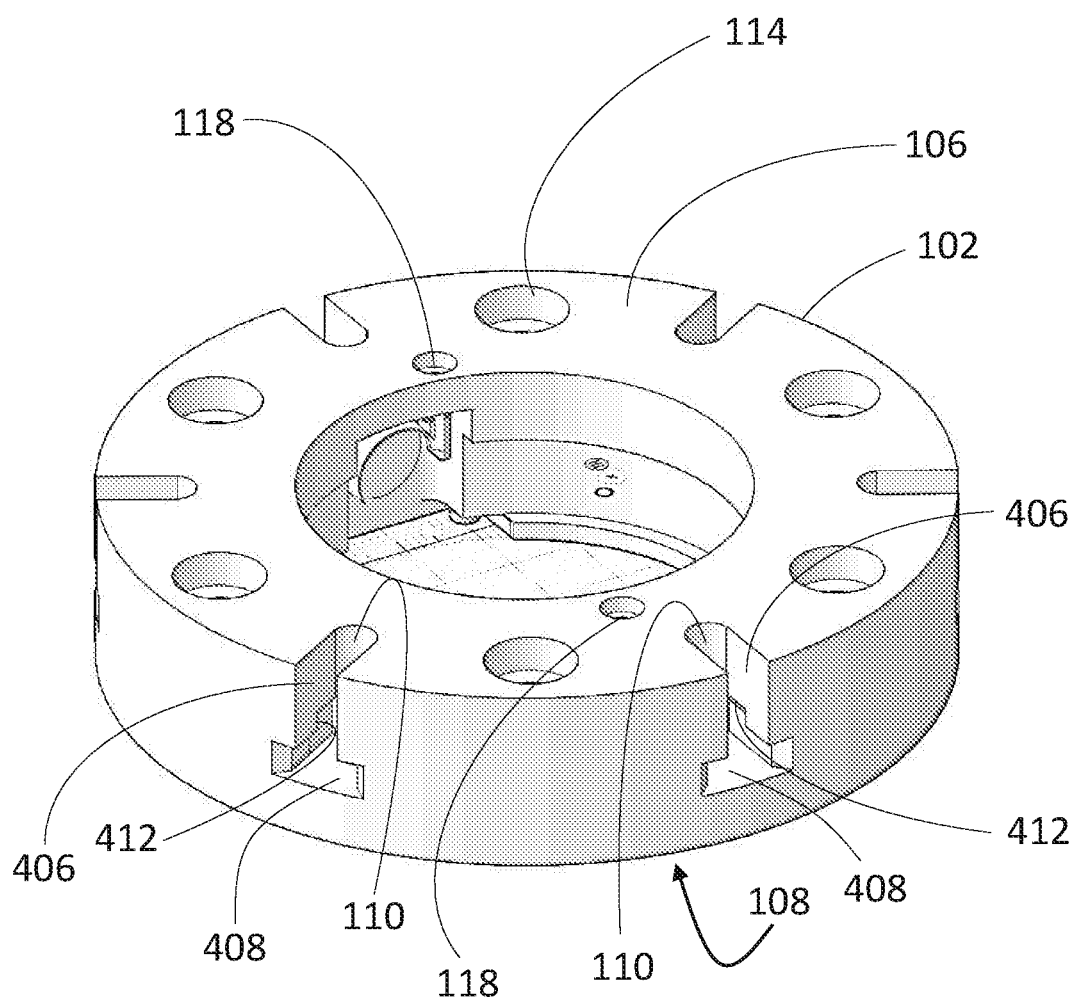
FIGS. 25-26B show aspects of a side bolt slot according to exemplary embodiments herein.
Figure 26:
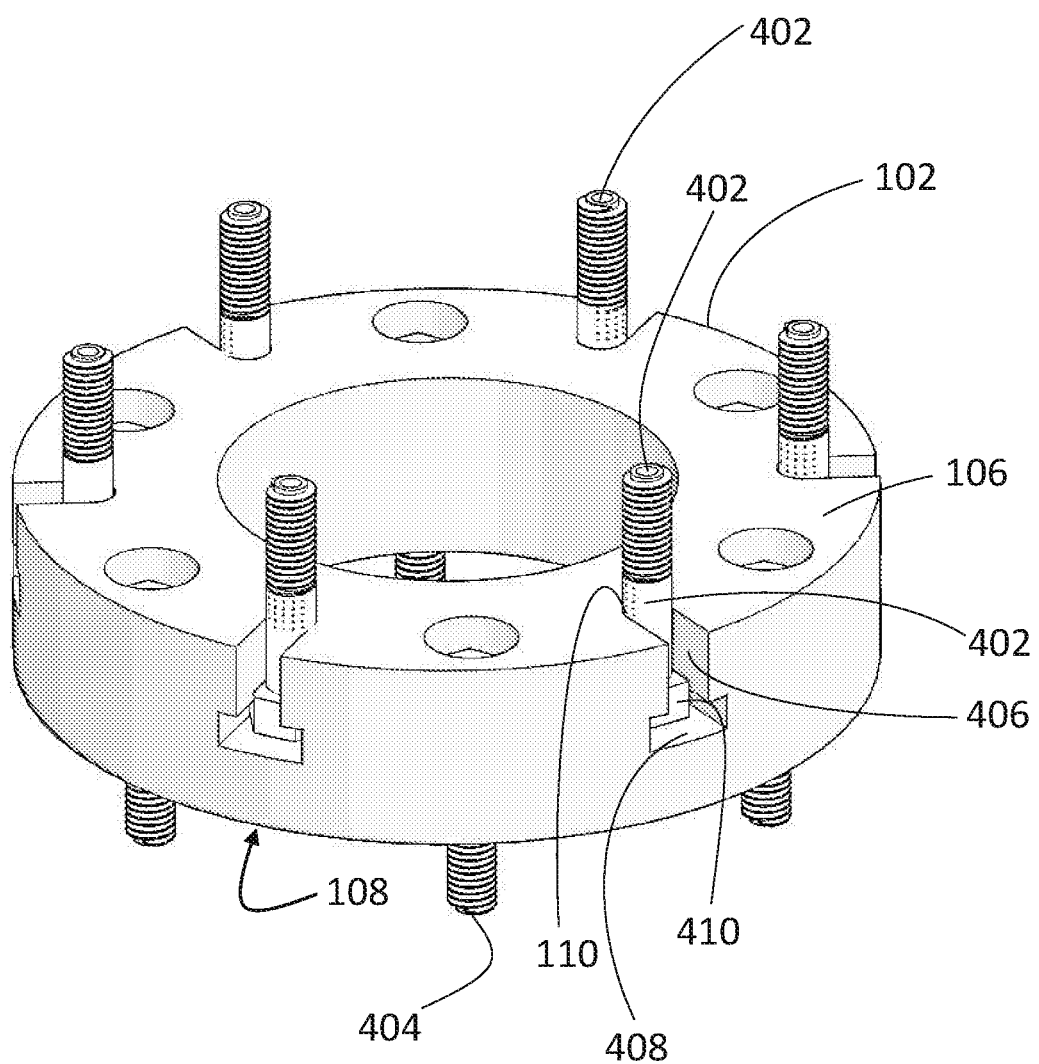

Accordingly, and according to one exemplary embodiment hereof as shown in FIGS. 25 and 26, the upper mounting flange holes 110 in the barrel 102 may include side bolt slots 406. The side bolt slots 406 may extend from the upper mounting flange holes 110 to the side circumferential surface of the barrel 102, and may be of sufficient width to allow the insertion of the upper mounting bolts 402 through the side bolt slots 406 and into the upper mounting flange holes 110.

It may also be preferable that each side bolt slot 406 include a lower portion 408 that may receive and accommodate the head 410 of the bolt 402 to be used with the upper mounting flange hole 110 as shown. Note that this lower portion 408 may be positioned above the bottom surface of the barrel 102 such that the upper mounting flange holes 110 may not pass from the top surface all the way through the barrel 102 to the bottom surface of the barrel 102. In addition, the lower portion 408 may include a width that may generally correspond to the width of the bolt head 410 (measured from flat side to flat side across the bolt head 410) so that the lower portion 408 may receive the head 410 and hold it secure as the bolt 402 is passed into the slot 406. In other embodiments, a locking washer may be used with the bolt 402 that may require a slightly wider lower portion 408, such that it may be preferable that the lower portion 408 be wide enough to accommodate the head of a wrench that may be used to hold the head of the bolt 402 stationary while the bolt 402 is configured with the hydrant 12.

In this configuration, the bolt 402 may extend from the lower portion 408 of the slot 406 upward through the upper mounting flange hole 110 and out the top of the hole 110. In some embodiments, the lower portion 408 may disallow the bolt head 410 from rotating, and therefore, the bolt itself 402 from rotating as well. In other embodiments, the head of a wrench may be used to hold the bolt 402 stationary. In any event, when the hydrant 14 is configured with the barrel 102 and the bolts 402 are inserted into the upper mounting flange holes 110 via the side bolt slots 406 and through the corresponding flanges on the bottom surface of the hydrant 14, the bolts 402 may be held secure and nuts may be applied to their upper ends. This may secure the hydrant 14 to the barrel 102. In some embodiments the side bolt slots 406 may be incorporated into the upper mounting flange holes 110 directly so that the junction between the slots 406 and the holes 110 may be seamless. However, this may not be necessary.

In addition, and according to one exemplary embodiment hereof, each upper mounting flange hole 110 in combination with its associated side bolt slot 406 with lower portion 408 may include a lower opening upper recess 412 that may be located within the lower portion 408 in the area of the bottom of the upper mounting flange hole 110. The dimensions of each upper recess 412 may be chosen to generally correlate with the dimensions of the head 410 of its associated bolt 402. In this way, when the bolt 402 may be configured within the slot 406 with its head 410 positioned below the upper recess 412, and the bolt 402 may be secured to its associated flange hole on the lower portion of the fire hydrant 14 (via a nut, threads within the flange or by other attachment mechanisms), the head 410 of the bolt 402 may be lifted upward into the upper recess 412 and be held secure therein as the bolt 402 may be tightened within the flange hole in the fire hydrant 14. This may further secure the bolt 402 within the flange opening 110 and the recess 412 may thereby prevent the bolt 402 from inadvertently sliding out of position.

Figure 26A:
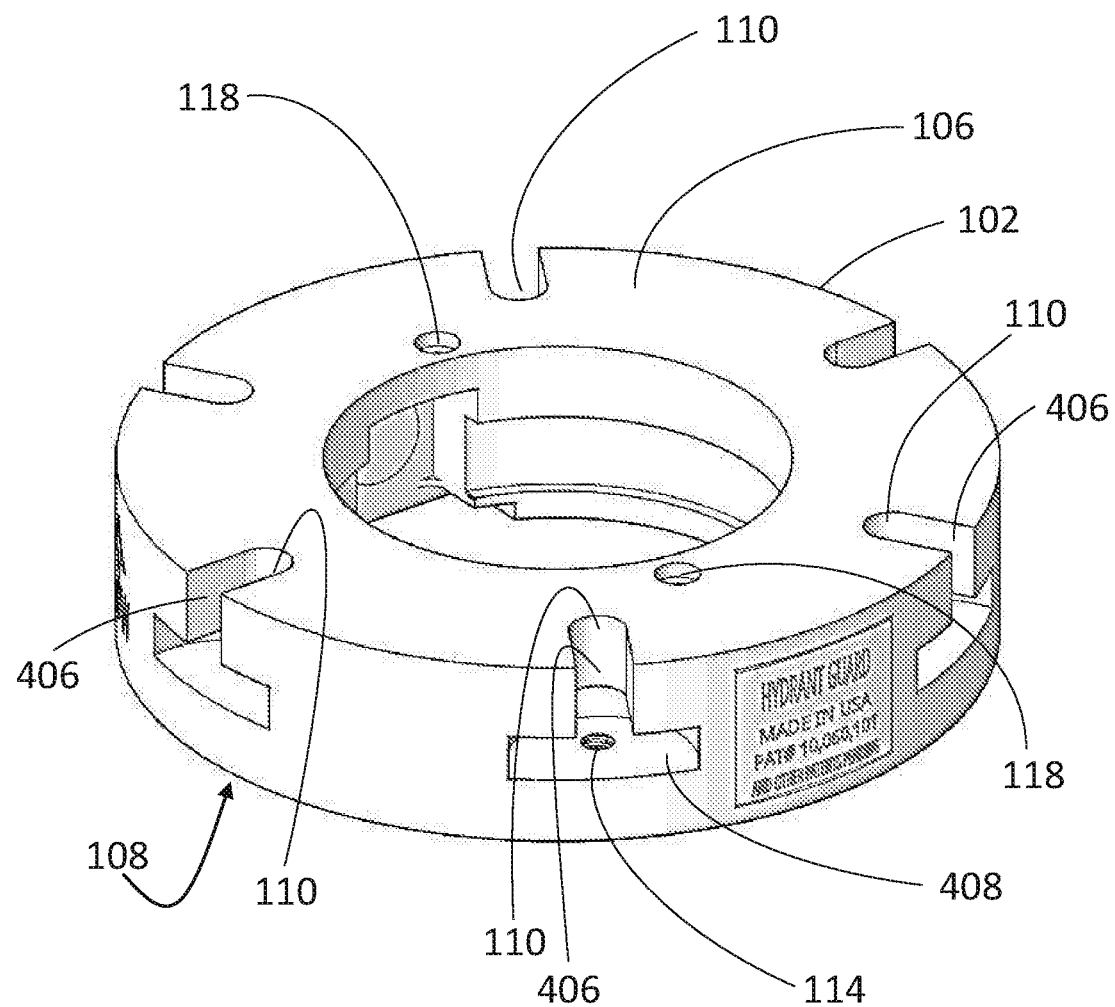
Figure 26B:
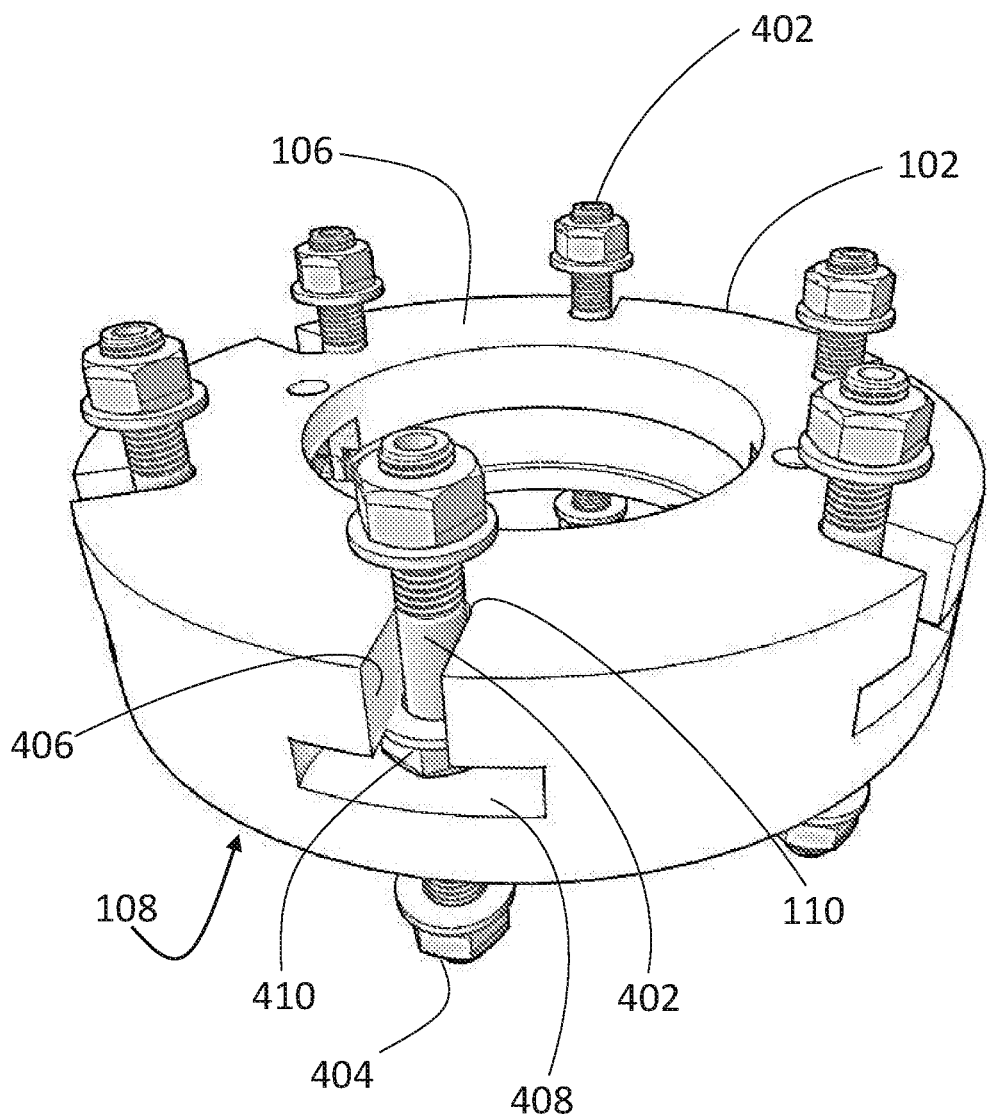

FIGS. 26A and 26B show the upper mounting flange hole 110 in combination with an associated side bolt slot 406 (and its lower portion 408) and aligned with a corresponding lower mounting flange hole 114. In some embodiments, the lower mounting flange hole 114 may extend through the lower portion 408 of the side bolt slot 406 aligned above the hole 114, while in other embodiments the hole 114 may not extend through the lower portion 408. In any event, it is preferable that a lower mounting bolt 404 that may be configured with the lower mounting flange hole 114 not obstruct or otherwise interfere with an upper mounting bolt 402 that may be configured within an upper mounting flange hole 110 and associated side bolt slot 406 aligned above the hole 114.

It can be seen then, that upon breakage, the broken bolts 402 may be removed by sliding the bolts 402 out of the upper mounting flange holes 110 via the side bolt slots 406. The broken bolts 402 may then be replaced by new bolts 402 by sliding the new bolts 402 into the upper mounting flange holes 110 via the side bolt slots 406. It is understood that this method of replacing the broken bolts 402 via the side bolt slots 406 may not require the removal of the barrel 102 from the water main 12, thus saving time and money.

Note that it may be preferable to shut off the water supply to the water main 12 while reconfiguring the hydrant 14 with the system 10 after an impact event. With no water pressure provided by the water main 12, the front and back valve plates 202, 204 may swing downward (due to gravity) to their lower and open configurations. As this happens, the valve hubs 206, 208 may also rotate such that the keeper pin areas 312, 318 may rotate back towards their associated keeper pins 302. The keeper pins 302 may ride on the valve hubs 206, 208 until the keeper pin areas 312, 318 may be aligned with the keeper pins 302, at which time the keeper pins 302 by drop down into their associated keeper pin slots 314, 320 such that their bottoms 308 may engage with their associated keeper pin slot lower surfaces 316, 322. The hydrant 14 may be attached to the top surface 106 of the barrel 102 and the keeper pins 302 may thereby be secured in their downward positions, thus locking the valve assembly 200 in its open configuration and generally resetting the system 10.

In Use

According to one exemplary embodiment hereof as shown in FIGS. 27-29, a method of stopping water flow from a water main 12 into a hydrant 14 upon the dislodgement of the hydrant 14 from the water main 12 may be provided by the use of the system 10.

As shown in FIG. 27, the system 10 may be configured between the water main 12 and the fire hydrant 14 as described in other sections or otherwise. Then, upon dislodgement of the hydrant 14 from the water main 12 (the water main 12 including with the system 10 configured with its top end), the system 10 may begin to actuate and close its valve assembly 200 as shown in FIG. 28. As shown, as the hydrant 14 may move away from the top surface of the barrel 102, the keeper pins 302 may be released and may move upward, subsequently releasing the valve plates 202, 204 from their downward and locked open positions. The upward water pressure provided by the water main 12 into the bottom of the barrel 102 may apply an upward force onto the valve plates 202, 204 that may cause the plates 202, 204 to rotate upward in the direction of the arrows G and D respectively.

Then, as shown in FIG. 29, the valve plates 202, 204 may continue to rotate upward into their fully upward and closed positions within the opening 104 of the barrel 102. The upward water pressure provided by the water main 12 into the bottom of the opening 104 may provide a constant upward force on the valve plates 202, 204 and the force may hold the plates 202, 204 in position, with the outer upper edges of the plates 202, 204 abutted against the downward facing surface 124 of the valve sealing surface 122 within the opening 104. In this way, the valve assembly 200 may be sealed closed and no water may be allowed to pass through the barrel 104.

In another exemplary embodiment hereof, referring to FIGS. 30-36 and 40 of the drawings, according to the present invention is a dual plate inversely mounted backflow and breakaway check valve illustrated in different views and generally designated by the reference numeral 10. In the preferred embodiment, the dual plate backflow and breakaway check valve 10 is installed above grade, under wet barrel fire hydrants and/or in line with all kinds of pipe conveying fluids to prevent fluid loss and property damage when fire hydrants and/or pipes are damaged.

Figure 30:
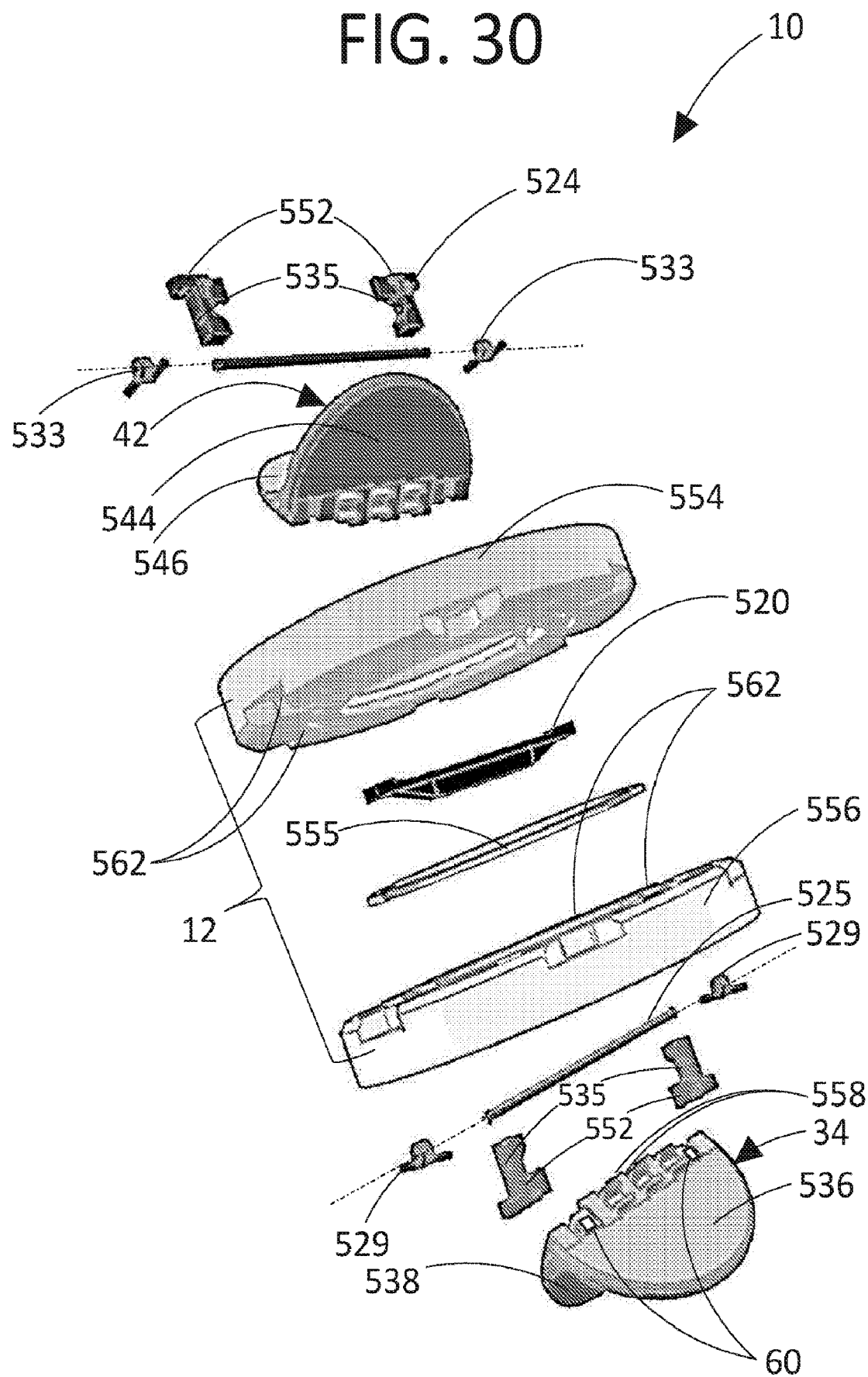
FIG. 30 is an exploded view of a dual plate backflow and breakaway check valve according to the preferred embodiment of the present invention.

Referring to FIG. 30, an exploded view of a dual plate backflow and breakaway check valve 10 is illustrated. The dual plate check valve 10 comprises a top mounting flange 554 and a bottom mounting flange 556. The dual plate check valve 10 further comprises an upper dual valve 42 and a lower dual valve 34. The upper dual valve 42 includes an upper front plate 544 and an upper back plate 546 arranged inside the upper valve holder 552 of the assembly 12 utilizing an upper valve pin 524 and a plurality of upper valve springs 533. The upper valve pin 524 is designed to insert through a plurality of upper valve pin holes 535 of the upper valve holder 552 with the upper valve pin 524, the plurality of upper plate pin holes 535 in 552 and the plurality of upper valve springs 533 firmly lock the upper front plate 544 and an upper back plate 546 inside the upper valve seat 552. The lower dual valve 34 includes a lower front plate 536 and a lower back plate 538 arranged inside the lower valve seat 552 of the assembly 12 utilizing a lower valve pin 525 and a plurality of lower valve springs 529. The lower valve pin 525 is designed to insert through a plurality of lower valve seat pin holes 535. The lower valve pin 525, the plurality of lower valve seat 552 pin holes 535 and the plurality of lower valve springs 529 facilitate fine locking of the lower front plate 536 and a lower back plate 538 inside the lower valve seat 552 of the assembly 12. In this way, the dual plate backflow and breakaway check valve device 10 provides a fast-locking mechanism to prevent a large amount of fluid loss when the fire hydrants and/or pipelines are damaged and/or broken. Lower valve stabilizer tabs 552 are a part of the lower valve seat 52 and upper valve stabilizer tabs 552 are attached inside the upper valve seat 552 of the assembly 12.

Figure 31:
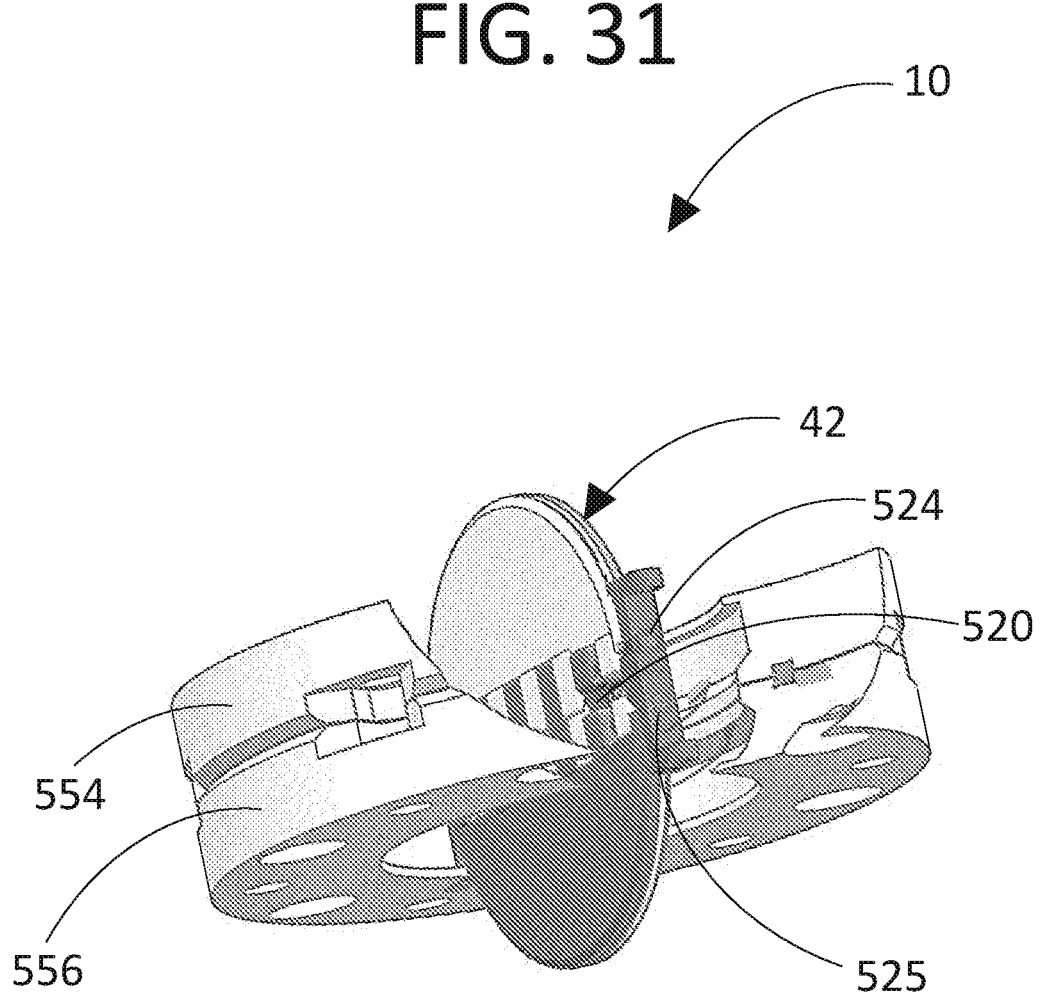
FIG. 31 is a side cut away view of the present invention, illustrating an upper dual valve, a lower dual valve, a top mounting flange and a bottom mounting flange of the dual plate backflow and breakaway check valve.

As shown in FIG. 31, the upper dual valve 42 is inserted into the upper valve seat 552 and the upper portion of the assembly 12 and the lower dual valve 34 is inserted into the lower valve seat 552 and into the lower portion of the assembly 12. A plurality of lower valve stay tabs 558 is attached perpendicularly to the lower front plate 536 and the lower back plate 538 of the lower dual valve 34. A plurality of witness holes 60 is located at the lower front plate 536 and lower back plate 538. A plurality of flange holes 62 is arranged at a circumference of both the top mounting flange 554 and the bottom mounting flange 556. The plurality of flange holes 562 is designed to attach the dual plate check valve 10 under the fire hydrant and/or in line with at least one pipeline. The dual plate check valve 10 further comprises a lower valve keeper bar 520 arranged within the upper valve seat 552 of the assembly 12. The lower valve keeper bar 520 moves up from between the plurality of lower valve stay tabs 558 upon breakage of the breakaway bolts 518 (See FIGS. 37, 38 and 39) thereby allowing the lower front plate 536 and lower back plate 538 to rotate about the lower valve pin 525 and to close the lower dual valve 34 upon an lower valve seat bevel 522 (See FIG. 38). Simultaneously, the upper front plate 544 and the upper back plate 546 rotate about the upper valve pin 524 and close upon an upper barrel bevel 528 (See FIGS. 36 and 38).

The upper front plate 544 and the upper back plate 546 are assembled around the upper valve pin 524 inserted through the plurality of upper valve seat 552 pin holes 535 incorporating the plurality of upper valve springs 533 which keeps the upper dual valve 42 in the closed position against the upper barrel bevel 528 (See FIGS. 36 and 38) during the static and backflow modes of the dual plate backflow and breakaway check valve 10.

Similarly, the lower front plate 536 and the lower back plate 538 are assembled around the lower valve pin 525 inserted through the plurality of lower valve seat pin holes 552 incorporating the plurality of lower valve springs 529 which facilitate the rotation of the lower front plate 536 and lower back plate 538. Upon actuation, the lower valve keeper bar 520 arranged within the upper valve seat 552 is moved away from the plurality of lower valve stay tabs 558 of the lower dual valve 34. This allows the lower dual valve 34 to close upon the lower valve seat bevel 522 (See FIG. 38) and minimizes the surge of fluid while allowing the plurality of witness holes 60 to indicate a stream of effluence 65 (See FIG. 39).

In the preferred embodiment, the plurality of witness holes 560 located at the lower front plate 536 and lower back plate 538 has a diameter of ¼ inch. The location of damage to fire hydrants and pipelines can be indicated and readily visualized by the relatively small size of the witness holes 60. The elevated pressure of the fluid contained within the lower dual valve 34 causes a limited high-pressure stream of effluence 65 (See FIG. 39) to emit from the lower dual valve 34. The witness holes 60 also provide some relief from water hammer generated in a pipeline system at the time of an automatic shutoff. The witness holes 60 can be eliminated on devices installed in line with pipes conveying caustic of explosive fluids.

Figure 32:
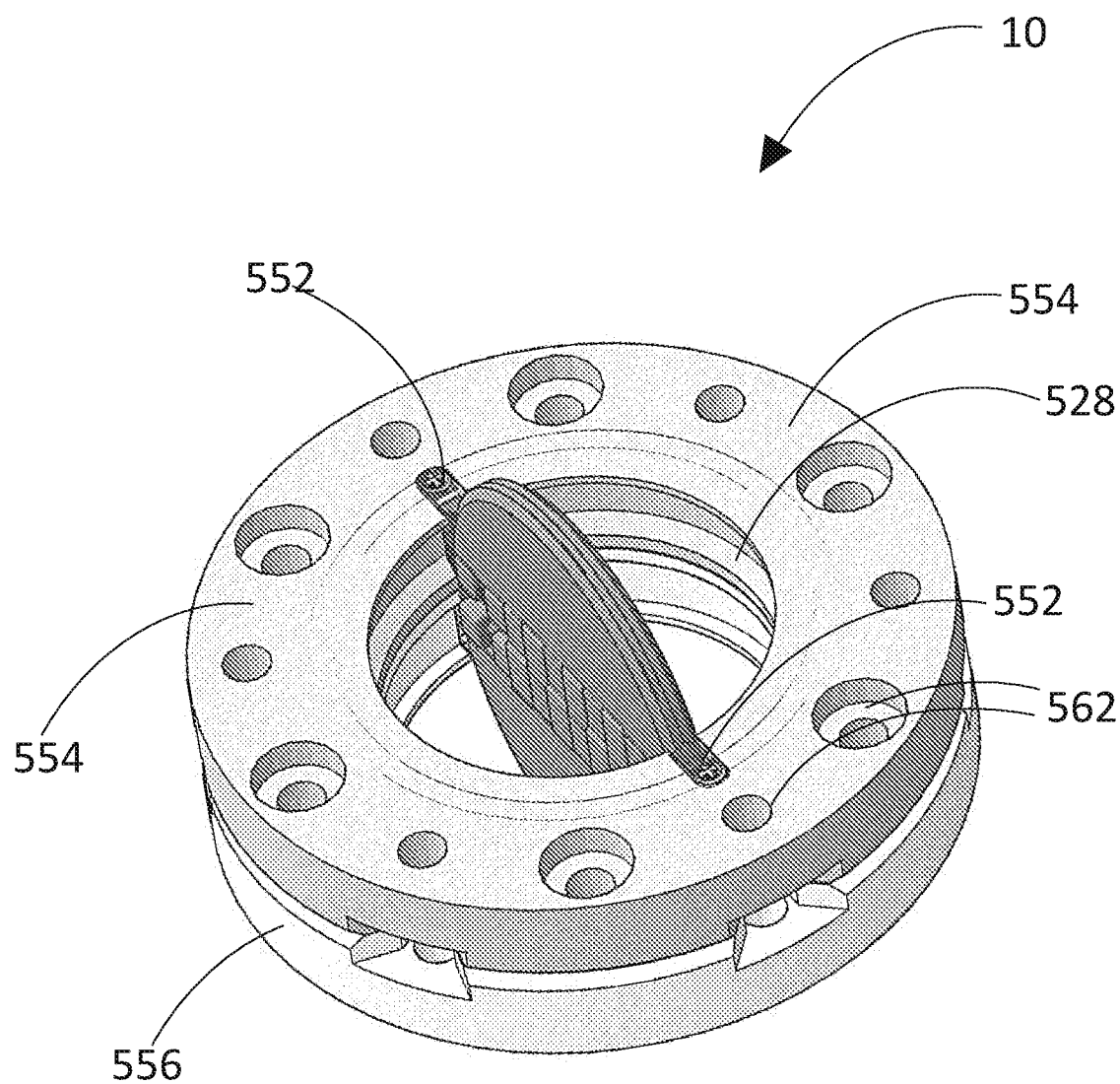
FIG. 32 is a top perspective view of the present invention, illustrating the upper dual valve, the top mounting flange, the bottom mounting flange and a plurality of flange holes of the dual plate backflow and breakaway check valve.
Figure 33:
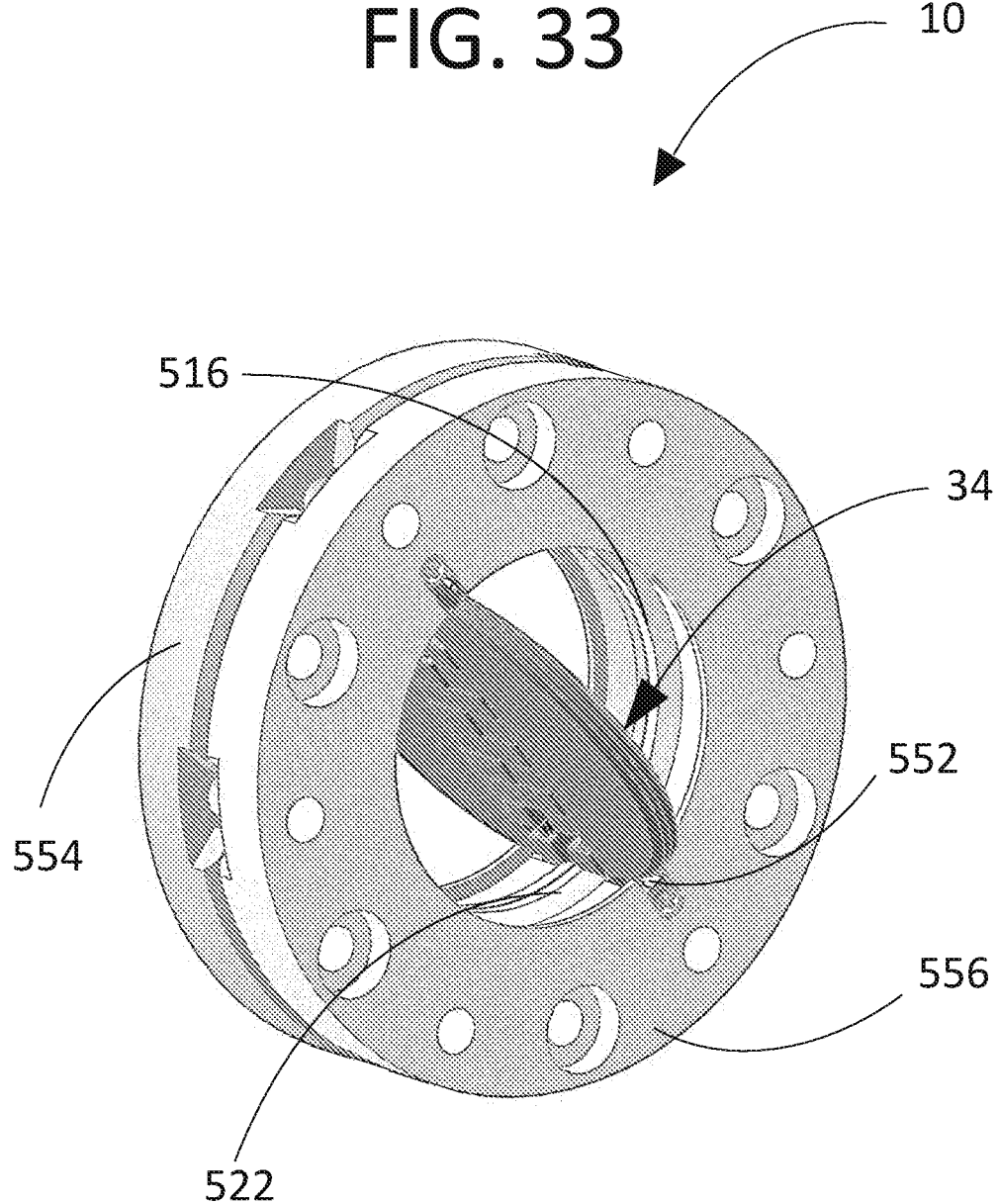
FIG. 33 is a bottom perspective view of the present invention, illustrating the upper dual valve, a lower valve keeper bar and an upper valve stabilizer bar of the dual plate backflow and breakaway check valve.
Figure 34:
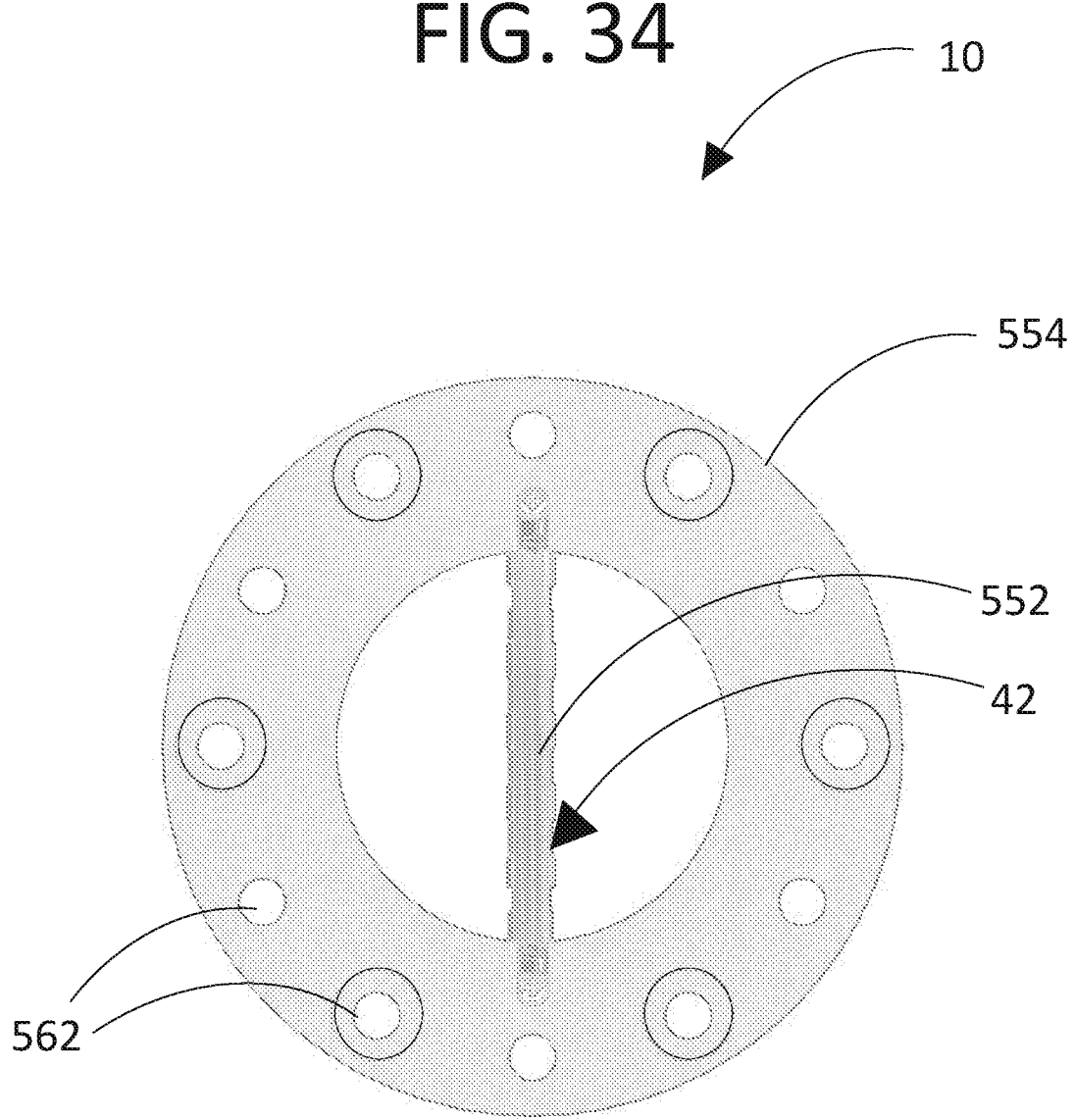
FIG. 34 is the top plan view of the present invention, illustrating the upper and lower dual valves of the dual plate backflow and breakaway check valve in an open position.

Referring to FIGS. 32-34, the top mounting flange 554 is attached to an upper valve seat 552 and the lower mounting flange 556 is attached to a lower valve seat 516. The lower dual valve 34 is arranged inside of the lower valve seat 516 utilizing the lower valve pin 525 and the upper dual valve 42 is arranged inside of the upper valve seat 514 utilizing the upper valve pin 524. The lower valve keeper bar 520 is arranged within the upper valve seat of the assembly 14.

Figure 35:
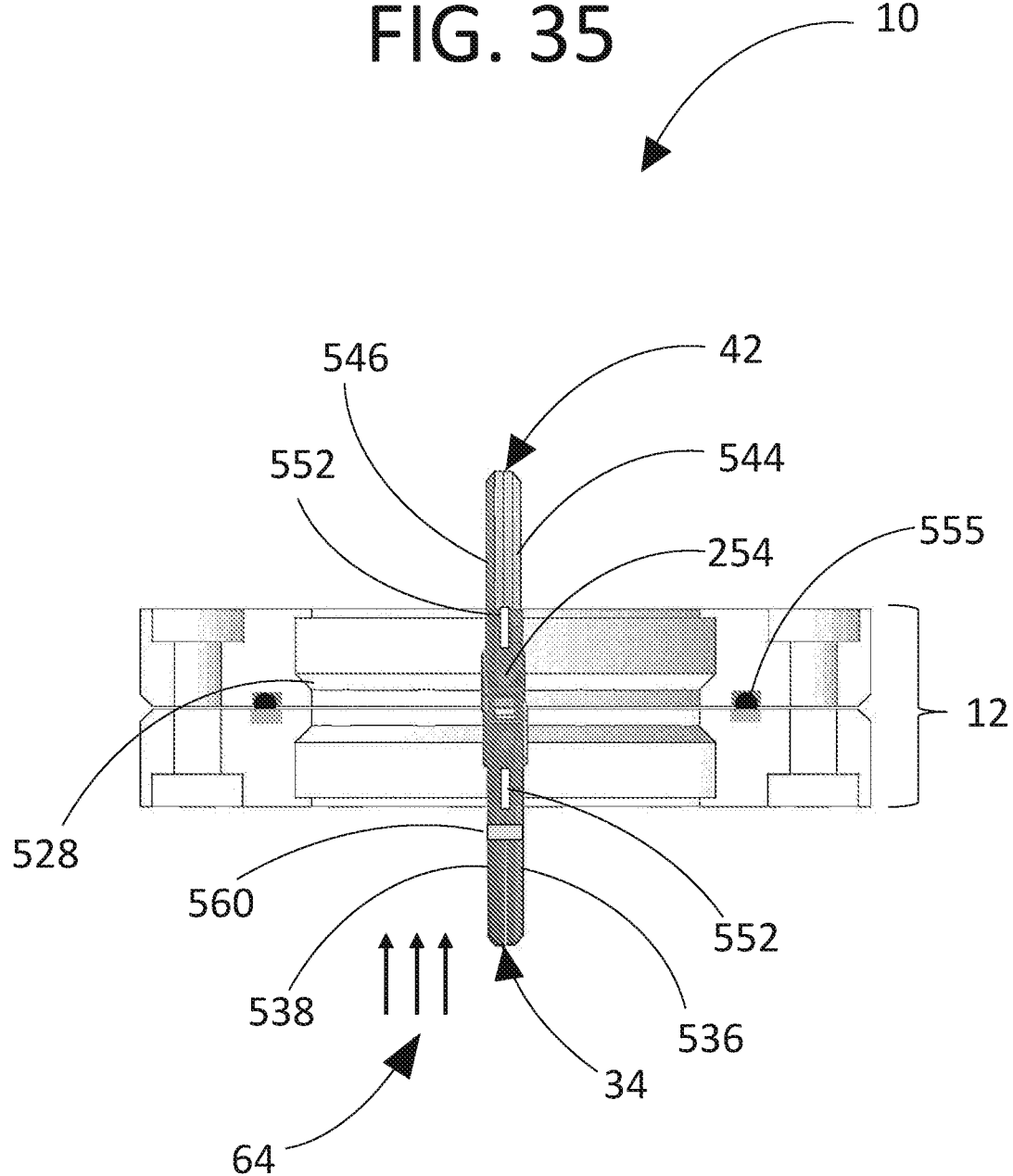
FIG. 35 is a front cross-sectional view of the present invention, illustrating the dual plate backflow and breakaway check valve in a normal flow mode.

FIG. 35 is the top plan view of the present invention, illustrating the upper dual valve 42 in an open position. The lower valve stabilizer bar 550 (See FIG. 7B) and the upper valve stabilizer tab 552 (See FIG. 37B) prevents the upper and lower dual valves 42 & 34 from rotating more than 90 degrees.

Figure 36:
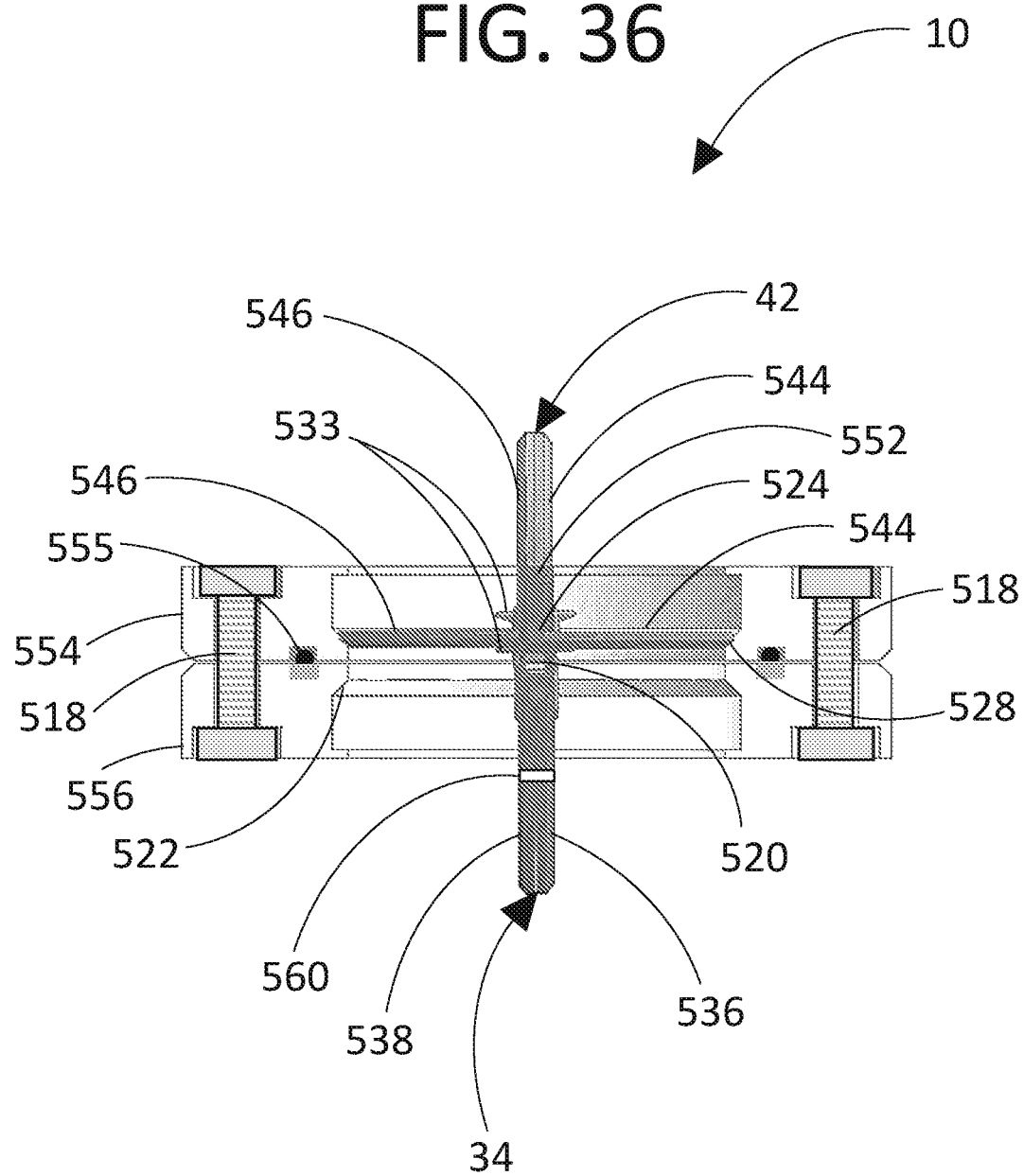
FIG. 36 is a front cross-sectional view of the present invention, illustrating the dual plate backflow and breakaway check valve in a static and flow mode.

FIG. 36 is a front cross-sectional view of the present invention, illustrating the dual plate check valve 10 in a normal flow mode. In a normal fluid flow mode, the fluid flowing through the dual plate check valve 10 causes the upper front plate 544 and the upper back plate 546 to open up to a 90 degree angle away from the upper valve bevel 528 by rotating around the upper valve pin 524 that is connected to the upper pin mounting holes 535 (See FIG. 31). The upper valve stabilizer tabs 552 prevents the upper front plate 544 and the upper back plate 546 of the upper dual valve 42 from rotating more than 90 degrees. In the normal flow mode, the upper dual valve 42 and the lower dual valve 34 are in the open position to permit the flow of fluids 64 (See FIG. 36). The witness holes 60 located at the lower front plate 536 and the lower back plate 538 allows the dual stream of effluence 65 (See FIG. 39) to be visible upon activation of the assembly 12.

Figure 37:
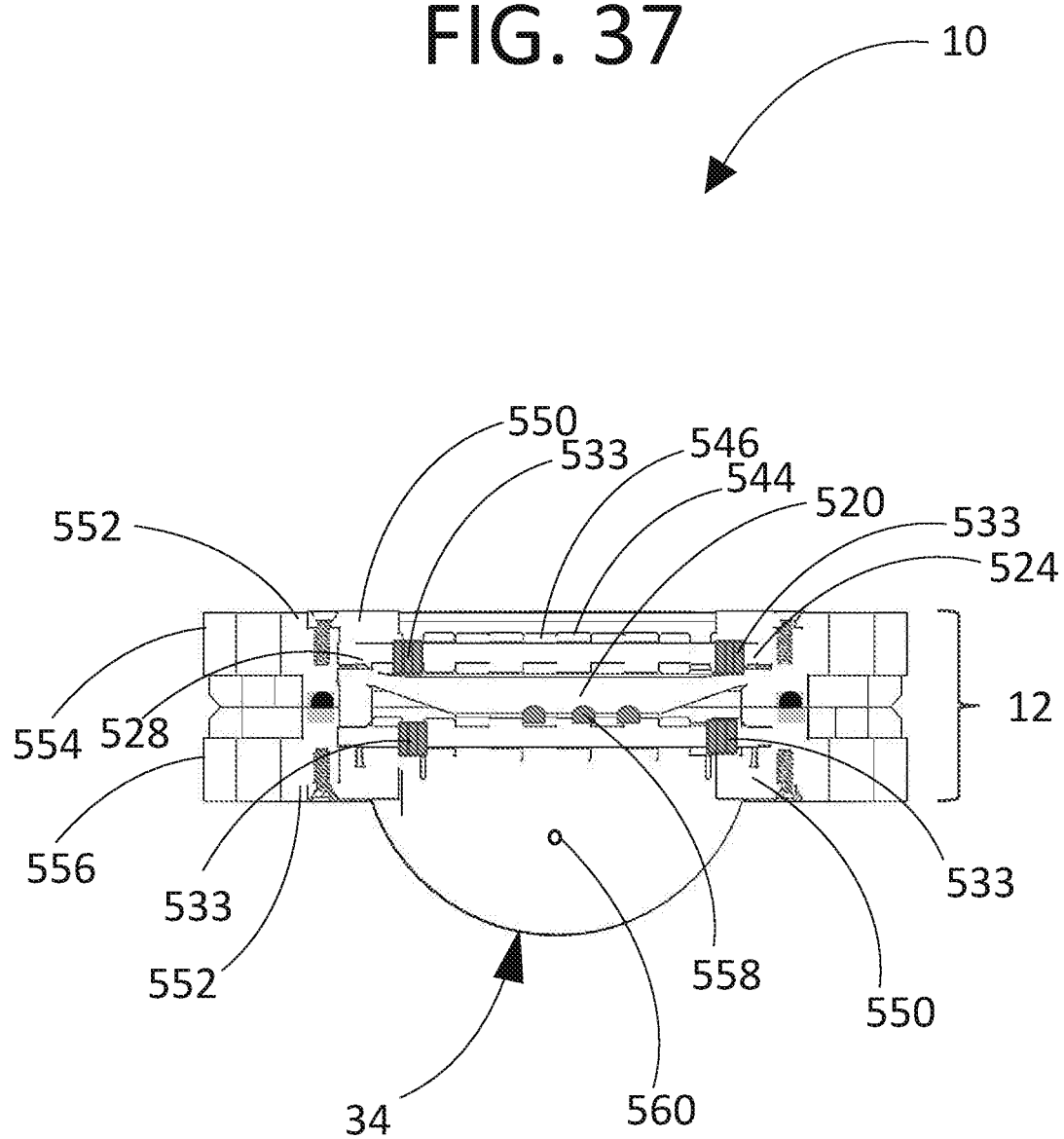
FIG. 37 is a side cross-sectional view of the present invention, illustrating the dual plate backflow and breakaway check valve in the static flow mode.

FIG. 37 illustrates front and side cross-sectional views of the present invention, illustrating the dual plate check valve 10 in a static and flow mode. In the static flow mode, such as when the dual plate check valve 10 is used in conjunction with a wet barrel fire hydrant and/or pipeline, the upper dual valve 42 remains closed due to its spring-loaded feature caused by the plurality of upper valve springs 533 (See FIG. 37). The plurality of upper valve springs 533 keeps the upper dual valve 42 in a closed position upon the upper valve seat bevel 528 when there is no flow of fluid. In the closed position, the upper dual valve 42 functions as a backflow preventer which minimizes the insertion of unwanted agents into the fluid through the fire hydrant and/or pipeline. The lower dual valve 34 is kept in an open position utilizing the lower valve seat keeper bar 520 that moves away with the upper valve holder 552 upon breakage of the breakaway bolts 518 (See FIG. 37). The lower valve stabilizer tabs 550 prevents the lower front plate 536 and the lower back plate 538 from rotating in the wrong direction when the lower valve keeper bar 520 arranged within the upper valve seat 552 moves away upon the shearing of the breakaway bolts 518 (See FIGS. 37, 38 & 39). The witness holes 60 located at the lower front plate 536 and lower back plate 538 creates a dual warning stream of effluence 65 (See FIG. 39) upon damage to the fire hydrant and/or pipeline. These witness holes 60 can be plugged or eliminated if and when pipes carry caustic and/or flammable liquids.

As shown in FIG. 37, the upper front plate 544 and upper back plate 546 are assembled around the upper valve pin 524 that is inserted through the upper pin mounting holes 535 (See FIG. 31) incorporating the upper valve springs 533 which keeps the upper dual valve 42 in the closed position against the upper barrel bevel 528 during the static flow mode. The upper pin mounting hole 535 (See FIG. 31) located at the upper valve seat 552 connects the upper dual valve 42 and the upper valve seat 552 of the upper assembly 554 together. The lower pin mounting hole 540 (See FIG. 31) located at the lower valve seat 552 connects the lower dual valve 34 and the lower flange 556 of the assembly 12 (See FIG. 37) together, which facilitates the rotation of the lower front plate 536 (See FIG. 31) and the lower back plate 358 (See FIG. 31). Upon actuation, the lower valve keeper bar 520 is moved away from the lower valve stay tabs 558 (See FIG. 37) of the lower dual valve 34. This allows the lower dual valve 34 to close upon the lower valve seat bevel 522 (See FIG. 38) and minimizes the surge of fluids.

Figure 38:
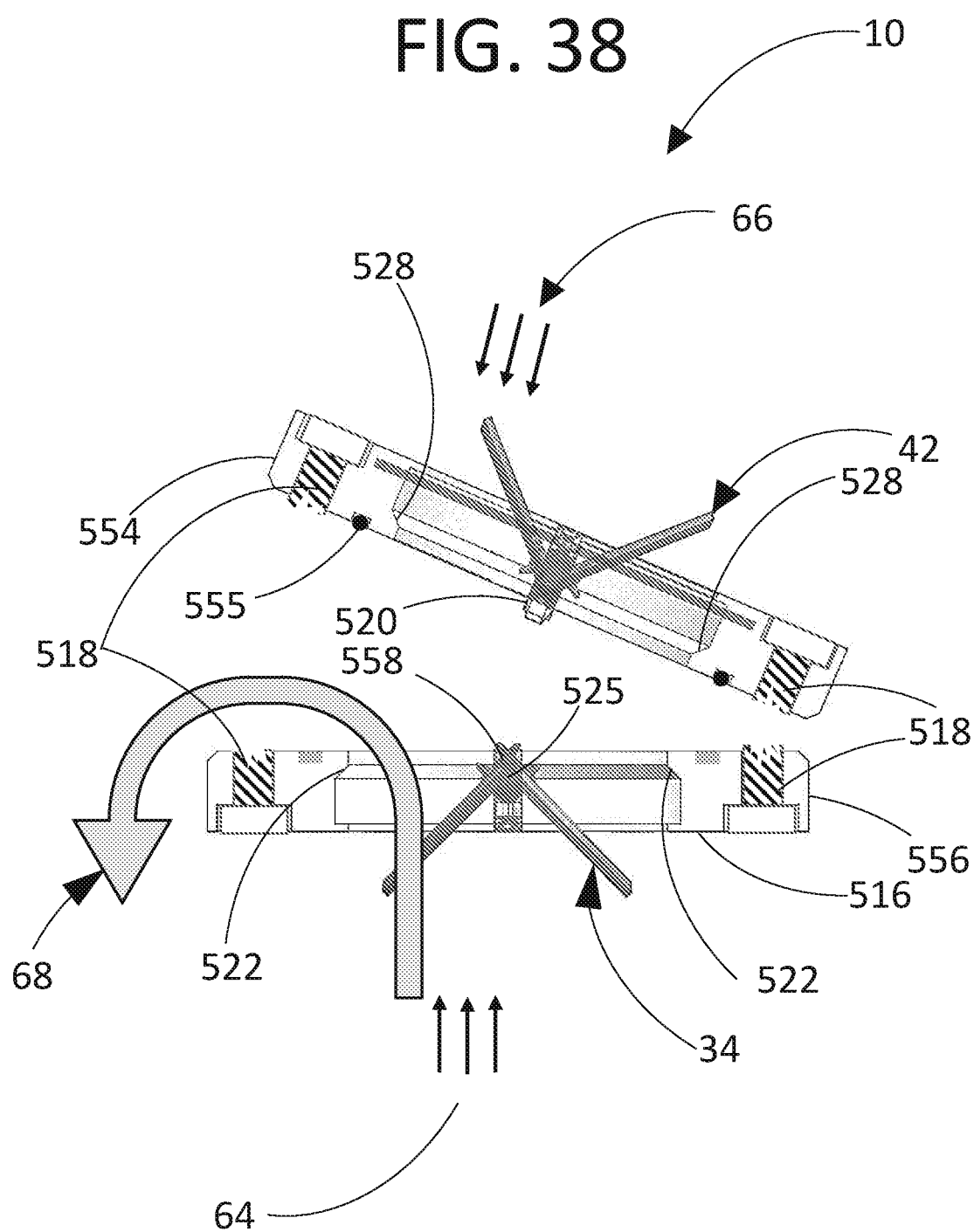
FIG. 38 is a side cross-sectional view of the present invention, illustrating the dual plate backflow and breakaway check valve in a partially deployed flow mode.

FIG. 38 is a side cross-sectional view of the present invention, illustrating the dual plate check valve 10 in a partially deployed mode. During the partially deployed mode, the lower valve keeper bar 520 moves away upon breakage of the breakaway bolts 518 freeing the plurality of lower valve stay tabs 558 of the lower dual valve 34 which can then open when the lower dual valve 34 rotates 90 degree around the lower valve pin 525. Thus, the lower dual valve 34 can seat on the lower flange bevel 522 of the lower flange 556 and stops the flow of fluid 64. Due to the quick closure of the upper dual valve 42 and lower dual valve 34, a minimal fluid loss 64 is resulted. The upper dual valve 42 starts to close due to the loss in pressure and fluid flow 64 thereby preventing the loss of fluids from the unpressurized portion of the pipeline. A reverse fluid back flow 66 caused by the breakage of the breakaway bolts 518 assists the upper dual valve 42 in its closure state upon the upper valve seat bevel 528.

Figure 39:
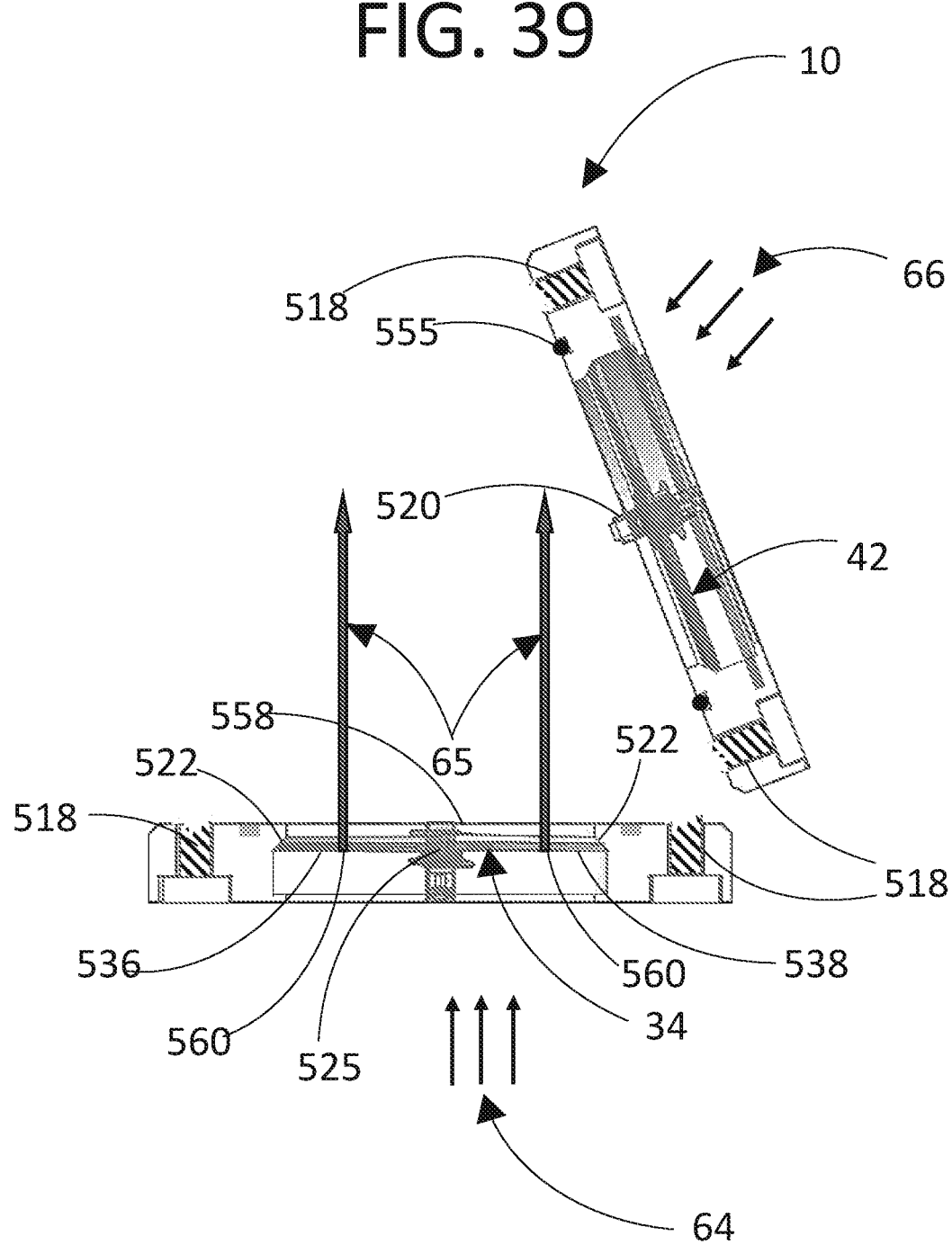
FIG. 39 is a side cross-sectional view of the present invention, illustrating the dual plate backflow and breakaway check valve in a fully deployed stop flow mode.

FIG. 39 is a side cross sectional view of the present invention, illustrating the dual plate check valve 10 in fully-deployed flow mode. The lower valve keeper bar 520 moves out from position upon the breakage of the breakaway bolts 518 freeing the plurality of the lower valve stay tabs 558 and allowing the lower dual valve 34 to close upon the lower valve seat bevel 522. During the fully deployed flow mode, the lower dual valve 34 achieves the 90-degree rotation around the lower valve pin 525 due to the fluid flow 64 which is permitted by the displacement of the lower valve keeper bar 520. The upper dual valve 42 remains closed due to the residual back pressure of fluid 66 causing the streams of effluence 65 to be visible through the witness holes 60 in the lower front plate 536 and lower back plate 538 of the lower dual valve 34 due to the fluid pressure 64. The witness holes 60 can be plugged or eliminated if and when pipes carry caustic and/or flammable liquids. In the dual plate backflow and breakaway check valve 10, any type of pipe conveying any type of fluid therein, such as water, crude oil, refined petroleum in all its forms and any other liquids requires no modification to the pipe itself, only the attachment to the valve in a particular area where the pipe may be susceptible to damage and breakage.

The dual plate check valve 10 may be of various diameters and may contain various fluids under pressures ranging between 50 and 150 pounds per square inch. Furthermore, the source of fluid pressure is assumed to have a large capacity such that the fluid flow pressure does not decrease over time, particularly within the timeframe of an automatic closing condition. The lower dual valve 34 which acts as a shutoff valve is arranged in a controlled manner so as to rotate to the closing position to ensure that initial closing results in substantially complete shutoff of fluid flow through the lower dual valve 34. The sudden breakage of the breakaway bolts 518 and the automatic shut off of the lower dual valve 34 and the upper dual valve 42 reduces further damage to wet barrel fire hydrants and/or pipelines conveying fluids of all types.

Data Capture

Figure 40:
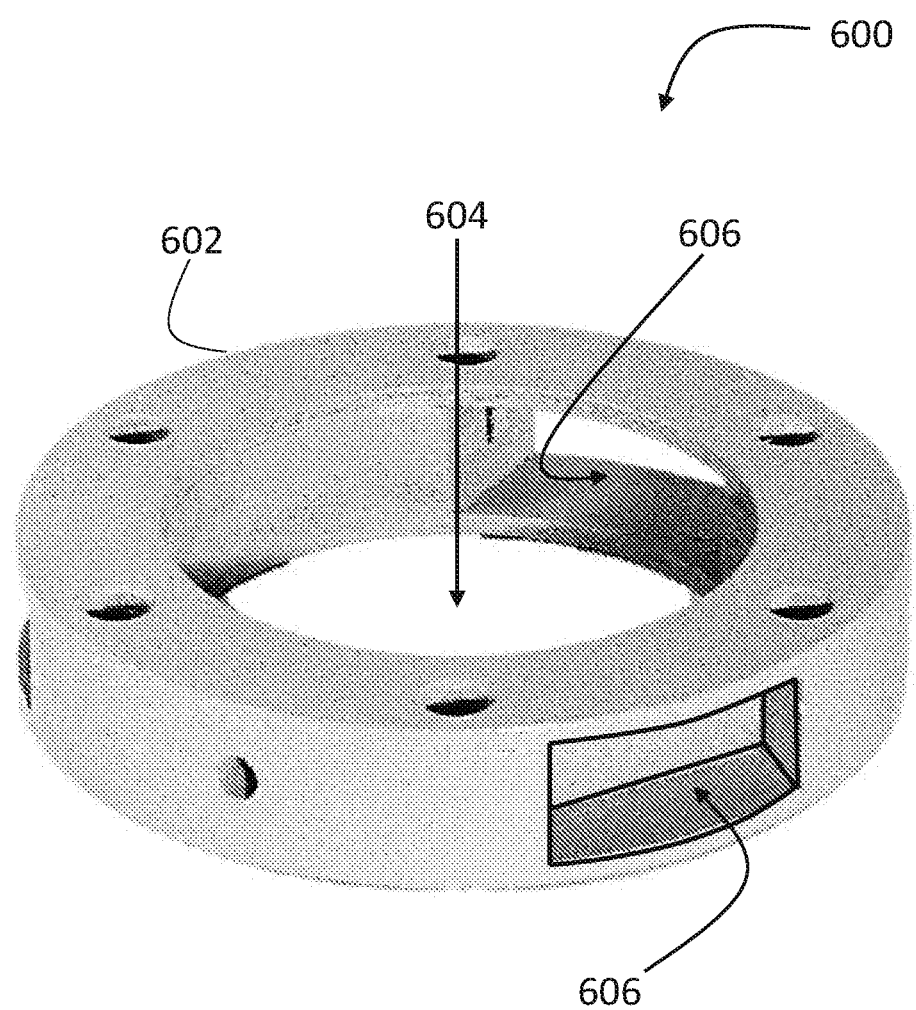
FIGS. 40-41 show aspects of a sensor barrel according to exemplary embodiments herein.
Figure 41:
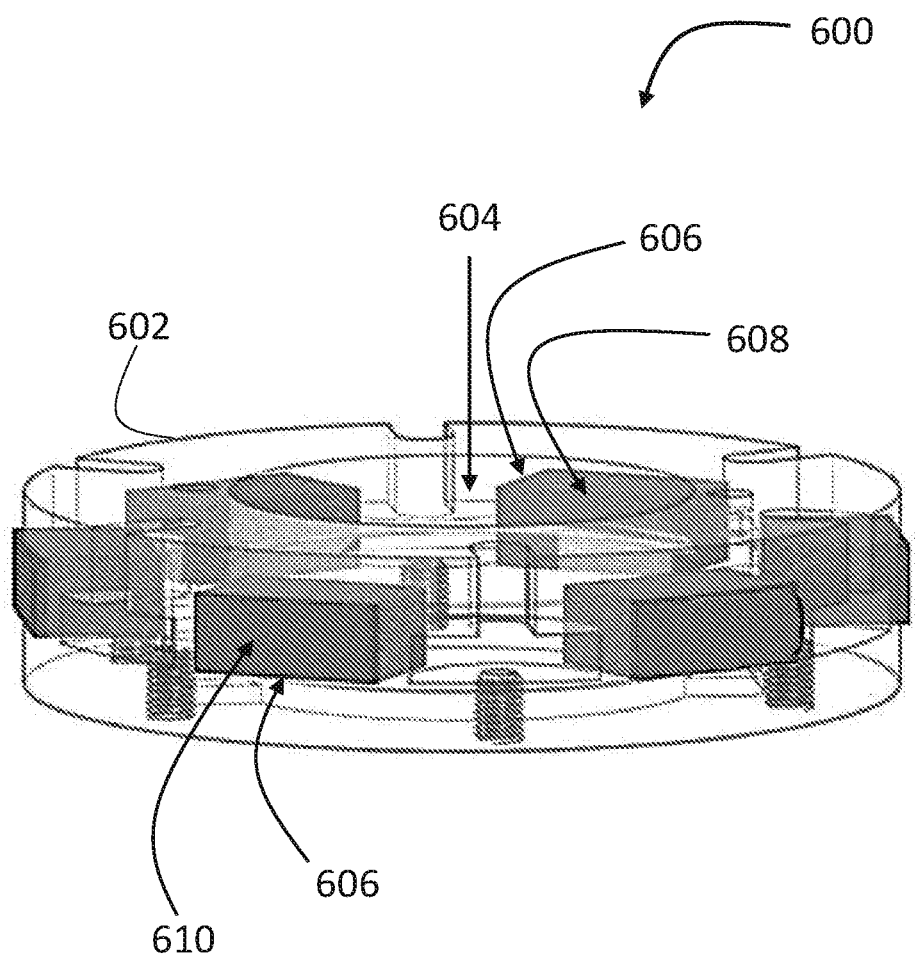

In one exemplary embodiment hereof as shown in FIGS. 40 and 41, the system 10 may include a portion that may house various sensors that may collect data regarding the water flowing through the system 10 or other parameters. In some examples, the data collecting functionalities may be applied to all types of wet barrel fire hydrants and other types of pipes conveying fluids.

In one embodiment, the system 10 may include a sensor housing 600. In some embodiments the sensor housing 600 may include a sensor barrel 602 with an opening 604. It may be preferable that the sensor barrel 602 and the opening 604 generally match the footprint of the barrel 102 of the system 10 so that the sensor barrel 602 may be attached to the barrel 102 (e.g., to the bottom 108 of the barrel 102 between the barrel 102 and the water main 12).

Accordingly, it may be preferable that the sensor barrel 602 include openings and/or threaded holes that may accommodate the attachment mechanisms (e.g., bolts) used when attaching the barrel 102 to the water main 12 so that the sensor barrel 602 may be configured therebetween.

In some embodiments, the sensor barrel 602 includes one or more side cavities 606 that may be adapted to receive and house various sensors 608 and/or other electronic devices 610 (e.g., microcontrollers, microprocessors, etc.). In some embodiments, the sensors 608 may generally collect data and the electronic devices 610 may generally read the data, process the data, transmit the data, receive data from outside sources, and other activities. In this way, the cavities 606 and associated sensors 608 and electronic devices 610 may be considered data ports.

In some embodiments, the barrel 602 may include six cavities 606 around its circumference measuring about 2" wide×1" tall. Some cavities 606 may be about 1½" deep, while other cavities 606 may pass through the entirety of the barrel's side walls. It is understood that the dimensions provided above are meant for demonstration and that the sensor barrel 602 and its cavities 606 may be dimensioned as necessary depending on its application.

The sensors 608 and/or the electronic devices 610 may be powered by onboard batteries, from outside power sources (e.g., the grid) or by other power supplying methods. In the case using batteries to power the sensors 608 and devices 610, it may be preferable that the devices 610 transmit data in packets to conserve battery life (e.g., to provide a 5-year battery life). However, this may not be necessary.

The cavities 606 may provide the sensors 608 and electronic devices 610 with appropriate access to the water flow through the opening 604. For example, some cavities 606 may extend from the outer circumferential surface of the sensor barrel 602 to the inner circumferential surface of the inner opening 602 so that the sensors 608 may make physical contact with the water flowing through the opening 604. In other embodiments, the cavities 606 may not extend to the inner circumferential surface of the inner opening 602 so that the electronic devices 610 may be housed in a waterproof environment. In this case, wire holes or other passageways may be included to link the electronic devices 610 within the waterproof cavities to the sensors 608 to receive data from the sensors, etc.

In some embodiments, the sensors 608 and/or electronic devices 610 may include (without limitation):

1) Motion detectors
2) Water quality sensors
3) Water pressure sensors
4) Cameras
5) Smoke detectors
6) Audio/accident/gunfire detection & recording devices
7) Transmitting capabilities in packets or constant transmissions
8) Triangulation capable devices
9) Leak detection devices
10) Drone guidance devices
11) Other types of sensors 608 and/or electronic devices 610

In one example embodiment, the sensors 608 and/or electronic devices 610 may include a shedder bar 612 and its associated processor. In one embodiment of this, the shedder bar may include a paddle design which activates and spins within fluid flow. Accordingly, as fluid flows through the sensor barrel 602, the fluid may cause the shedder bar to spin. This spinning generates an alternating magnetic force, which may be read by an electronic device 610 mounted within a cavity 606. Upon sensing a change in the water flow via the shedder bar (which may indicate a water line breakage or other type(s) of problems), a warning signal may be transmitted by an electronic device 610 to a local utility entity to alert the entity of the potential problem. In some examples this change in water flow may be caused by a hydrant being removed from the system 10. Other types of shedder bars also may be used (e.g., non-magnetic).

Expanding further on this example, three or more systems 10 implemented with three or more hydrants 14 may be used to triangulate problems within the network of water pipes associated with the hydrants 14. For example, by receiving information from three systems 10 of water flow changes, and by understanding the architecture and layout of the associated water line network(s), the water utilities entity may be able to use the location of the systems 10 to triangulate the location of the problem.

In some embodiments, the sensor barrel 602 may include an outer diameter of about 11¼" with an inner diameter of the opening 604 of about 6". The barrel 602 also may be about 1½" tall. The sensor barrel 602 also may include six standardized bolt holes so that it may be configured with the system 10, a water main 12 and/or a hydrant 14. It is understood that the dimensions and bolt layout provided above are meant for demonstration and that the sensor barrel 602 may be dimensioned as necessary depending on its application.

In some embodiments, the sensor housing 600 may be mounted under the system 10 and/or retrofitted with any existing water main 12 and/or hydrant 14.

Figure 42:
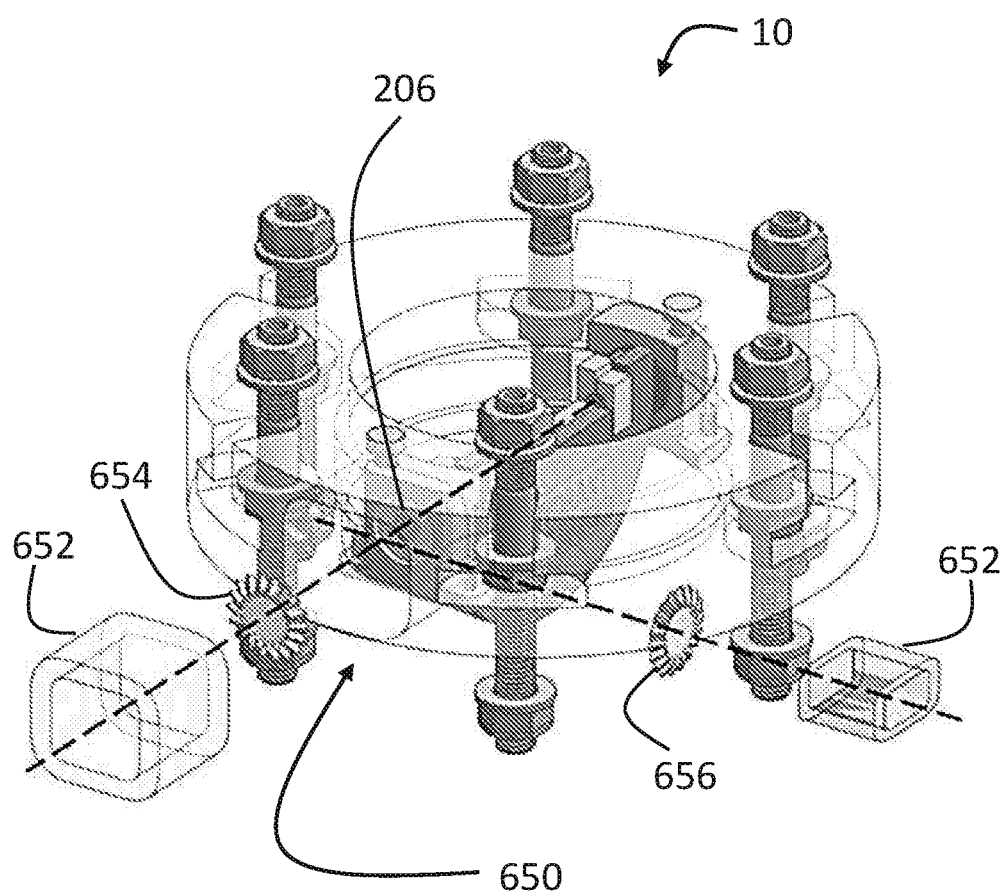
FIGS. 42-43 show aspects of a remote-control system according to exemplary embodiments herein.
Figure 43:
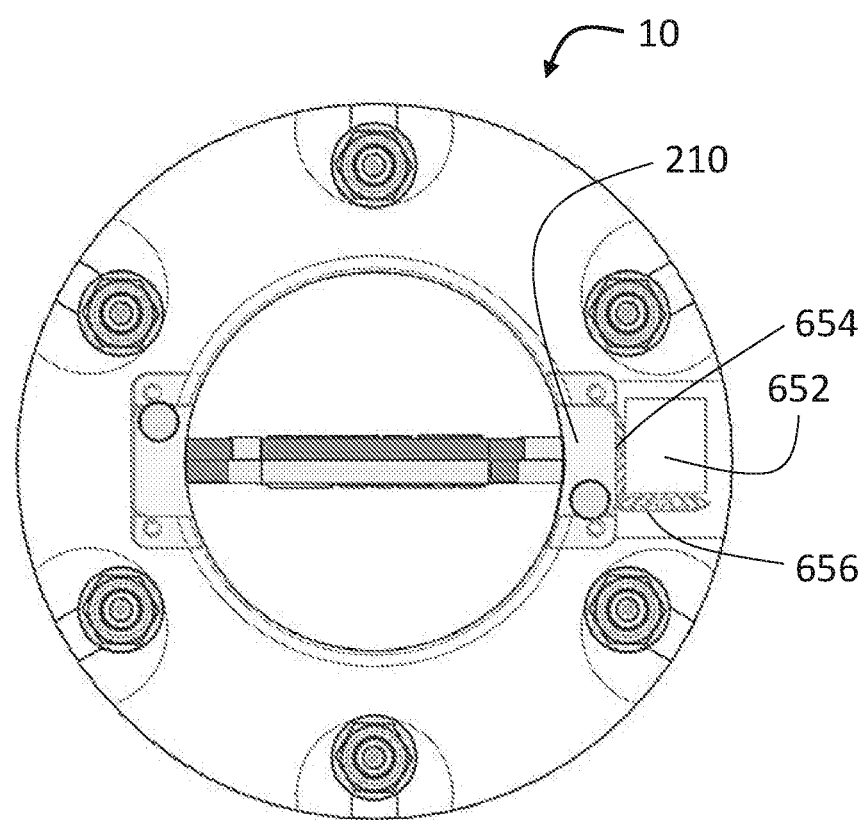

In one exemplary embodiment hereof as shown in FIGS. 42 (exploded view) and 43 (bottom view), the system 10 may include a remote-control system 650 that may enable the control of the valve assembly 200 from a remote location. The remote-control system 650 may include one or more actuators 652 that may be adapted to rotate the valve hubs 206 and/or 208. The actuators 652 may include motors (e.g., servo motors) configured with transceivers that may receive commands from remote locations, process the commands, and implement the commands by rotating the hubs 206, 208. The commands may direct the actuators 652 to rotate one or each hub 206, 208 a specific amount (e.g., in degrees) such that the associated valve plates 202, 204 may also be rotated. In this way, the position of the valve plates 202, 204 may be controlled remotely by the remote-control system 650. It may be preferable that the actuators 652 provide feedback to the system 10 regarding the angular position of each hub 206, 208 and the angular position of each valve plate 202, 204 during operation.

In one example, the valve hub 206 may be equipped with a first gear 654 that when turned may be configured to provide a rotational force to the hub 206. A second gear 656 may be included with an actuator 652 that may engage the first gear 654 and cause it to turn when commanded. In this way, the actuator 652 may receive a command and may cause the second gear 656 to rotate which in turn may cause the first gear 654, and its associated hub 206, to rotate as desired.

Figure 44:
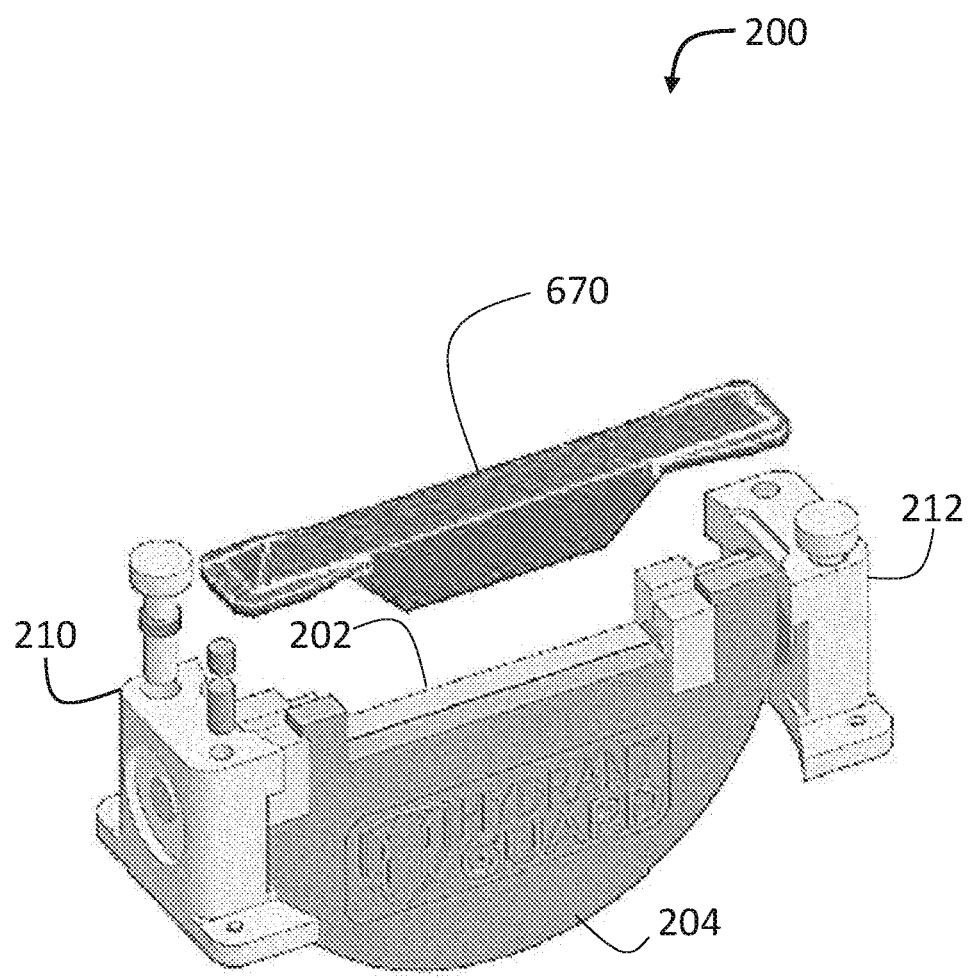
FIGS. 44-46 show aspects of a support bar according to exemplary embodiments herein.
Figure 45A:
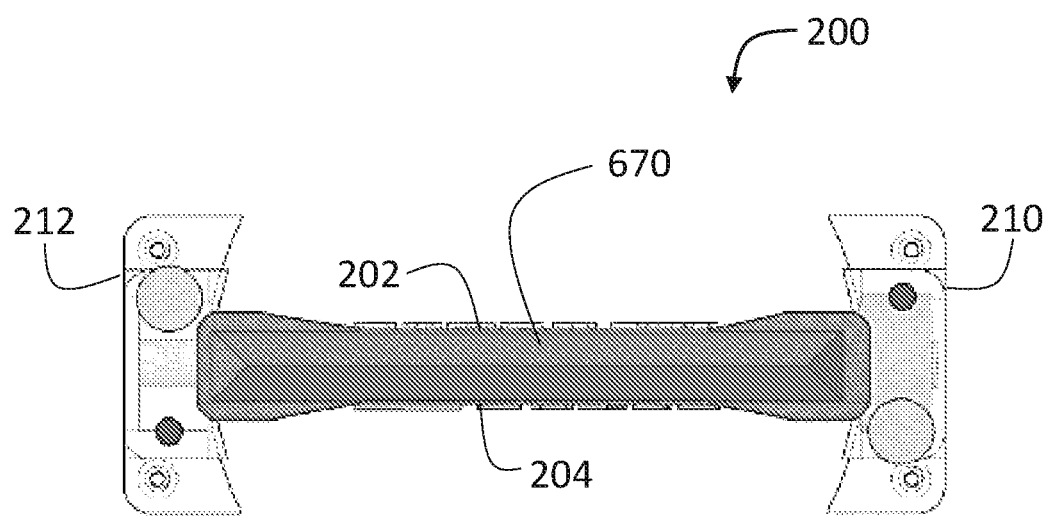
Figure 45B:
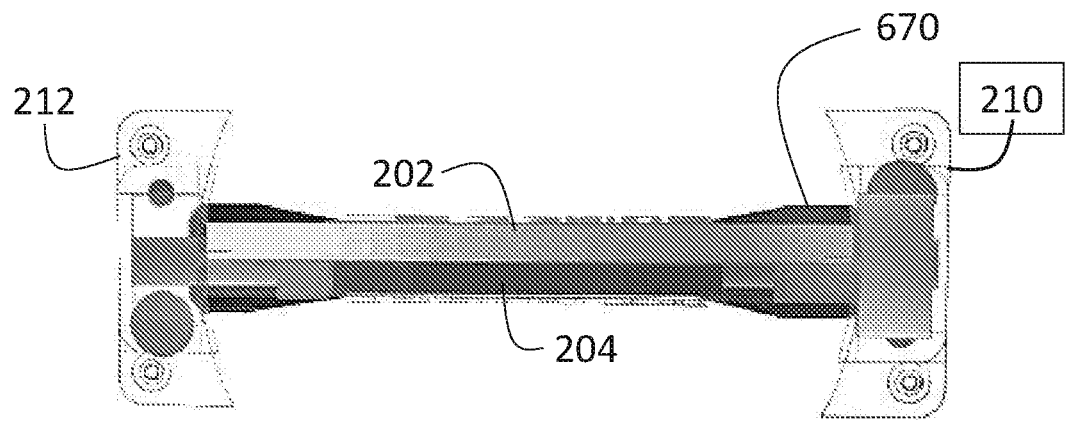
Figure 46:
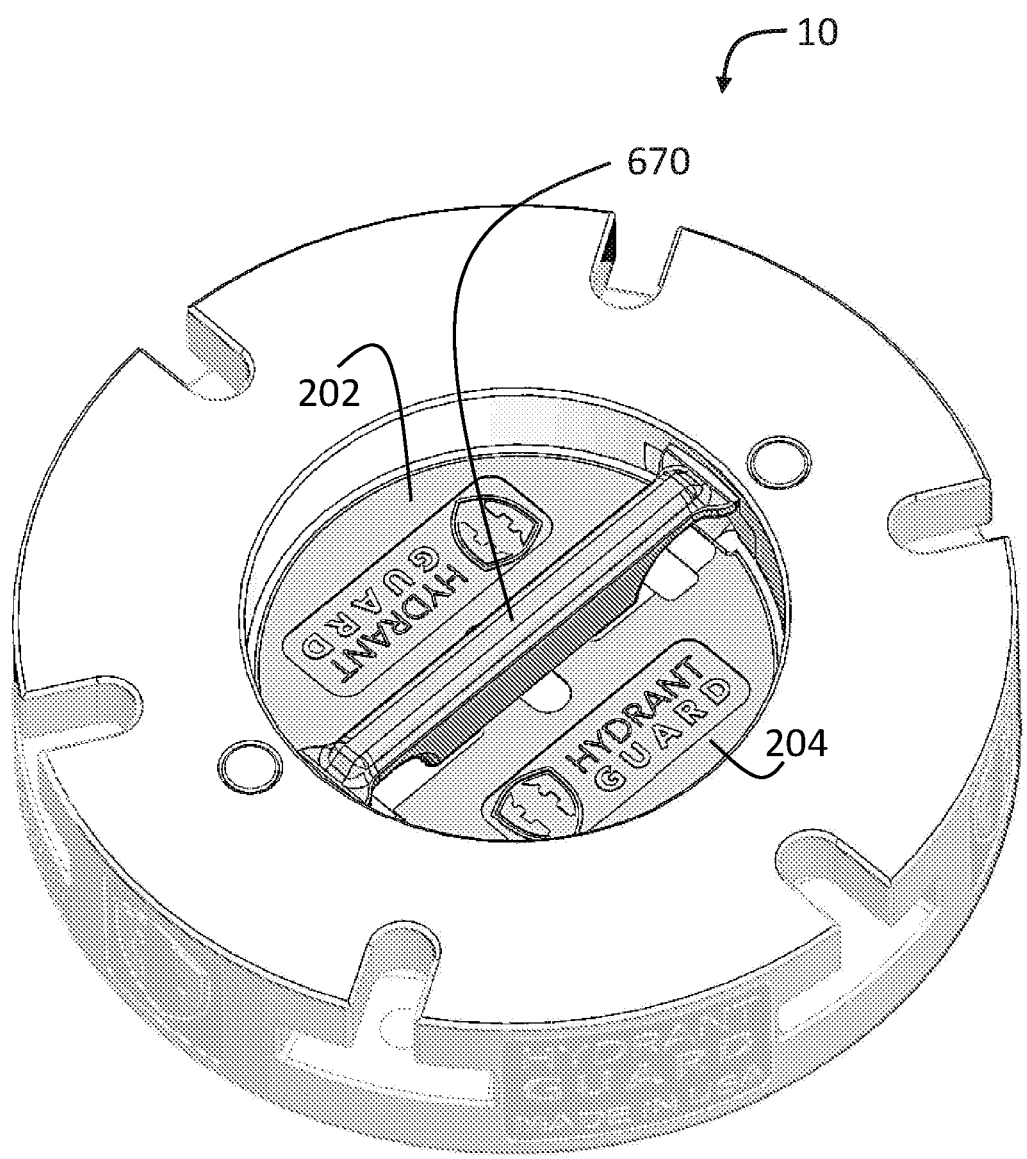

In one exemplary embodiment hereof as shown in FIGS. 44-46, the system 10 may include a support bar 670. The support bar 670 may be positioned along the top interface between the valve plates 202, 204 as shown, and may provide support to the interface of the plates 202, 204 in this area where a typical valve pin may not exist.

As shown in FIGS. 45A (top view) and 45B (bottom view), the support plate 670 may add little to no additional width to the combined plates 202, 204 while the plates are in their open configurations.

As shown in FIG. 46, with the plates 202, 204 in their upright and closed position, the support bar 670 may include a generally flat lower surface that may generally abut against the interface between the plates 202, 204 and provide support thereto. In this way, the support bar 670 may help counteract the upward force provided by the water pressure to the bottom of the plates 202, 204. The support bar 670 may be attached to the inner walls of the opening 104, to the hub holders 210, 212, or to other elements within the system 10.

Additional Implementations

In some exemplary embodiments hereof, the system 10 may be implemented into other water systems to provide similar functionalities as described herein to these additional water systems.

In one embodiment, the system 10 may be implemented into commercial and/or industrial processing environments in systems where flammable, explosive, caustic or types of chemical liquids may flow.

In another implementation, the system 10 may be implemented with water mains for commercial and/or residential buildings and/or structures. Note that the proportional size and shape of the system 10 and the elements that make it up may vary depending on the requirements of the system 10.

In another implementation, a miniaturized version of the system 10 may be implemented with water sprinkler systems, providing a cut-off valve for broken or leaky sprinkler heads.

It is understood that the examples of additional implementations of the system 10 provided above are meant for demonstration and that the system 10 may be implemented with any assembly that may benefit from its functionalities. It is also understood that the scope of the system 10 is not limited in any way by the way in which it is implemented and/or by the assembly that with which it may be implemented.

An advantage of the present invention is that the system 10 provides an emergency warning system to alert individuals when the wet barrel fire hydrants and/or pipelines are damaged. Another advantage of the present invention is that the system 10 is easy to install under the fire hydrant and/or pipeline and can be reinstalled or replaced under an existing fire hydrant and/or pipeline. Yet another advantage of the of the present invention is that system 10 minimizes the vehicular damages as well as decreases damage caused by the inundation of fluids.

It is understood by a person of ordinary skill in the art that any and/or all of the aspects of any of the above described embodiments may be combined in any way, and that the system 10 is not limited in any way by any combination of the aspects of any exemplary embodiments.

While a particular form of the invention has been illustrated and described, it will be apparent that various modifications can be made without departing from the spirit and scope of the invention. Accordingly, it is not intended that the invention be limited, except as by the appended claims.

Those of ordinary skill in the art will appreciate and understand, upon reading this description, that embodiments hereof may provide different and/or additional advantages, and that not all embodiments or implementations need have all advantages.

A person of ordinary skill in the art will understand, that any method described above or below and/or claimed and described as a sequence of steps is not restrictive in the sense of the order of steps.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A system for controlling a valve assembly, the system comprising:
   a housing with an upper side and a lower side and a central opening extending from the upper side to the lower side;
   a first valve plate configured within the central opening and including a first hub, the first hub including a first opening and a first outer surface circumscribing the first opening and a first alignment pin received within the first opening, the first valve plate and the first hub axially rotatable about the first alignment pin;
   at least one first hub notch configured in the first outer surface of the first hub;
   a first keeper pin including a first pin first end, a first pin second end, a first pin outer surface extending between the first pin first end and the first pin second end, and at least one first pin ridge configured in the first pin outer surface, the first keeper pin adapted to transition from a first pin locked position to a first pin unlocked position, wherein the first pin locked position includes the at least one first pin ridge engaged with the at least one first hub notch, and the first pin unlocked position includes the at least one first pin ridge disengaged from the at least one first hub notch;
   wherein the valve assembly is open with the first keeper pin in the first pin locked position and closed with the first keeper pin in the first pin unlocked position.

2. The system of claim 1 wherein the first pin second end is flush with the upper side when the first alignment pin is in the first pin locked position and above the upper side when in the first pin unlocked position.

3. The system of claim 1 wherein the at least one first hub notch includes a plurality of first hub notches configured sequentially in the first outer surface of the first hub, and the at least one first pin ridge includes a plurality of first pin ridges configured sequentially in the first pin outer surface, the first keeper pin adapted to transition from the first pin locked position to the first pin unlocked position, wherein the first pin locked position includes at least one of the plurality of first pin ridges engaged with at least one of the plurality of first hub notches, and the first pin unlocked position includes the at least one of the plurality of first pin ridges disengaged from the at least one of the plurality of first hub notches.

4. The system of claim 1 wherein the housing includes an outer sidewall extending from the upper side to the lower side, the housing including at least one channel extending from the outer sidewall towards the central opening and from the upper side towards the lower side, wherein the at least one channel includes an inner surface opposing the upper side, wherein the at least one channel is adapted to receive a first bolt with a threaded first end and a second end including a bolt head, and to secure the first bolt with at least a portion of the threaded first end extending through a channel of the at least one channel and outward from the upper side of the housing and with at least a portion of the bolt head abutted the inner surface of the at least one channel.

5. The system of claim 1 further comprising a second valve plate configured within the central opening and including a second hub, the second hub including a second opening and a second outer surface circumscribing the second opening and a second alignment pin received within the second opening, the second valve plate and the second hub axially rotatable about the second alignment pin.

6. The system of claim 5 wherein the second alignment pin is distinct from the first alignment pin.

7. The system of claim 5 wherein the second pin second end is flush with the upper side when the second alignment pin is in the second pin locked position and above the upper side when in the second pin unlocked position.

8. The system of claim 5 further comprising at least one second hub notch configured in the second outer surface of the second hub, and a second keeper pin including a second pin first end, a second pin second end, a second pin outer surface extending between the second pin first end and the second pin second end, and at least one second pin ridge configured in the second pin outer surface, the second keeper pin adapted to transition from a second pin locked position to a second pin unlocked position, wherein the second pin locked position includes the at least one second pin ridge engaged with the at least one second hub notch, and the second pin unlocked position includes the at least one second pin ridge disengaged from the at least one second hub notch.

9. The system of claim 8 wherein the valve assembly is open with the second keeper pin in the second pin locked position and closed with the second keeper pin in the second pin unlocked position.

10. A system for controlling a valve assembly, the system comprising:
    a housing with an upper side and a lower side and a central opening extending from the upper side to the lower side;
    a first valve plate configured within the central opening and including a first peripheral hub, the first peripheral hub including a first hub opening and a first hub outer surface circumscribing the first hub opening and a first alignment pin received within the first hub opening, the first valve plate and the first peripheral hub axially rotatable about the first alignment pin;
    a first hub holder coupled to the housing and including a first holder opening adapted to receive at least a first portion of the first hub outer surface, the first peripheral hub rotatable within the first holder opening; and
    a first actuation assembly adapted to releasably engage at least a second portion of the first hub outer surface and adapted to transition from a first locked position to a first unlocked position;
    wherein the valve assembly is open with the first actuation assembly in the first locked position and closed with the first actuation assembly in the first unlocked position.

11. The system of claim 10 wherein the first actuation assembly is located entirely outside of the central opening.

12. The system of claim 10 further comprising a second valve plate configured within the central opening and including a second peripheral hub, the second peripheral hub including a second hub opening and a second hub outer surface circumscribing the second hub opening and a second alignment pin received within the second hub opening, the second valve plate and the second peripheral hub axially rotatable about the second alignment pin; and a second hub holder coupled to the housing and including a second holder opening adapted to receive at least a first portion of the second hub outer surface, the second peripheral hub rotatable within the second holder opening.

13. The system of claim 12 wherein the second alignment pin is distinct from the first alignment pin.

14. The system of claim 12 further comprising a second actuation assembly adapted to releasably engage at least a second portion of the second hub outer surface and adapted to transition from a second locked position to a second unlocked position.

15. The system of claim 14 wherein the valve assembly is open with the second actuation assembly in the second locked position and closed with the second actuation assembly in the second unlocked position.

16. The system of claim 10 wherein the housing includes an outer sidewall extending from the upper side to the lower side, the housing including at least one channel extending from the outer sidewall towards the central opening and from the upper side towards the lower side, and wherein the at least one channel includes an inner surface opposing the upper side.

17. The system of claim 16 wherein the at least one channel is adapted to receive a first bolt with a threaded first end and a second end including a bolt head, wherein the at least one channel is adapted to receive the first bolt and to secure the first bolt with at least a portion of the threaded first end extending through a channel of the at least one channel and outward from the upper side of the housing and with at least a portion of the bolt head abutted the inner surface of the at least one channel.

18. The system of claim 17 wherein the portion of the threaded end of the first bolt extending through a channel of the at least one channel and outward from the upper side of the housing is adapted to connect the upper side of the housing to a separate passageway.

19. The system of claim 18 wherein the separate passageway when connected to the upper side of the housing holds the first actuation assembly in the first locked position, and when disconnected from the upper side of the housing releases the first actuation assembly into the first unlocked position.

20. The system of claim 19 wherein the first valve plate and the first hub are free to rotate about the first alignment pin and the first peripheral hub is free to rotate within the first holder opening when the first actuation assembly is in the first unlocked position.

* * * * *